US010527104B2

(12) United States Patent
Liess

(10) Patent No.: US 10,527,104 B2
(45) Date of Patent: Jan. 7, 2020

(54) COMBINED MULTI-COUPLER FOR TOP DRIVE

(71) Applicant: Weatherford Technology Holdings, LLC, Houston, TX (US)

(72) Inventor: Martin Liess, Seelze (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 89 days.

(21) Appl. No.: 15/656,914

(22) Filed: Jul. 21, 2017

(65) Prior Publication Data

US 2019/0024721 A1   Jan. 24, 2019

(51) Int. Cl.
| | |
|---|---|
| *E21B 17/046* | (2006.01) |
| *E21B 3/02* | (2006.01) |
| *F16D 1/116* | (2006.01) |
| *E21B 41/00* | (2006.01) |
| *F16D 1/08* | (2006.01) |
| *E21B 17/043* | (2006.01) |
| *E21B 19/16* | (2006.01) |

(52) U.S. Cl.
CPC ............. *F16D 1/116* (2013.01); *E21B 3/02* (2013.01); *E21B 17/043* (2013.01); *E21B 17/046* (2013.01); *E21B 19/16* (2013.01); *E21B 41/00* (2013.01); *F16D 1/08* (2013.01)

(58) Field of Classification Search
CPC ...... E21B 17/003; E21B 17/02; E21B 17/028; E21B 17/046; E21B 3/02
See application file for complete search history.

(56) References Cited

U.S. PATENT DOCUMENTS

| | | | |
|---|---|---|---|
| 1,367,156 A | 2/1921 | McAlvay et al. | |
| 1,610,977 A | 12/1926 | Scott | |
| 1,822,444 A | 9/1931 | MacClatchie | |
| 1,853,299 A | 4/1932 | Carroll | |

(Continued)

FOREIGN PATENT DOCUMENTS

| | | |
|---|---|---|
| AU | 2012201644 A1 | 4/2012 |
| AU | 2013205714 A1 | 5/2013 |

(Continued)

OTHER PUBLICATIONS

Balltec Lifting Solutions, CoilLOK™, Brochure, "Highest integrity hand-held coiled tubing handling tools," 2 pages.

(Continued)

*Primary Examiner* — Kenneth L Thompson
(74) *Attorney, Agent, or Firm* — Pattersn + Sheridan, LLP

(57) ABSTRACT

In one embodiment, a coupler system for coupling a top drive and a tool, including a drive member of the top drive configured to transfer torque. The drive member having a housing with a bore therethrough and a window formed substantially laterally through the housing. An adapter of the tool is configured to be inserted through the window of the housing. In another embodiment, a method for coupling a top drive to a tool includes moving, the tool adjacent to the top drive, the tool including an adapter and the top drive including a housing having a window formed therethrough. The method also includes aligning the adapter with the window and inserting the adapter substantially laterally into the window of the housing, thereby longitudinally and torsionally coupling the top drive and the tool.

17 Claims, 29 Drawing Sheets

(56) References Cited

U.S. PATENT DOCUMENTS

| | | | |
|---|---|---|---|
| 2,266,572 A * | 12/1941 | Slebert | E21B 17/046 403/331 |
| 2,370,354 A | 2/1945 | Hurst | |
| 2,683,379 A | 7/1954 | Strandgren | |
| 3,147,992 A | 9/1964 | Haeber et al. | |
| 3,354,951 A | 11/1967 | Savage et al. | |
| 3,385,370 A | 5/1968 | Knox et al. | |
| 3,662,842 A | 5/1972 | Bromell | |
| 3,698,426 A | 10/1972 | Litchfield et al. | |
| 3,747,675 A | 7/1973 | Brown | |
| 3,766,991 A | 10/1973 | Brown | |
| 3,774,697 A | 11/1973 | Brown | |
| 3,776,320 A | 12/1973 | Brown | |
| 3,842,619 A | 10/1974 | Bychurch, Sr. | |
| 3,888,318 A | 6/1975 | Brown | |
| 3,899,024 A | 8/1975 | Tonnelli et al. | |
| 3,913,687 A | 10/1975 | Gyongyosi et al. | |
| 3,915,244 A | 10/1975 | Brown | |
| 3,917,092 A | 11/1975 | McGinnis | |
| 3,964,552 A | 6/1976 | Slator | |
| 4,022,284 A | 5/1977 | Crow | |
| 4,051,587 A | 10/1977 | Boyadjieff | |
| 4,100,968 A | 7/1978 | Delano | |
| 4,192,155 A | 3/1980 | Gray | |
| 4,199,847 A | 4/1980 | Owens | |
| 4,235,469 A | 11/1980 | Denny et al. | |
| 4,364,407 A | 12/1982 | Hilliard | |
| 4,377,179 A | 3/1983 | Giebeler | |
| 4,402,239 A | 9/1983 | Mooney | |
| 4,449,596 A | 5/1984 | Boyadjieff | |
| 4,478,244 A | 10/1984 | Garrett | |
| 4,497,224 A | 2/1985 | Jurgens | |
| 4,593,773 A | 6/1986 | Skeie | |
| 4,647,050 A | 3/1987 | Johnson | |
| 4,762,187 A | 8/1988 | Haney | |
| 4,776,617 A | 10/1988 | Sato | |
| 4,779,688 A | 10/1988 | Baugh | |
| 4,791,997 A | 12/1988 | Krasnov | |
| 4,813,493 A | 3/1989 | Shaw et al. | |
| 4,815,546 A | 3/1989 | Haney et al. | |
| 4,821,814 A | 4/1989 | Willis et al. | |
| 4,844,181 A | 7/1989 | Bassinger | |
| 4,867,236 A | 9/1989 | Haney et al. | |
| 4,916,959 A | 4/1990 | Lively | |
| 4,932,253 A | 6/1990 | McCoy | |
| 4,955,949 A | 9/1990 | Bailey et al. | |
| 4,962,819 A | 10/1990 | Bailey et al. | |
| 4,972,741 A | 11/1990 | Sibille | |
| 4,981,180 A | 1/1991 | Price | |
| 4,997,042 A | 3/1991 | Jordan et al. | |
| 5,018,350 A | 5/1991 | Bender | |
| 5,020,640 A | 6/1991 | Nederbragt | |
| 5,036,927 A | 8/1991 | Willis | |
| 5,099,725 A | 3/1992 | Bouligny, Jr. et al. | |
| 5,152,554 A | 10/1992 | LaFleur et al. | |
| 5,172,940 A | 12/1992 | Usui et al. | |
| 5,191,939 A | 3/1993 | Stokley | |
| 5,196,770 A | 3/1993 | Champs et al. | |
| 5,215,153 A | 6/1993 | Younes | |
| 5,245,877 A | 9/1993 | Ruark | |
| 5,282,653 A | 2/1994 | LaFleur et al. | |
| 5,284,214 A * | 2/1994 | Van Gundy, Sr. | F16L 25/00 175/320 |
| 5,297,833 A | 3/1994 | Willis et al. | |
| 5,348,351 A | 9/1994 | LaFleur et al. | |
| 5,385,514 A | 1/1995 | Dawe | |
| 5,404,767 A | 4/1995 | Sutherland | |
| 5,433,279 A | 7/1995 | Tessari et al. | |
| 5,440,183 A | 8/1995 | Denne | |
| 5,441,310 A | 8/1995 | Barrett et al. | |
| 5,456,320 A | 10/1995 | Baker | |
| 5,479,988 A | 1/1996 | Appleton | |
| 5,486,223 A | 1/1996 | Carden | |
| 5,501,280 A | 3/1996 | Brisco | |
| 5,509,442 A | 4/1996 | Claycomb | |
| 5,540,095 A | 7/1996 | Sherman et al. | |
| 5,577,566 A | 11/1996 | Albright et al. | |
| 5,584,343 A | 12/1996 | Coone | |
| 5,607,250 A * | 3/1997 | Tatterson | E21B 17/046 166/377 |
| 5,645,131 A | 7/1997 | Trevisani | |
| 5,664,310 A | 9/1997 | Penisson | |
| 5,682,952 A | 11/1997 | Stokley | |
| 5,735,348 A | 4/1998 | Hawkins, III | |
| 5,769,577 A * | 6/1998 | Boddy | B23B 29/046 408/197 |
| 5,778,742 A | 7/1998 | Stuart | |
| 5,839,330 A | 11/1998 | Stokka | |
| 5,909,768 A | 6/1999 | Castille et al. | |
| 5,918,673 A | 7/1999 | Hawkins et al. | |
| 5,950,724 A | 9/1999 | Giebeler | |
| 5,971,079 A | 10/1999 | Mullins | |
| 5,992,520 A | 11/1999 | Schultz et al. | |
| 6,003,412 A | 12/1999 | Dlask et al. | |
| 6,011,508 A | 1/2000 | Perreault et al. | |
| 6,053,191 A | 4/2000 | Hussey | |
| 6,101,952 A | 8/2000 | Thornton et al. | |
| 6,102,116 A | 8/2000 | Giovanni | |
| 6,142,545 A | 11/2000 | Penman et al. | |
| 6,161,617 A | 12/2000 | Gjedebo | |
| 6,173,777 B1 | 1/2001 | Mullins | |
| 6,276,450 B1 | 8/2001 | Seneviratne | |
| 6,279,654 B1 | 8/2001 | Mosing et al. | |
| 6,289,911 B1 | 9/2001 | Majkovic | |
| 6,309,002 B1 | 10/2001 | Bouligny | |
| 6,311,792 B1 | 11/2001 | Scott et al. | |
| 6,328,343 B1 | 12/2001 | Hosie et al. | |
| 6,378,630 B1 | 4/2002 | Ritorto et al. | |
| 6,390,190 B2 | 5/2002 | Mullins | |
| 6,401,811 B1 | 6/2002 | Coone | |
| 6,415,862 B1 | 7/2002 | Mullins | |
| 6,431,626 B1 | 8/2002 | Bouligny | |
| 6,443,241 B1 | 9/2002 | Juhasz et al. | |
| 6,460,620 B1 | 10/2002 | LaFleur | |
| 6,499,701 B1 | 12/2002 | Thornton et al. | |
| 6,508,132 B1 | 1/2003 | Lohr et al. | |
| 6,527,047 B1 | 3/2003 | Pietras | |
| 6,536,520 B1 | 3/2003 | Snider et al. | |
| 6,571,876 B2 | 6/2003 | Szarka | |
| 6,578,495 B1 | 6/2003 | Yitts et al. | |
| 6,578,632 B2 | 6/2003 | Mullins | |
| 6,595,288 B2 | 7/2003 | Mosing et al. | |
| 6,604,578 B2 | 8/2003 | Mullins | |
| 6,606,569 B1 | 8/2003 | Potts | |
| 6,622,796 B1 | 9/2003 | Pietras | |
| 6,637,526 B2 | 10/2003 | Juhasz et al. | |
| 6,640,824 B2 | 11/2003 | Majkovic | |
| 6,666,273 B2 | 12/2003 | Laurel | |
| 6,675,889 B1 | 1/2004 | Mullins et al. | |
| 6,679,333 B2 | 1/2004 | York et al. | |
| 6,688,398 B2 | 2/2004 | Pietras | |
| 6,691,801 B2 | 2/2004 | Juhasz et al. | |
| 6,705,405 B1 | 3/2004 | Pietras | |
| 6,715,542 B2 | 4/2004 | Mullins | |
| 6,719,046 B2 | 4/2004 | Mullins | |
| 6,722,425 B2 | 4/2004 | Mullins | |
| 6,725,938 B1 | 4/2004 | Pietras | |
| 6,732,819 B2 | 5/2004 | Wenzel | |
| 6,732,822 B2 | 5/2004 | Slack et al. | |
| 6,742,584 B1 | 6/2004 | Appleton | |
| 6,742,596 B2 | 6/2004 | Haugen | |
| 6,770,004 B1 | 8/2004 | Lofgren et al. | |
| 6,779,599 B2 | 8/2004 | Mullins et al. | |
| 6,832,656 B2 | 12/2004 | Fournier, Jr. et al. | |
| 6,851,476 B2 | 2/2005 | Gray et al. | |
| 6,883,605 B2 | 4/2005 | Arceneaux et al. | |
| 6,892,835 B2 | 5/2005 | Shahin et al. | |
| 6,908,121 B2 | 6/2005 | Hirth et al. | |
| 6,925,807 B2 | 8/2005 | Jones et al. | |
| 6,938,697 B2 | 9/2005 | Haugen | |
| 6,976,298 B1 | 12/2005 | Pietras | |
| 6,983,701 B2 | 1/2006 | Thornton et al. | |
| 6,994,176 B2 | 2/2006 | Shahin et al. | |
| 7,000,503 B2 | 2/2006 | Dagenais et al. | |

(56) References Cited

U.S. PATENT DOCUMENTS

| | | |
|---|---|---|
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,600 B2 | 2/2007 | Luke et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,290,476 B1 | 11/2007 | Glasson |
| 7,303,022 B2 | 12/2007 | Tilton et al. |
| 7,325,610 B2 | 2/2008 | Giroux et al. |
| 7,353,880 B2 | 4/2008 | Pietras |
| 7,373,971 B2 | 5/2008 | Montgomery |
| 7,448,456 B2 | 11/2008 | Shahin et al. |
| 7,451,826 B2 | 11/2008 | Pietras |
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,530,799 B2 | 5/2009 | Smith |
| 7,579,941 B2 | 8/2009 | Cleveland et al. |
| 7,591,304 B2 | 9/2009 | Juhasz et al. |
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |
| 7,665,531 B2 | 2/2010 | Pietras |
| 7,669,662 B2 | 3/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,857,043 B2 | 12/2010 | Ali-zada |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,036,829 B2 | 10/2011 | Gibbs et al. |
| 8,118,106 B2 | 2/2012 | Wiens et al. |
| 8,141,642 B2 | 3/2012 | Olstad et al. |
| 8,166,730 B2 * | 5/2012 | Schmatz ............... B67B 3/2066 53/317 |
| 8,210,268 B2 | 7/2012 | Heidecke et al. |
| 8,256,579 B2 | 9/2012 | Jia |
| 8,281,856 B2 | 10/2012 | Jahn et al. |
| 8,307,903 B2 | 11/2012 | Redlinger et al. |
| 8,328,527 B2 | 12/2012 | Ehimeakhe |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,616,134 B2 | 12/2013 | King et al. |
| 8,624,699 B2 | 1/2014 | Hunter et al. |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,849,954 B2 | 9/2014 | Kim |
| 8,851,860 B1 | 10/2014 | Mail |
| 8,858,187 B2 | 10/2014 | Lane |
| 8,869,887 B2 * | 10/2014 | Deere ............... E21B 33/0385 166/242.6 |
| 8,893,772 B2 | 11/2014 | Henderson et al. |
| 8,944,188 B2 * | 2/2015 | Lowry .................. E21B 17/03 175/320 |
| 9,068,396 B2 * | 6/2015 | Purohit ................ E21B 4/006 |
| 9,068,406 B2 | 6/2015 | Clasen et al. |
| 9,206,851 B2 | 12/2015 | Slaughter, Jr. et al. |
| 9,528,326 B2 | 12/2016 | Heidecke et al. |
| 9,631,438 B2 | 4/2017 | McKay |
| 10,030,800 B2 * | 7/2018 | Wang .................. F16L 37/32 |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0216924 A1 | 11/2004 | Pietras et al. |
| 2005/0000691 A1 | 1/2005 | Giroux et al. |
| 2005/0173154 A1 | 8/2005 | Lesko |
| 2005/0206163 A1 | 9/2005 | Guesnon et al. |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1 | 12/2005 | Folk et al. |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2007/0030167 A1 | 2/2007 | Li et al. |
| 2007/0044973 A1 | 3/2007 | Fraser et al. |
| 2007/0074588 A1 | 4/2007 | Harata et al. |
| 2007/0074874 A1 | 4/2007 | Richardson |
| 2007/0102992 A1 | 5/2007 | Jager |
| 2007/0131416 A1 | 6/2007 | Odell et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth et al. |
| 2007/0251699 A1 | 11/2007 | Wells et al. |
| 2007/0251701 A1 | 11/2007 | Jahn et al. |
| 2007/0257811 A1 | 11/2007 | Hall et al. |
| 2008/0018603 A1 | 1/2008 | Baraz et al. |
| 2008/0059073 A1 | 3/2008 | Giroux et al. |
| 2008/0093127 A1 | 4/2008 | Angman |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0151934 A1 | 6/2009 | Heidecke et al. |
| 2009/0159294 A1 | 6/2009 | Abdollahi et al. |
| 2009/0200038 A1 | 8/2009 | Swietlik et al. |
| 2009/0205820 A1 | 8/2009 | Koederitz et al. |

(56) References Cited

U.S. PATENT DOCUMENTS

| | | |
|---|---|---|
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0316528 A1 | 12/2009 | Ramshaw et al. |
| 2009/0321086 A1 | 12/2009 | Zimmermann |
| 2010/0032162 A1 | 2/2010 | Olstad et al. |
| 2010/0101805 A1 | 4/2010 | Angelle et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2010/0236777 A1 | 9/2010 | Partouche et al. |
| 2011/0036586 A1 | 2/2011 | Hart et al. |
| 2011/0039086 A1 | 2/2011 | Graham et al. |
| 2011/0088495 A1 | 4/2011 | Buck et al. |
| 2011/0214919 A1 | 9/2011 | McClung, III |
| 2011/0280104 A1 | 11/2011 | McClung, III |
| 2012/0020808 A1 | 1/2012 | Lawson et al. |
| 2012/0048574 A1 | 3/2012 | Wiens et al. |
| 2012/0152530 A1 | 6/2012 | Wiedecke et al. |
| 2012/0160517 A1 | 6/2012 | Bouligny et al. |
| 2012/0212326 A1 | 8/2012 | Christiansen et al. |
| 2012/0234107 A1 | 9/2012 | Pindiprolu et al. |
| 2012/0298376 A1 | 11/2012 | Twardowski |
| 2013/0045116 A1 | 2/2013 | Wang et al. |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0076099 A1* | 3/2013 | Mutze ............... E21B 21/07 299/1.05 |
| 2013/0105178 A1 | 5/2013 | Pietras |
| 2013/0186638 A1 | 7/2013 | Filippov et al. |
| 2013/0207382 A1 | 8/2013 | Robichaux |
| 2013/0207388 A1 | 8/2013 | Jansson et al. |
| 2013/0233624 A1 | 9/2013 | In |
| 2013/0269926 A1 | 10/2013 | Liess et al. |
| 2013/0271576 A1 | 10/2013 | Ellis |
| 2013/0275100 A1 | 10/2013 | Ellis et al. |
| 2013/0299247 A1 | 11/2013 | Kuttel et al. |
| 2014/0069720 A1 | 3/2014 | Gray |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0262521 A1 | 9/2014 | Bradley et al. |
| 2014/0305662 A1 | 10/2014 | Giroux et al. |
| 2014/0312716 A1 | 10/2014 | Hunter et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2014/0374168 A1* | 12/2014 | Michael ............... E21B 17/07 175/320 |
| 2015/0014063 A1 | 1/2015 | Simanjuntak et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0337648 A1 | 11/2015 | Zippel et al. |
| 2016/0024862 A1 | 1/2016 | Wilson et al. |
| 2016/0138348 A1 | 5/2016 | Kunec |
| 2016/0145954 A1 | 5/2016 | Helms et al. |
| 2016/0177639 A1 | 6/2016 | McIntosh et al. |
| 2016/0215592 A1 | 7/2016 | Helms et al. |
| 2016/0230481 A1 | 8/2016 | Misson et al. |
| 2017/0037683 A1 | 2/2017 | Heidecke et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |
| 2017/0067320 A1 | 3/2017 | Zouhair et al. |
| 2017/0074075 A1 | 3/2017 | Liess |
| 2017/0211327 A1 | 7/2017 | Wern et al. |
| 2017/0211343 A1 | 7/2017 | Thiemann |
| 2017/0284164 A1 | 10/2017 | Holmes et al. |

FOREIGN PATENT DOCUMENTS

| | | |
|---|---|---|
| AU | 2014215938 A1 | 9/2014 |
| CA | 2 707 050 A1 | 6/2009 |
| CA | 2707050 A1 | 6/2009 |
| CA | 2 841 654 A1 | 8/2015 |
| CA | 2841654 A1 | 8/2015 |
| CA | 2944327 A1 | 10/2015 |
| CN | 2412105 Y | 12/2000 |
| CN | 201810278 U | 4/2011 |
| DE | 102007016822 A1 | 10/2008 |
| EP | 0 250 072 A2 | 12/1987 |
| EP | 0 250 072 B1 | 4/1991 |
| EP | 1 619 349 A2 | 1/2006 |
| EP | 1619349 A2 | 1/2006 |
| EP | 1 772 715 A2 | 4/2007 |
| EP | 1772715 A2 | 4/2007 |
| EP | 1 961 912 A1 | 8/2008 |
| EP | 1 961 913 A1 | 8/2008 |
| EP | 1961912 A1 | 8/2008 |
| EP | 1961913 A1 | 8/2008 |
| EP | 2085566 A2 | 8/2009 |
| EP | 2 322 357 A1 | 5/2011 |
| EP | 3032025 A1 | 6/2016 |
| GB | 1487948 A | 10/1977 |
| GB | 2 077 812 A | 12/1981 |
| GB | 2077812 A | 12/1981 |
| GB | 2 180 027 A | 3/1987 |
| GB | 2180027 A | 3/1987 |
| GB | 2 228 025 A | 8/1990 |
| GB | 2228025 A | 8/1990 |
| GB | 2 314 391 A | 12/1997 |
| GB | 2314391 A | 12/1997 |
| WO | 02068788 A2 | 9/2002 |
| WO | 2004/079153 A2 | 9/2004 |
| WO | 2004079153 A2 | 9/2004 |
| WO | 2004/101417 A2 | 11/2004 |
| WO | 2004101417 A2 | 11/2004 |
| WO | 2007/001887 A2 | 1/2007 |
| WO | 2007001887 A2 | 1/2007 |
| WO | 2007/070805 A2 | 6/2007 |
| WO | 2007127737 A2 | 11/2007 |
| WO | 2008005767 A1 | 1/2008 |
| WO | 2009/076648 A2 | 6/2009 |
| WO | 2009/76648 A2 | 6/2009 |
| WO | 2009076648 A2 | 6/2009 |
| WO | 2012100019 A1 | 7/2012 |
| WO | 2012/115717 A2 | 8/2012 |
| WO | 2012115717 A2 | 8/2012 |
| WO | 2014056092 A1 | 4/2014 |
| WO | 2014/182272 A1 | 11/2014 |
| WO | 2015/000023 A1 | 1/2015 |
| WO | 2015000023 A1 | 1/2015 |
| WO | 2015/119509 A1 | 8/2015 |
| WO | 2015/127433 A1 | 8/2015 |
| WO | 2015119509 A1 | 8/2015 |
| WO | 2015127433 A1 | 8/2015 |
| WO | 2015176121 A1 | 11/2015 |
| WO | 2016197255 A1 | 12/2016 |
| WO | 2017/044384 A1 | 3/2017 |

OTHER PUBLICATIONS

Australian Examination Report dated May 15, 2013, Australian Patent Applicatin No. 2012201644.
PCT Search Report for International Application No. PCT/US2008/086699 dated Nov. 9, 2009.
Australian Examination Report for Application No. 2008334992 dated Apr. 5, 2011.
EP Office Action for Application No. 08860261.0-2315 dated Apr. 12, 2011.

(56) References Cited

OTHER PUBLICATIONS

EP Search Report for Application No. 12153779.9-2315 dated Apr. 5, 2012.
PCT Search Report for International Application No. PCT/US2008/086699 dated Sep. 9, 2009.
Canadian Office Action dated Aug. 24, 2015, for corresponding Application No. 2,837,581.
EPO Extended European Search Report dated Nov. 23, 2015, for EPO Patent Application No. 15166062.8.
Australian Patent Examination Report dated Feb. 4, 2016, for Australian Patent Application No. 2014215938.
Canadian Office Action dated Apr. 25, 2016, for Canadian Patent Application No. 2,837,581.
PCT International Search Report and Written Opinion dated Jul. 25, 2016, for International Patent Application No. PCT/US2015/061960.
EPO Extended European Search Report dated Dec. 4, 2017, for European Application No. 17195552.9.
PCT International Search Report and Written Opinion dated Feb. 20, 2017 for International Application No. PCT/US2016/050139.
PCT International Search Report and Written Opinion dated Dec. 14, 2016, for International Patent Application No. PCT/US2016/046458.
PCT International Search Report and Written Opinion dated Nov. 11, 2016, for International Application No. PCT/US2016/046445.
"Fundamentals of Hydraulic Motors," Staff Report, Hydraulics and Pneumatics, Jun. 26, 2014, http://hydraulicspneumatics.com/hydraulic-pumps-motors/fundamentals-hydraulic-motors, accessed Aug. 12, 2015 (6 total pages).
A123 Systems, 14Ah Prismatic Pouch Cell, Product Specification, www.a123systems.com.
Eaton Low Speed High Torque Motors E-MOLO-MC001-E6 Brochure, Sep. 2011 (16 total pages).
Warrior, 250E Electric Top Drive (250-Ton), 250H Hydraulic Top Drive (250-Ton), Brochure, Apr. 2014, Rev. 1, www.warriorrig.com.
Warrior, 500E Electric Top Drive (500 ton-1000hp), Brochure, Document No. EC 009, May 2015, Rev. 3, www.warriorrig.com.
Weatherford, TorkSub™ Stand-Alone Torque Measuring System, Product Specification, Document No. 11368.00, Copyright 2011-2014, www.weatherford.com.
PCT International Search Report and Written Opinion dated Nov. 25, 2016, for International Patent Application No. PCT/US2016/050542.
Streicher Load/Torque Cell System Brochure, Streicher Group, 1 Page.
Enchanced Torque & Tension Sub With Integrated Turns Brochure, 3PS, Inc.,, 2 Pages.
PCT International Search Report and Written Opinion dated Jan. 12, 2017, for International Patent Application No. PCT/US2016/047813.
PCT International Search Report and Written Opinion dated Nov. 22, 2016, for International Patent Application No. PCT/US2016/049462.
PCT International Search Report and Written Opinion dated Apr. 4, 2017, for International Application No. PCT/US2017/014646.
Warrior, 250E Electric Top Drive (250-Ton), 250H Hydraulic Top Drive (250-Ton), Brochure, Apr. 2014, Rev. 1.
Warrior, 500E Electric Top Drive (500 ton-1000hp), Brochure, Document No. EC 009, May 2015, Rev. 3.
Weatherford, TorkSub™ Stand-Alone Torque Measuring System, Product Specification, Document No. 11368.00, www.weatherford.com.
EPO Extended Europeam Search RPT dtd Jun. 8, 2017 for European Pat. Application No. 17152458.0.
EPO Extended European Search Report dated Jun. 8, 2017, for European Patent Application No. 17152458.0.
Australian Examination Report dated Sep. 19, 2017, for Australian Patent Application No. 2017200371.

Australian Examination Report dated Feb. 8, 2018 for Australian Patent Application No. 2017200371.
PCT International Search Report and Written Opinion dated Jun. 8, 2017, for Internaitonal Application No. PCT/US2017/014224.
Lefevre,Bruno et al., "Deeper, more deviated wells push development of smart drill stem rotary shouldered connections," Drilling Technology, (2008), pp. 130-132.
Rotary Sholder Handbook, 2010 National Oilwell Varco, D392002466-MKT-001 Rev.02,116 pages.
Weatherford; Rotaflex Long-Stroke Pumping Units; Artificial Lift Systems; date unknown; 17 total pages.
Analog Devices; Data Sheet; Precision ±1.7 g, ±5 g, ±18 g Single-/Dual-Axis iMEMSO Accelerometer; 2004-2014; 16 total pages.
Dr. Richard Thornton; Elevator World; Linear Synchronous Motors for Elevators; dated Sep. 2006; 2 total pages.
Weatherford; Production Optimization; Stainless Steel Polished-Rod Load Cell dated 2008; 2 total pages.
Wieler, et al.; Elevator World; Linear Synchronous Motor Elevators Become a Reality; dated May 2012; 4 total pages.
MagneMotion; LSM Elevators; White Paper dated 2013; 2 total pages.
Weatherford; Rotaflex Long-Stroke Pumping Units; Proven Technology for Deep, Challenging, and High-Volume Wells; dated 2014; 24 total pages.
U.S. Appl. No. 14/717,441 entitled Dart Detector for Wellbore Tubular Cementation in the name of Zippel, et al; 35 total pages; filed May 20, 2015.
PCT International Search Report and Written Opinion dated Aug. 24, 2016, for International Application No. PCT/US2016/015838.
Bosch Rexroth AG, Electric Drives and Controls, Brochure, "Asynchronous high-speed motors 1MB for high speeds," 6 pages.
Balltec Lifting Solutions, LiftLOK™, Brochure, "Highest integrity lifting tools for the harshest environments," 2 pages.
PCT International Search Report and Written Opinion dated Dec. 19, 2018, for International Application No. PCT/US2018/042813.
European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Oct. 5, 2018, for European Patent Application No. 18173275.1.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.
Canadian Office Action in related application CA 2,955,754 dated Jul. 17, 2018.
EPO Extended European Search Report dated Jul. 19, 2018, for European Application No. 18159595.0.
EPO Extended European Search Report dated Jul. 17, 2018, for European Application No. 18158050.7.
Cookson, Colter, "Inventions Speed Drilling, Cut Costs," The American Oil & Gas Reporter, Sep. 2015, 2 pages.
Ennaifer, Amine et al. , "Step Change in Well Testing Operations," Oilfield Review, Autumn 2014: 26, No. 3, pp. 32-41.
Peters; Tool Coupler for Use With a Top Drive; U.S. Appl. No. 15/656,508, filed Jul. 21, 2017. (Application not attached to IDS.).
Fuehring et al.; Tool Coupler With Rotating Coupling Method for Top Drive; U.S. Appl. No. 15/445,758, filed Feb. 28, 2017. (Application not attached to IDS.).
Bell; Interchangeable Swivel Combined Multicoupler; U.S. Appl. No. 15/607,159, filed May 26, 2017 (Application not attached to IDS.).
Amezaga; Dual Torque Transfer for Top Drive System; U.S. Appl. No. 15/447,881, filed Mar. 2, 2017. (Application not attached to IDS.).
Zouhair; Coupler With Threaded Connection for Pipe Handler; U.S. Appl. No. 15/444,016, filed Feb. 27, 2017. (Application not attached to IDS.).
Liess; Downhole Tool Coupling System; U.S. Appl. No. 15/670,897, filed Aug. 7, 2017. (Application not attached to IDS.).

(56) References Cited

OTHER PUBLICATIONS

Muller et al; Combined Multi-Coupler With Rotating Locking Method for Top Drive; U.S. Appl. No. 15/721,216, filed Sep. 29, 2017. (Application not attached to IDS.).
Amezaga et al; Tool Coupler With Threaded Connection for Top Drive; U.S. Appl. No. 15/457,572, filed Mar. 13, 2017. (Application not attached to IDS.).
Wiens; Combined Multi-Coupler With Locking Clamp Connection for Top Drive; U.S. Appl. No. 15/627,428, filed Jun. 19, 2017. (Application not attached to IDS.).
Henke et al.; Tool Coupler With Sliding Coupling Members for Top Drive; U.S. Appl. No. 15/448,297, filed Mar. 2, 2017. (Application not attached to IDS.).
Schoknecht et al.; Combined Multi-Coupler With Rotating Fixations for Top Drive; U.S. Appl. No. 15/447,926, filed Mar. 2, 2017. (Application not attached to IDS.).
Metzlaff et al.; Combined Multi-Coupler for Top Drive; U.S. Appl. No. 15/627,237, filed Jun. 19, 2017. (Application not attached to IDS.).
Liess; Combined Multi-Coupler for Top Drive; U.S. Appl. No. 15/656,914, filed Jul. 21, 2017. (Application not attached to IDS.).
Liess et al.; Combined Multi-Coupler; U.S. Appl. No. 15/656,684, filed Jul. 21, 2017. (Application not attached to IDS.).
Amezaga et al.; Tool Coupler With Data and Signal Transfer Methods for Top Drive; U.S. Appl. No. 15/730,305, filed Oct. 11, 2017. (Application not attached to IDS).
Liess; Tool Coupler With Threaded Connection for Top Drive; U.S. Appl. No. 15/806,560, filed Nov. 8, 2017. (Application not attached to IDS).
EPO Partial European Search Report dated Jul. 31, 2018, for European Application No. 18159597.6.
A123 System; 14Ah Prismatic Pouch Cell; Nanophosphate® Lithium-Ion; www.a123systems.com; date unknown; 1 page.
Streicher Load/Torque Cell Systems; date unknown; 1 page.
3PS, Inc.; Enhanced Torque and Tension Sub with Integrated Turns; date unknown; 2 total pages.
Lefevre, et al.; Drilling Technology; Deeper, more deviated wells push development of smart drill stem rotary shouldered connections; dated 2008; 2 total pages.
PCT Invitaiton to Pay Additional Fees for International Application No. PCT/US2008/086699; dated Sep. 9, 2009; 7 total pages.
PCT Notification of Transmittal of the International Search Report and the Written Opinion of the International Searching Authority for International Application No. PCT/US2008/086699; dated Sep. 11, 2009; 19 total pages.
National Oilwell Varco; Rotary Shoulder Handbook; dated 2010; 116 total pages.
Weatherford; TorkSub™ Stand-Alone Torque Measuring System; dated 2011-2014; 4 total pages.
Australian Examination Report for Application No. 2008334992; dated Apr. 5, 2011; 2 total pages.
European Search Report for Application No. 08 860 261.0-2315; dated Apr. 12, 2011; 4 total pages.
Eaton; Spool Valve Hydraulic Motors; dated Sep. 2011; 16 total pages.
European Extended Search Report for Application No. 12153779.9-2315; dated Apr. 5, 2012; 4 total pages.
Australian Examination Report for Application No. 2012201644; dated May 15, 2013; 3 total pages.
Warrior; 250E Electric Top Drive (250-Ton); 250H Hydraulic Top Drive (250-Ton); dated Apr. 2014; 4 total pages.
Hydraulic Pumps & Motors; Fundamentals of Hydraulic Motors; dated Jun. 26, 2014; 6 total pages.
Warrior; Move Pipe Better; 500E Electric Top Drive (500 ton-1000 hp); dated May 2015; 4 total pages.
Canadian Office Action for Application No. 2,837,581; dated Aug. 24, 2015; 3 total pages.
European Extended Search Report for Application No. 15166062.8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.
PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
EPO Extended European Search Report dated Jun. 6, 2018, for European Application No. 18157915.2.

* cited by examiner

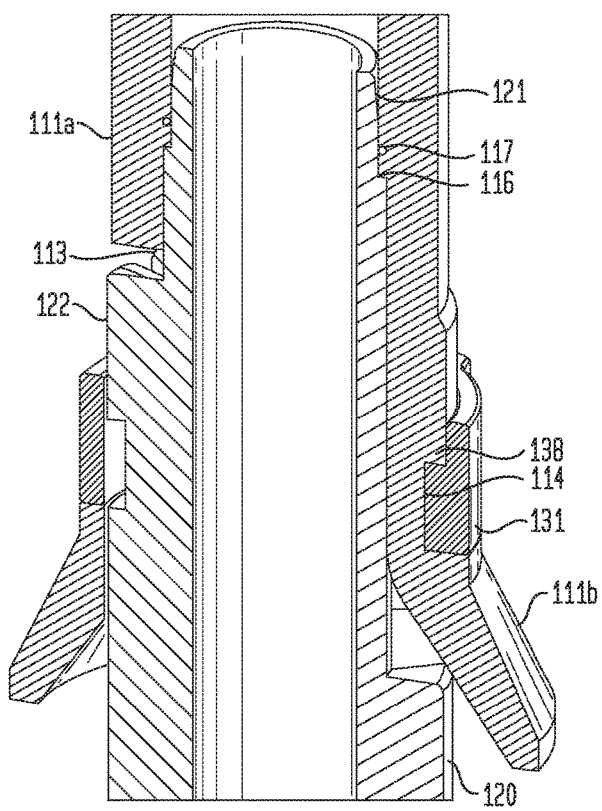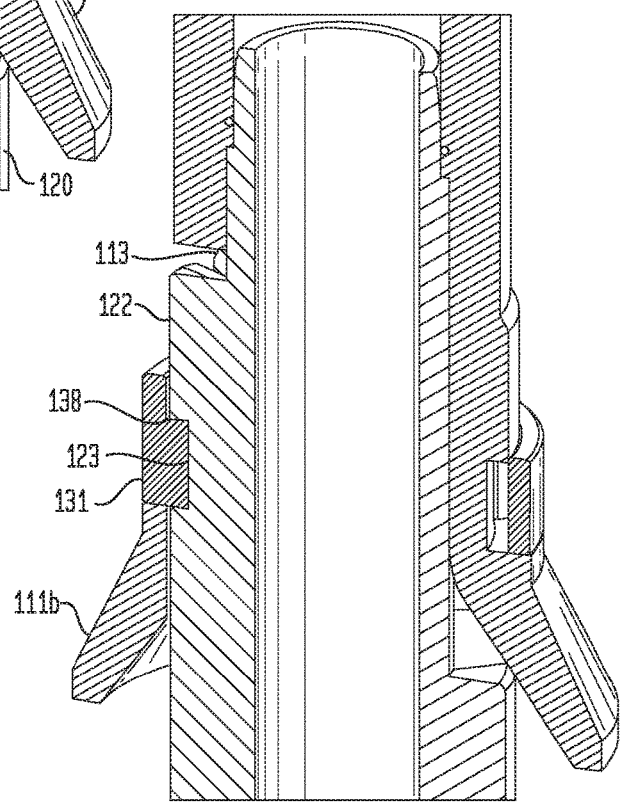

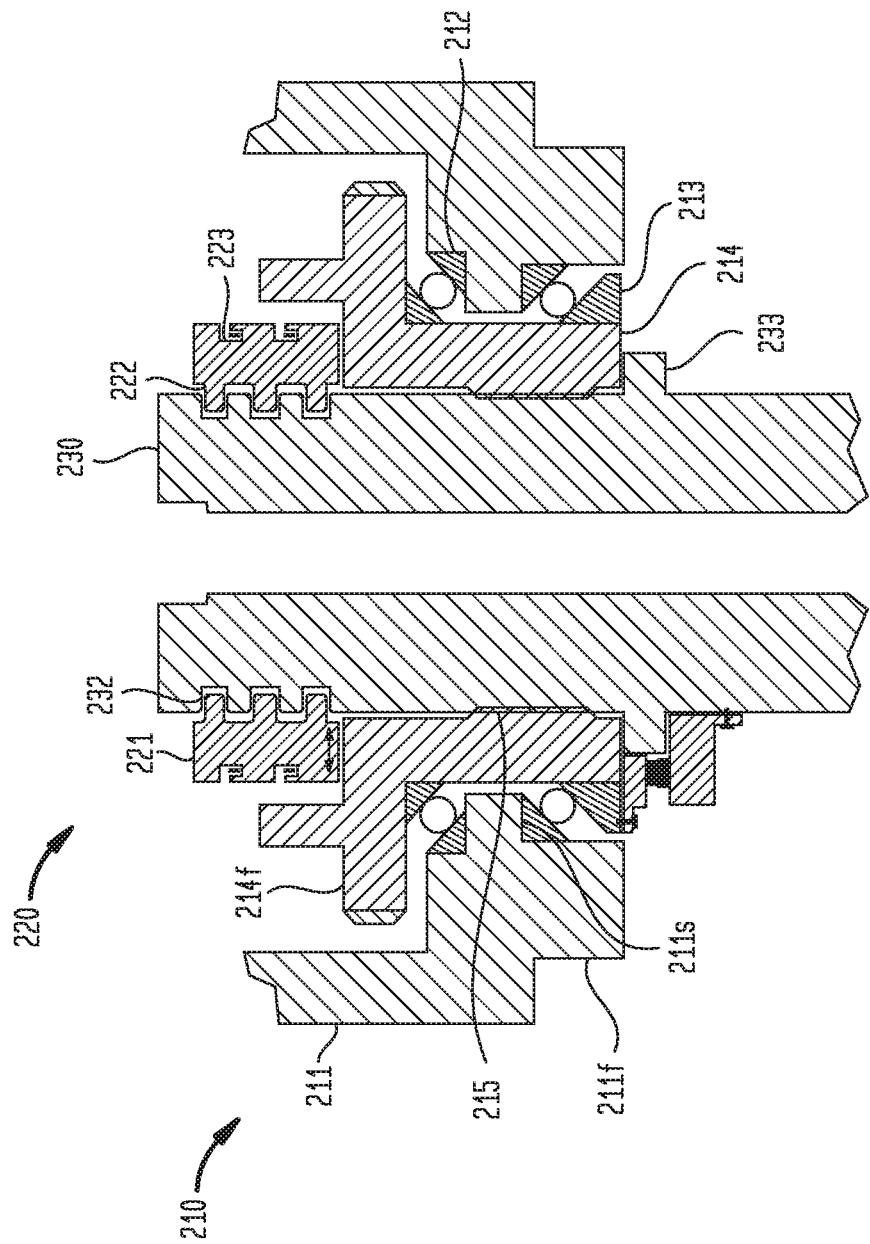

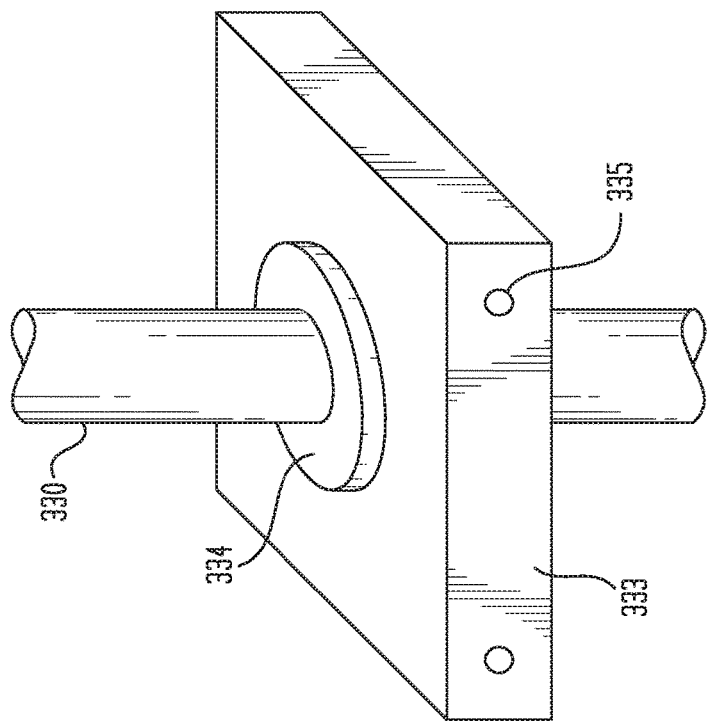
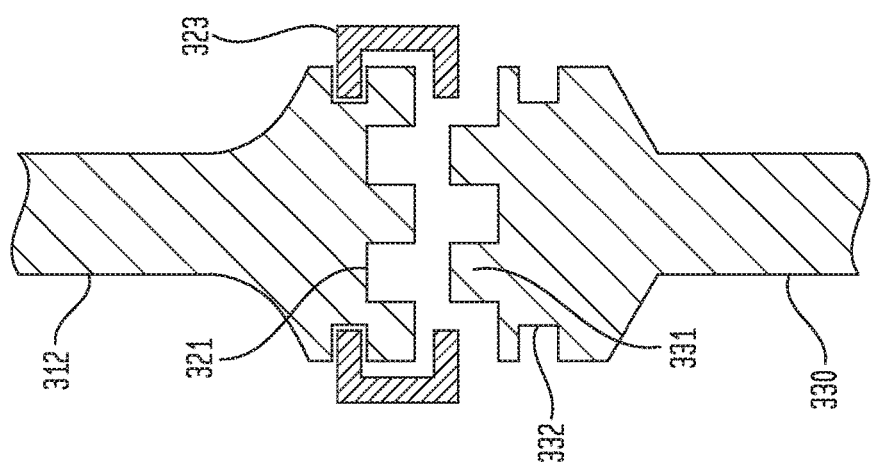

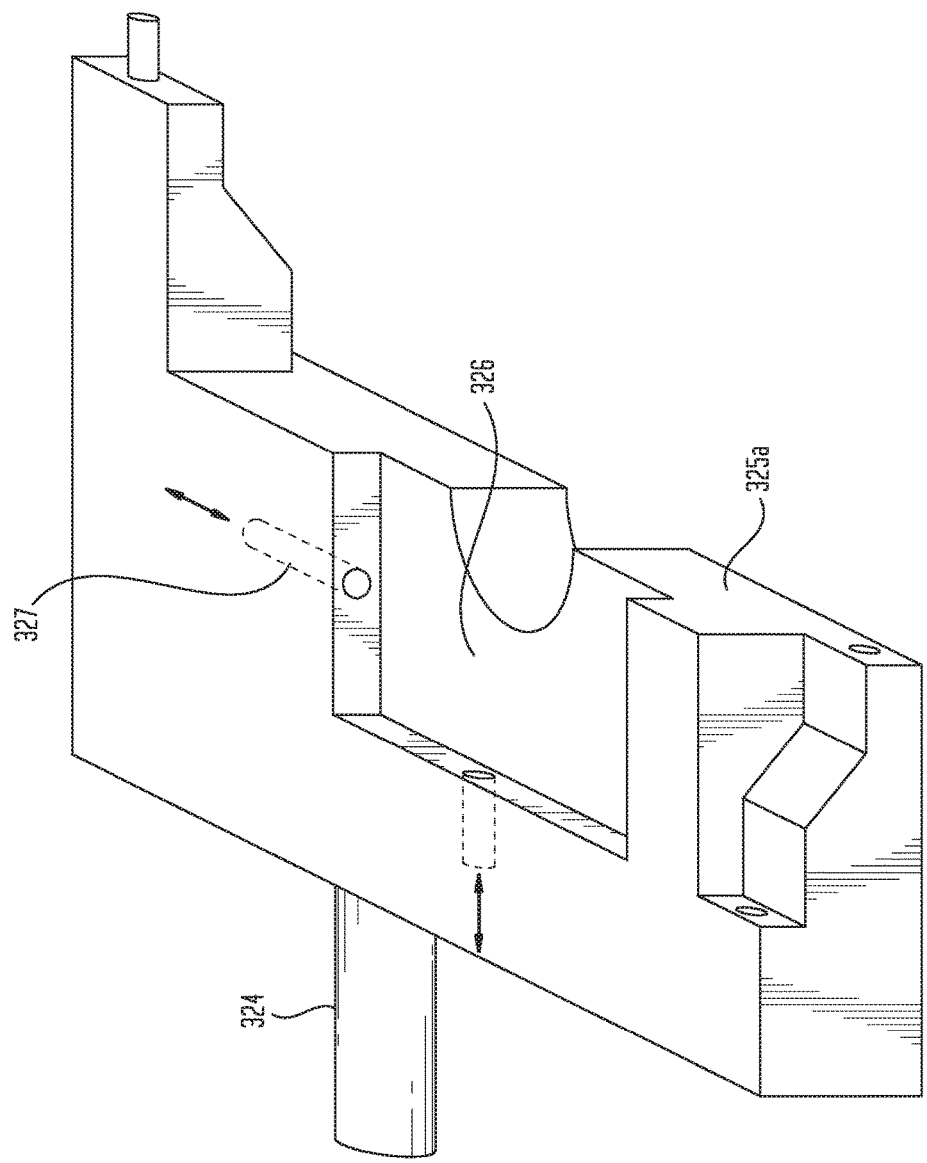

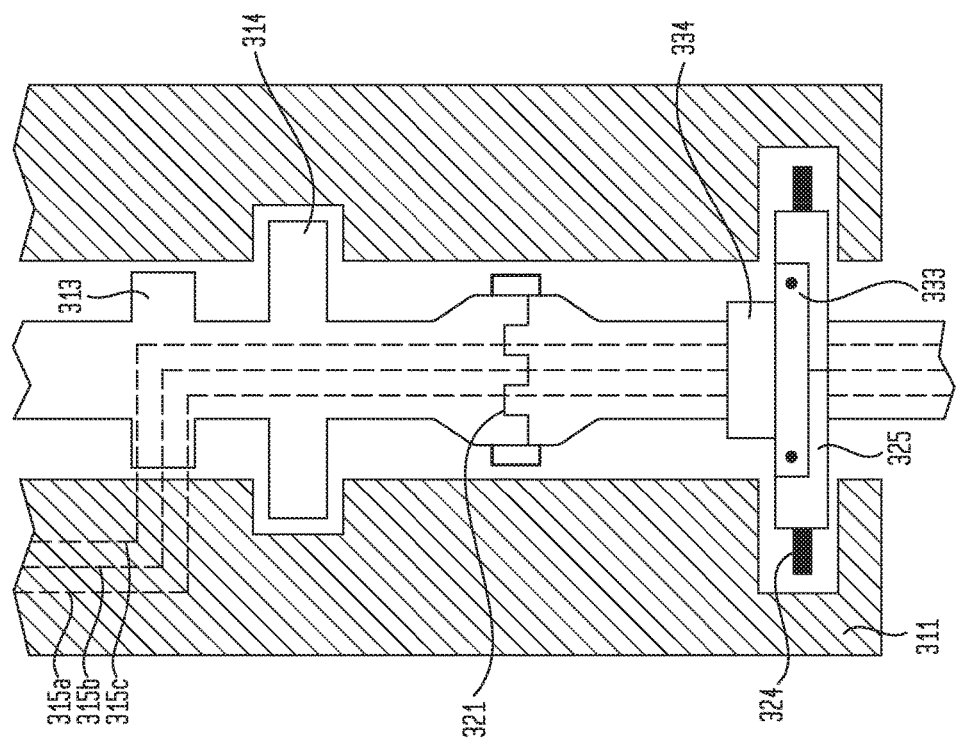
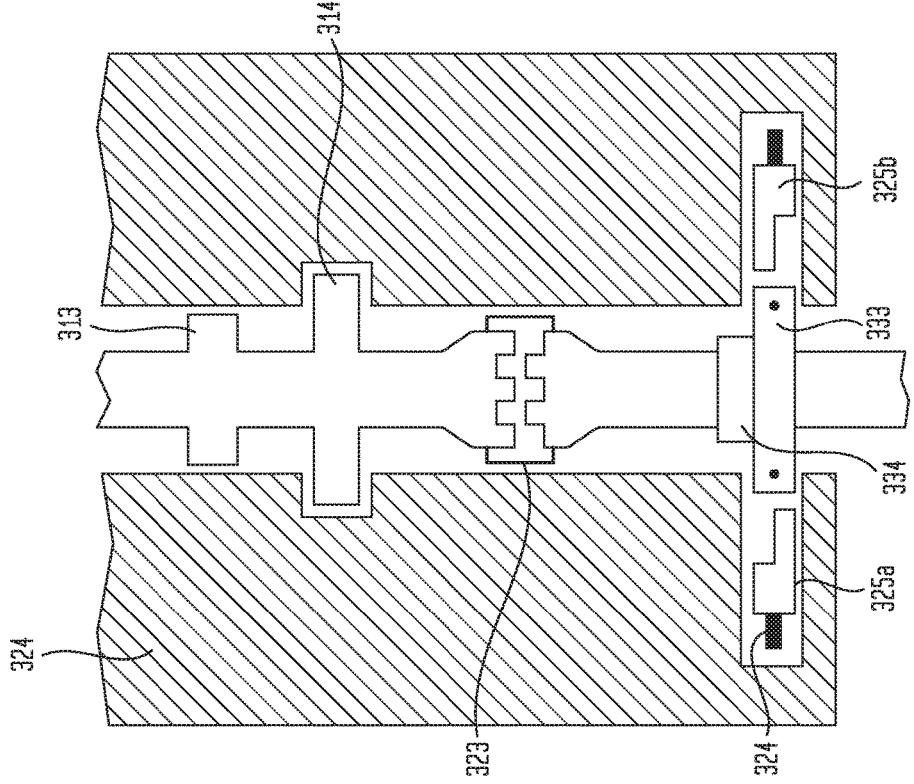

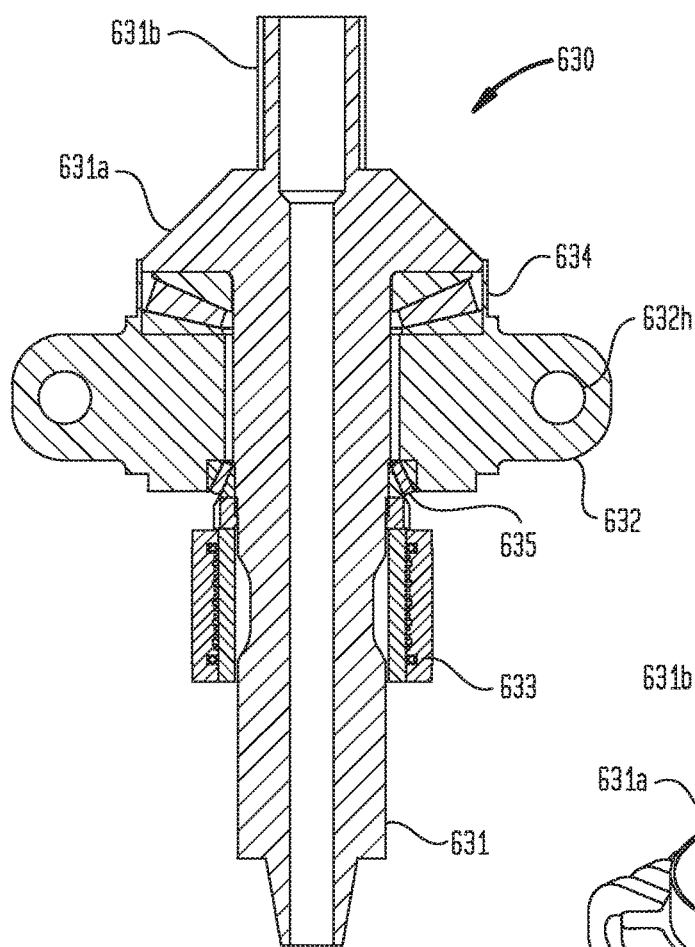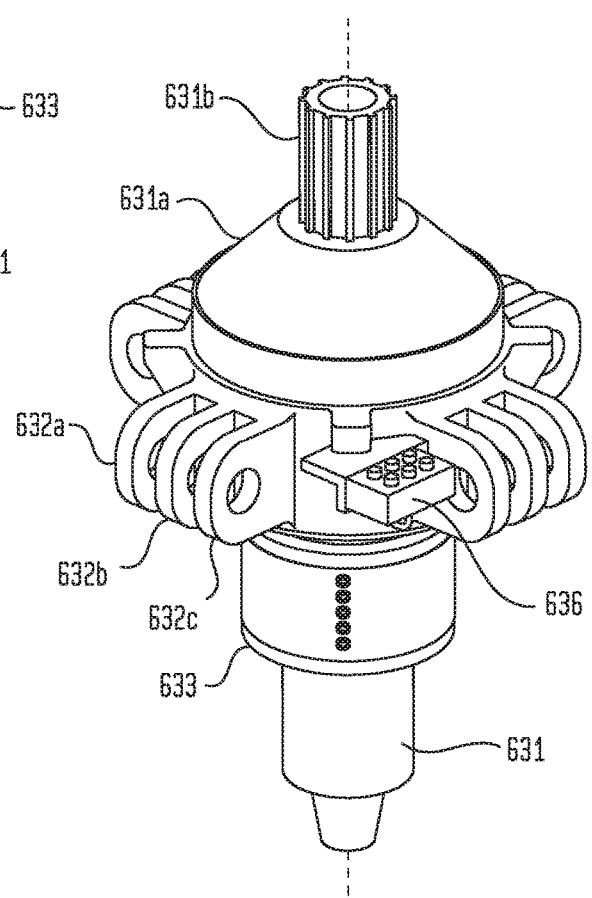

FIG. 30
FIG. 31
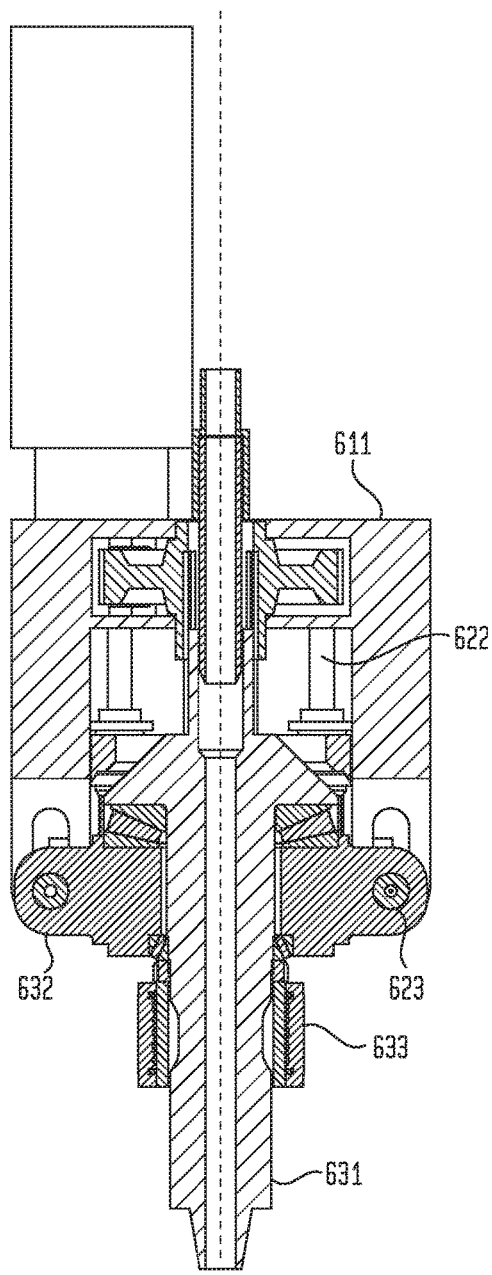
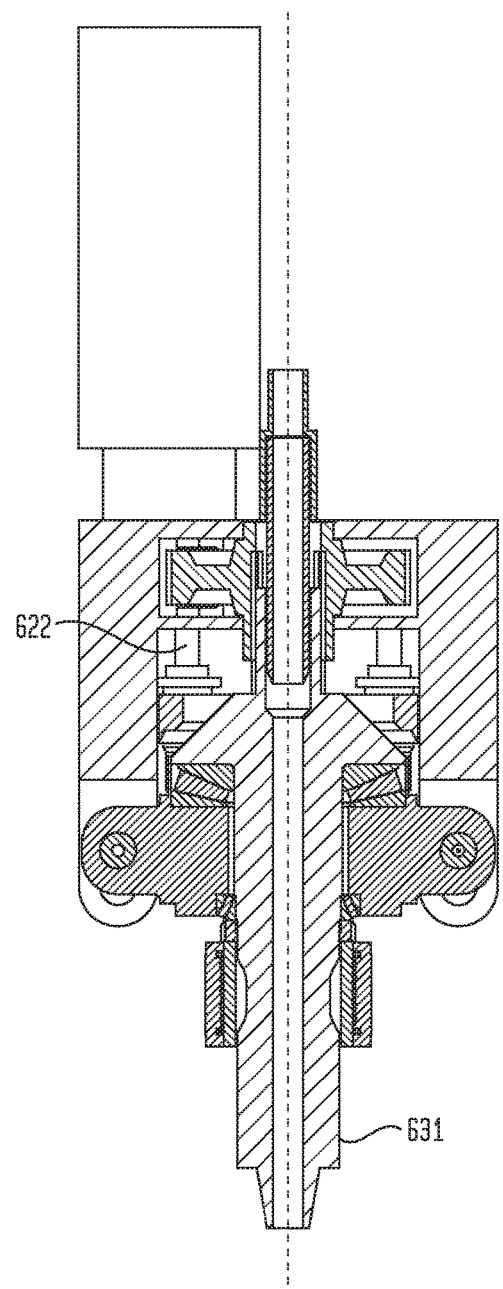

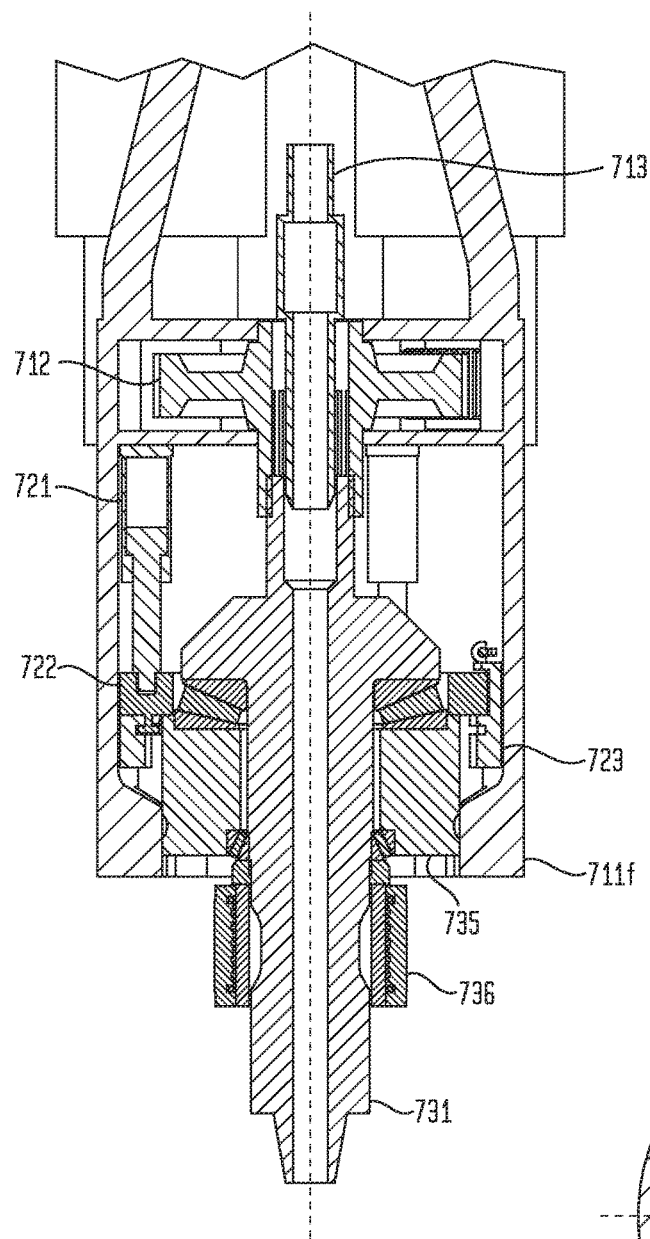
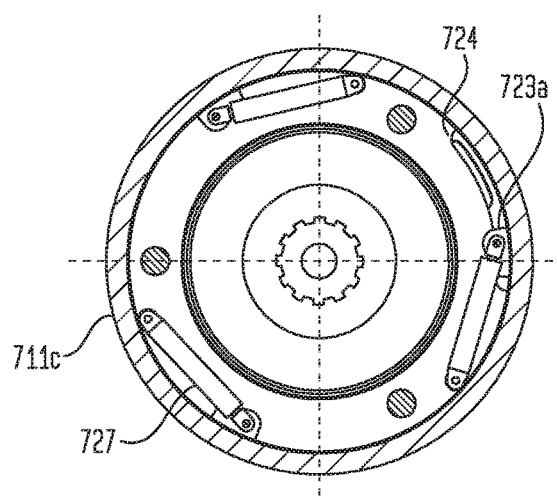
FIG. 34A
FIG. 34B

COMBINED MULTI-COUPLER FOR TOP DRIVE

BACKGROUND OF THE INVENTION

Field of the Invention

The present disclosure generally relates to methods and apparatus for coupling a top drive to a tool for use in a wellbore.

Description of the Related Art

A wellbore is formed to access hydrocarbon bearing formations, e.g. crude oil and/or natural gas, by the use of drilling. Drilling is accomplished by utilizing a drill bit that is mounted on the end of a tubular string, such as a drill string. To drill within the wellbore to a predetermined depth, the drill string is often rotated by a top drive or rotary table on a surface platform or rig, and/or by a downhole motor mounted towards the lower end of the drill string. After drilling to a predetermined depth, the drill string and drill bit are removed, and a section of casing is lowered into the wellbore. An annulus is thus formed between the string of casing and the formation. The casing string is temporarily hung from the surface of the well. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

Top drives are equipped with a motor for rotating the drill string. The quill of the top drive is typically threaded for connection to an upper end of the drill pipe in order to transmit torque to the drill string. Conventional top drives also threadedly connect to tools for use in the wellbore. An operator on the rig may be required to connect supply lines, such as hydraulic, pneumatic, data, and/or power lines, between conventional top drives and the tool complete the connection.

In the construction and completion of oil and gas wells, a drilling rig is used to facilitate the insertion and removal of tubular strings into a wellbore. Tubular strings are constructed by inserting a first tubular into a wellbore until only the upper end of the tubular extends out of the wellbore. A gripping member close to the surface of the wellbore then grips the upper end of the first tubular. The upper end of the first tubular has a threaded box end for connecting to a threaded pin end of a second tubular or tool. The second tubular or tool is lifted over the wellbore center, lowered onto or "stabbed into" the upper end of the first tubular, and then rotated such that the pin end of the second tubular or tool is threadedly connected to the box end of the first tubular. However, it is critical not to damage the threads when the pin end is stabbed into the box end, or when torque is applied to overcome the weight of the second tubular resting on the threads. It is also critical that the drilling rig operator lowers the second tubular at the same rate at which the threads draw together.

The threaded connection between conventional top drives and tools allows only for rotation in a single direction. Manual connection of supply lines can be time-consuming and dangerous to rig personnel. Therefore, there is a need for improved apparatus and methods for connecting top drives to tools.

SUMMARY OF THE INVENTION

In one embodiment, a coupler system for coupling a top drive and a tool includes a coupler for a top drive. The coupler system includes a housing with a bore therethrough and a window formed through the housing. The coupler system also includes an adapter of a tool having a tab formed on the adapter, wherein the window is configured to receive the tab and torsionally couple the adapter and the housing. The coupler system also includes a lock ring disposed on the housing and rotatable relative to the housing between a locked position and an unlocked position, wherein the lock ring is configured to longitudinally couple the adapter and the coupler in the locked position.

In another embodiment, a coupler system for coupling a top drive and a tool includes a drive member of the top drive configured to transfer torque. The drive member includes a housing with a bore therethrough and a window formed substantially laterally through the housing. The adapter of the tool is configured to be inserted through the window of the housing.

In another embodiment, a method for coupling a top drive to a tool includes moving the tool adjacent to the top drive, wherein the tool includes an adapter and the top drive includes a housing having a window formed therethrough. The method further includes aligning the adapter with the window and inserting the adapter substantially laterally into the window of the housing, thereby longitudinally and torsionally coupling the top drive and the tool.

In yet another embodiment, a coupler system for coupling a top drive and a tool includes a drive member for a top drive configured to transfer torque and support a weight of the tool. The drive member includes a housing with a bore therethrough. The coupler system further includes an adapter of a tool, a lock plate disposed in the housing and longitudinally movable relative to the housing, wherein the lock plate is configured to connect to the adapter, and one or more utility connectors longitudinally movable relative to the housing with the lock plate.

In a further embodiment, a coupler system for coupling a top drive and a tool includes a drive member for a top drive. The drive member includes a housing with a bore therethrough and a quill configured to rotate relative to the housing. The coupler system further includes an adapter of a tool configured to be inserted into the bore of the housing and engage the quill and one or more utility connectors, wherein the one or more utility connectors are rotationally stationary.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4A illustrates a cross-sectional view of the combined multi-coupler system in an unlocked position.

FIG. 4B illustrates a cross-sectional view of the combined multi-coupler system in the locked position.

FIG. 5 illustrates a cross-sectional view of a drive member, an adapter, and a latch assembly of a combined multi-coupler system, according to a second embodiment.

FIG. 8 illustrates the coupling assembly.

FIG. 9 illustrates a lock plate, according to the third embodiment.

FIG. 10 illustrates a support plate, according to the third embodiment.

FIGS. 11A and 11B illustrate operation of the combined multi-coupler system, according to the third embodiment.

FIG. 25A illustrates a cross-sectional view of an adapter, according to the sixth embodiment.

FIG. 25B illustrates an isometric view of the adapter.

FIGS. 26-31 illustrate operation of the combined multi-coupler, according to the sixth embodiment.

FIG. 34A illustrates a cross-sectional view of the adapter inserted into a housing of the drive member, according to the seventh embodiment.

FIG. 34B illustrates a top-down cross-sectional view of the housing having the adapter inserted, according to the seventh embodiment.

DETAILED DESCRIPTION

Figure 1:
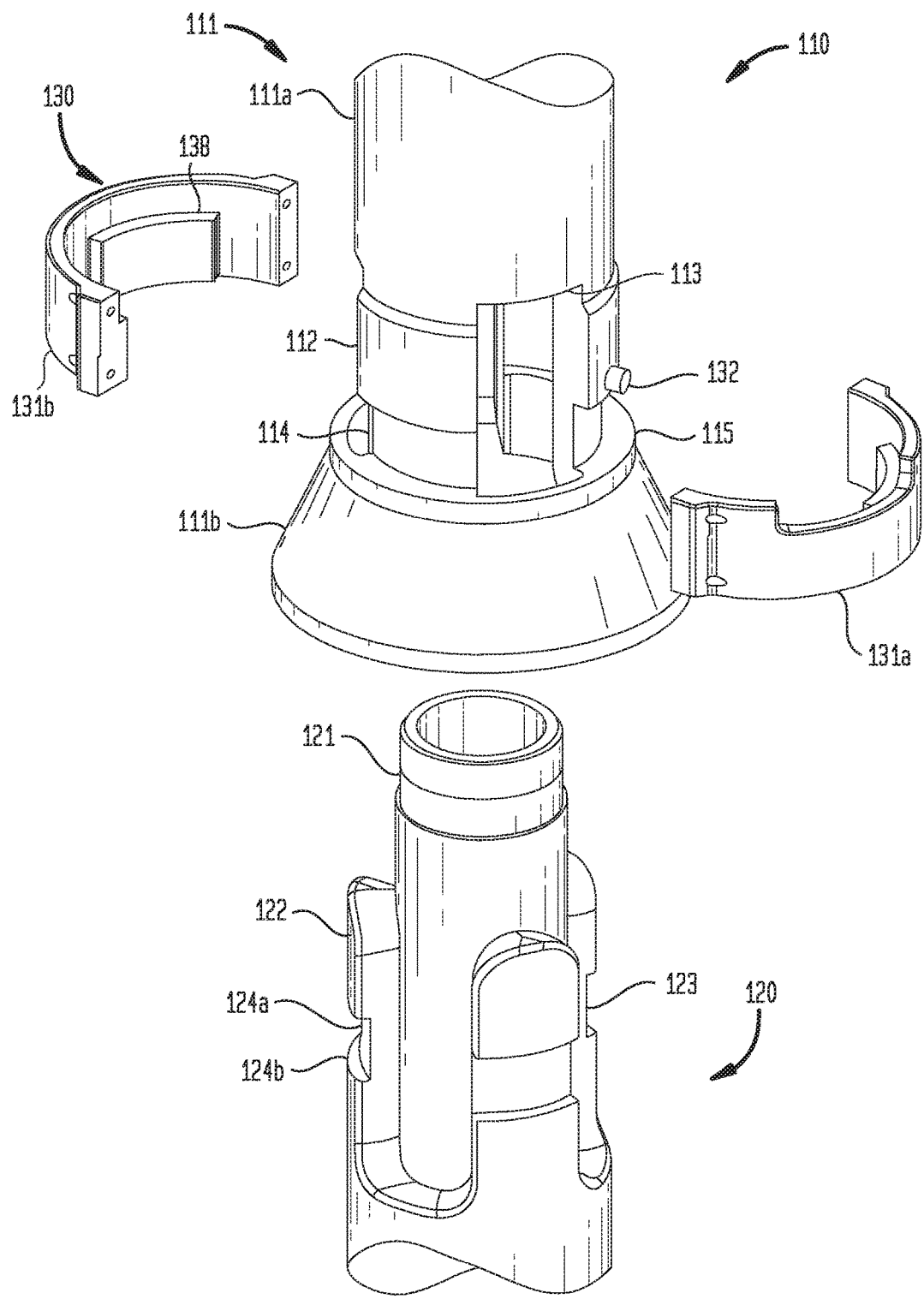
FIG. 1 illustrates an exploded view of a drive member, an adapter, and a locking assembly of a combined multi-coupler system, according to one embodiment.

FIG. 1 illustrates an exploded view of a combined multi-coupler (CMC) system. The CMC includes a drive member 110, an adapter 120 of a tool, and a locking assembly 130.

The drive member 110 may be configured to connect to the top drive. The drive member 110 may be integral with the top drive or other traveling member. The drive member 110 includes a housing 111. The housing 111 may be tubular having a bore therethrough. The housing 111 may be configured to connect to the top drive at an upper longitudinal end thereof. The housing 111 may be integrally formed with the top drive. The bore of the housing 111 may be configured to fluidly couple the top drive to the adapter of the tool.

The housing 111 may include two or more sections 111a,b. The sections 111a,b may be integrally formed. The section 111a may be cylindrical in shape. The section 111a may include a window 113. The window 113 may be formed through the outer surface of the section 111a. The window 113 may be formed radially inward to the bore of the housing 111. The window 113 may extend longitudinally from an upper longitudinal end of the section 111b. Additional windows may be formed similar to window 113. The windows may be evenly spaced about a circumference of the housing 111. The section 111a may include a profile 112 formed on an outer surface thereof. The profile 112 may be disposed about a circumference of the section 111a. The profile 112 may have an outer diameter greater than an outer diameter of the section 111a. The profile 112 may be formed between adjacent windows. The profile 112 may be separated into sections by the windows. The profile 112 may have shoulders formed at opposite longitudinal ends thereof. A groove 114 may be formed about a circumference of the housing 111. The groove 114 may be formed between adjacent windows. The groove 114 may be disposed longitudinally between the profile 112 and a shoulder 115 of section 111b. The groove 114 may have an outer diameter equal to an outer diameter of the housing 111.

The housing 111 may include a bell section 111b. A recess may be formed in an inner wall of the bell section 111b below the window 113. The recess may extend longitudinally through the bell section 111b. An inner diameter of the recess may be greater than the inner diameter of the housing section 111a adjacent the window 113. The inner diameter of the recess may be substantially equal to an outer diameter of the housing section 111a. The bell section 111b may be located at a lower longitudinal end of the housing 111. The bell section 111b may be flared radially outward. The flare of the bell section 111b may begin longitudinally below the shoulder 115. The bell section 111b may include the shoulder 115 formed at an upper longitudinal end. The shoulder 115 may be disposed about an outer circumference of the bell section 111b. The shoulder 115 may have an outer diameter greater than the outer diameter of the section 111a.

The adapter 120 of the tool may be tubular having a bore therethrough. The bell section 111b may be configured to receive the adapter 120. The bore of the adapter 120 may be configured to transfer fluid between the drive member 110 and the tool, such as drilling fluid. The adapter 120 may include a lip 121 disposed at an upper longitudinal end. An outer diameter of the lip 121 may be smaller than an outer diameter of the adapter 120. The lip 121 may extend partially longitudinally down the adapter 120. The lip 121 may terminate above a tab 122 of the adapter 120. The tab 122 may be formed on an outer surface of the adapter 120. The tab 122 may project radially outward from the outer surface of the adapter 120. The adapter 120 may include additional tabs (two shown) formed on the outer surface and spaced circumferentially apart from the tab 122. The additional tabs may be spaced evenly around the circumference of the adapter 120. The window 113 may be configured to receive the tab 122 of the adapter 120. The additional tabs may correspond to and be received in the corresponding windows of the housing. Insertion of the tab 122 in the window 113 may torsionally couple the adapter 120 and the housing 111. The adapter 120 and the housing 111 may be bidirectionally torsionally coupled by the tab 122 and the window 113. The side walls of the window 113 may engage and transfer torque to the tab 122 of the adapter 120. A groove 123 may be formed in an outer surface of the tab 122. The groove 123 may be formed circumferentially through the tab 122. The groove 123 may extend radially inward through the tab 122. Shoulders 124a,b may be formed at each longitudinal end of the groove 123.

Figure 2:
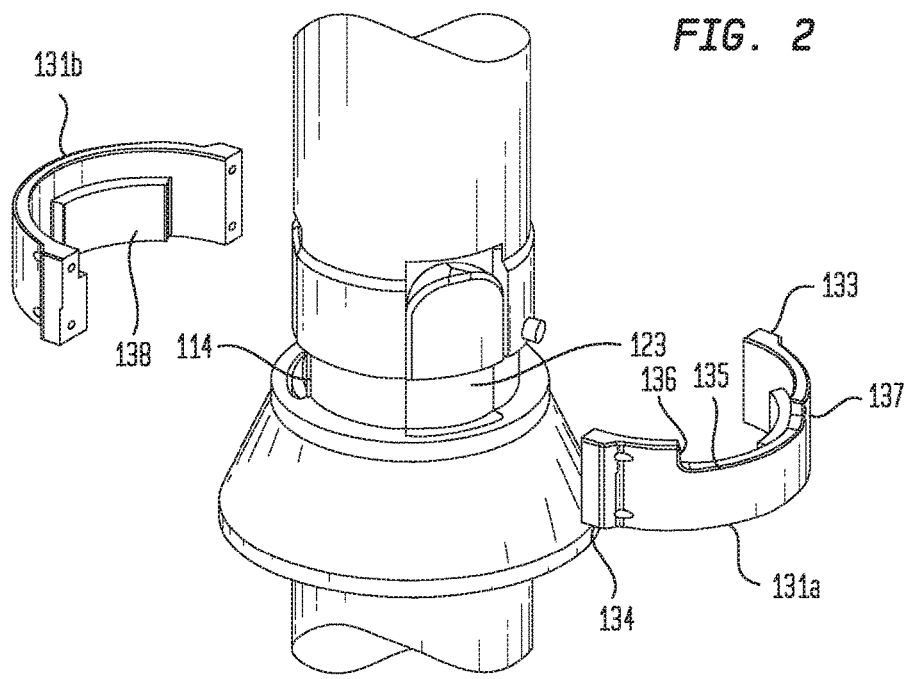
FIG. 2 illustrates an isometric view of the adapter inserted into the housing of the combined multi-coupler system.
Figure 3:
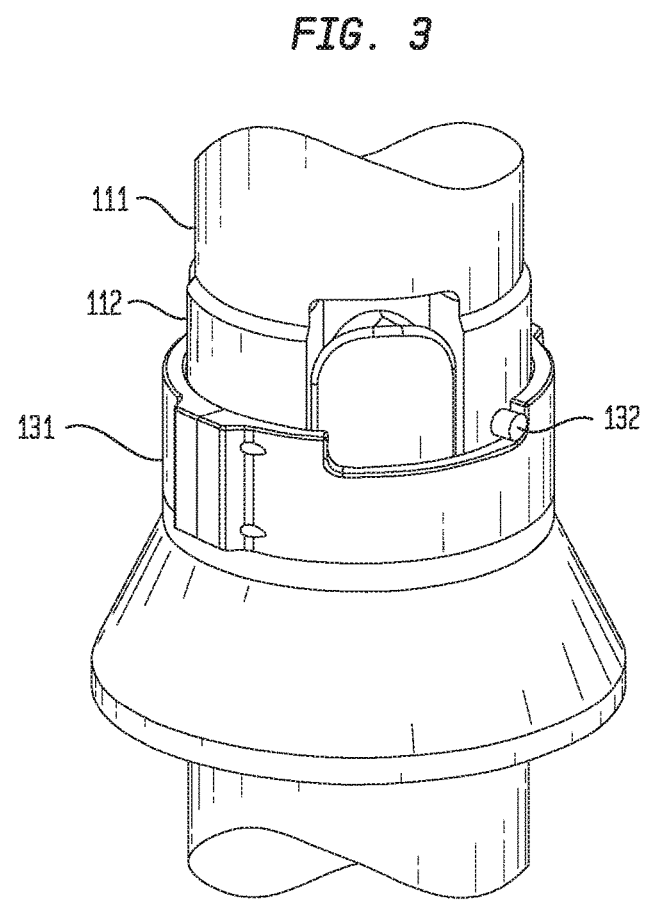
FIG. 3 illustrates an isometric view of the combined multi-coupler system in a locked position.

FIG. 2 illustrates reception of the adapter 120 in the bore of the housing 111 and the locking assembly 130 disassembled from the housing. FIG. 3 illustrates the locking assembly 130 assembled on the housing 111. The locking assembly 130 may include a lock member, such as lock ring 131, and a lock stop 132. The lock ring 131 may include two or more sections 131a,b. The section 131a may include flanges 133, 134. The flanges 133, 134 may be formed at opposite ends of the section 131a. The section 131b may include corresponding flanges. The flanges 133, 134 may have holes formed therethrough. The holes may be configured to receive fasteners. The fasteners may be configured to connect the sections 131a,b of the lock ring 131. A groove 135 may be formed partially about a circumference of the section 131a. The groove 135 may be formed at an upper end of the section 131a. The groove 135 may extend radially inward through the section 131a. The groove 135 may be u-shaped. Shoulders 136, 137 may be formed at opposite ends of the groove 135. The lock ring 131 may be configured to be disposed about a circumference of the housing 111. The lock ring 131 may include one or more tabs 138 disposed on an inner surface thereof. The lock ring 131 may be rotatable relative to the housing 111 and the adapter 120 between a locked position and an unlocked position. The groove 114 of the section 111a may be configured to receive the one or more tabs 138 in the unlocked position. The groove 123 of the adapter 120 may be configured to receive the one or more tabs 138 in the locked position.

The lock stop 132 may be formed on the outer surface of the housing 111. The lock stop 132 may be formed on the profile 112. The lock stop 132 may be a protrusion. The lock stop 132 may extend radially outward from the outer surface of the housing 111. The groove 135 may be configured to receive the lock stop 132. The shoulders 136, 137 of the lock ring 131 may engage the lock stop 132. The lock stop 132 may be configured to prevent further rotation of the lock ring 131. The lock ring 131 may be in the unlocked position when the shoulder 136 engages the lock stop 132. The lock ring 131 may be in the locked position when the shoulder 137 engages the lock stop 132.

FIGS. 4A and 4B illustrate cross-sectional views of the CMC 100. The section 111a may have an inner shoulder 116 formed on an inner surface of the section 111a. The inner shoulder 116 may be disposed above the window 113. The inner diameter of the housing 111 above the inner shoulder 116 may be greater than the inner diameter of the housing section 111a. The inner shoulder 116 may be configured to engage the lip 121 of the adapter 120. The housing 111 may include a recess formed through an inner surface. The recess may be configured to receive a seal 117. The recess may be formed above the window 113. The recess may be an annular recess. The seal 117 may be an elastomer. The seal 117 may be an annular seal. The seal 117 may be configured to seal against an outer surface of the adapter 120. The seal 117 may prevent fluid from leaking from the bore of the housing 111.

FIG. 4A illustrates the CMC 100 with the lock ring 131 in the unlocked position. FIG. 4B illustrates the CMC 100 with the lock ring 131 in the locked position. The CMC 100 is operable to torsionally and longitudinally couple the top drive to the tool. First, the adapter 120 of the tool is inserted into the bore of the housing 111. The adapter 120 may be raised or the housing 111 lowered to begin the process. As the adapter 120 is inserted into the bore of the housing 111, the tab 122 and window 113 assist in alignment. The tab 122 of the adapter 120 moves upward through the recess of the bell section 111b. The tab 122 of the adapter 120 is inserted into the window 113. The tab 122 of the adapter is disposed between the side walls of the window 113. The adapter 120 continues moving longitudinally upwards through the bore of the housing 111. Engagement of the lip 121 of the adapter 120 and the inner shoulder 116 of the housing 111 prevents further longitudinal movement of the adapter 120. Seal 117 provides a sealing engagement against the outer surface of the adapter 120. Seal 117 prevents fluid from escaping the bore of the housing 111 and the bore of the adapter 120. Engagement of the tab 122 and the side walls of the window 113 provide torsional coupling between the housing 111 and the adapter 120.

Next, the lock ring 131 is placed around the housing 111 and the adapter 120 to longitudinally couple the housing 111 and the adapter 120. Fasteners may be inserted through the holes of the flanges 133, 134 (FIG. 2) to assemble the sections 131a,b of the lock ring 131. Alternatively, the lock ring 131 may already be assembled on the outer surface of the housing 111. The lock ring 131 is in the unlocked position shown in FIG. 4A during insertion of the adapter 120 in the bore of the housing 111. The tab 138 is disposed in the groove 114 in the unlocked position. The lock ring 131 is rotated to move the tab 138 into the groove 123 of the adapter tab 122. Engagement of the lock ring tab 138 and the shoulders 136, 137 of the tab 122 provides longitudinal coupling between the housing 111 and the adapter 120. The lock stop 132 moves through the groove 135 during rotation of the lock ring 131. The lock stop 132 engages the shoulder 131b of the lock ring 131. Engagement of the lock stop 132 and the shoulder 131b of the lock ring 131 prevents further rotation of the lock ring 131. When the lock stop 132 engages the shoulder 131b of the lock ring 131, the lock ring tab 138 is disposed in the groove 123 of the adapter tab 122 and the lock ring 131 is in the locked position.

In order to decouple the top drive and the tool, the lock ring 131 is rotated relative to the housing 111 and the adapter 120. The lock ring 131 is rotated to the unlocked position. The lock stop 132 moves through the groove 135 of the lock ring 131 during rotation of the lock ring 131. The lock stop 132 engages the shoulder 131a of the lock ring 1 to prevent further rotation. The lock ring tab 138 moves out of the groove 123 of the adapter tab 122 as the lock ring 131 rotates. Movement of the lock ring tab 138 out of the groove 123 of the adapter tab 122 longitudinally decouples the adapter 120 and the housing 111. The adapter 120 is then removed from the bore of the housing 111. The tab 122 of the adapter 120 is lowered and removed from the window 113 of the housing 111. Movement of the tab 122 of the adapter 120 out of the window 113 torsionally decouples the adapter 120 and the housing 111.

FIG. 5 illustrates a CMC system 200, according to a second embodiment. The CMC 200 may include a drive member 210, a latch assembly 220, and an adapter 230 of a tool. The drive member 210 may be configured to connect to the top drive or other traveling member. The drive member 210 may be integrally formed with the top drive. The drive member may include a housing 211. The housing 211 may be tubular having a bore therethrough. The housing 211 may be integrally formed with the top drive. The housing 211 may have an annular flange 211*f* formed at a longitudinal end thereof. The inner diameter of the annular flange 211*f* may be smaller than an inner diameter of the bore of the housing 211. The flange 211*f* may have an opening at a lower longitudinal end. The opening may be configured to receive the adapter 230 of the tool. The opening may extend longitudinally upward into the bore of the housing 211. An annular shoulder 211*s* may be formed on an inner surface of the flange 211*f*. The annular shoulder may be formed adjacent the opening of the flange 211*f*. The annular shoulder may extend radially inward from the flange 211*f*. The annular shoulder 211*s* may be configured to receive bearings 212, 213 on opposite longitudinal ends.

A coupling member 214 may be at least partially disposed in the bore of the housing 211. The coupling member 214 may be at least partially disposed through the annular flange 211*f* of the housing 211. The coupling member 214 may be tubular having a bore therethrough. The coupling member 214 may be rotatable relative to the housing 211. The coupling member 214 may have an annular flange 214*f* at an upper longitudinal end. A tab 215 may be formed on an inner circumference of the coupling member 214. The tab 215 may extend radially inward. The tab may be formed below the flange. The tab 215 may be integrally formed with the coupling member 214. The tab 215 may include tapered surfaces at opposite longitudinal ends. The bearing 212 may be configured to support the coupling member 214. The bearing 212 may be disposed longitudinally between the coupling member 214 and the shoulder 211*s*. The bearing 212 may be disposed radially between the flange 211*f* and the coupling member 214. The bearing 212 may transfer the weight of the coupling member 214 through the shoulder 211*s* and to the housing 211. The bearing 212 may be configured to permit rotation of the coupling member 214 relative to the housing 211. The coupling member 214 may be rotated by an actuator, such as an electric motor, of the top drive.

The adapter 230 of the tool may be tubular having a bore therethrough. The adapter 230 may be configured to fluidly couple the top drive and the tool. The adapter 230 may have a recess 231 formed in an outer circumference of the adapter. The recess 231 may be configured to receive the corresponding tab 215 of the coupling member 214. Reception of the tab 215 in the recess 231 may torsionally couple the coupling member 214 and the adapter 230. The tab 215 and the recess 231 may bidirectionally torsionally couple the coupling member 214 and the adapter 230. The adapter 230 may have a key profile 232 formed at an upper longitudinal end thereof. The key profile 232 may be formed around an outer circumference of the adapter 230. The key profile 232 may include a plurality of grooves formed radially inward from the outer circumference of the adapter 230. The plurality of grooves may extend partially around the circumference of the adapter 230. The key profile 232 may include a plurality of shoulders separated by the plurality of grooves.

The latch assembly 220 may include a wedge 221 and an actuator. The wedge 221 may be disposed on the coupling member 214. The wedge 221 may be disposed at an upper longitudinal end of the coupling member 214. The wedge 221 may rest on an upper surface of the flange 214*f* of the coupling member. The wedge 221 may have a wedge profile 222 formed on an inner surface. The key profile 232 may correspond to and be configured to receive the wedge profile 222. The wedge 221 may be disposed about the circumference of the adapter 230, when the adapter 230 is inserted into the bore of the coupling member 214. The wedge 221 may have a groove 223 formed in an outer surface opposite from the wedge profile 222. The groove 223 may be configured to receive a tensioning member, such as a chain 224. The wedge 221 may be radially movable between an engaged position and a disengaged position. In the engaged position, the key profile 232 may receive and engage the wedge profile 222. The wedge profile 222 may be configured to support a weight of the adapter 230 and the tool. The wedge 221 may transfer the weight of the adapter 230 and the tool to the coupling member 214. In the engaged position, the wedge profile 222 and key profile 232 may be configured to longitudinally couple the adapter 230 and the coupling member 214.

Figure 6:
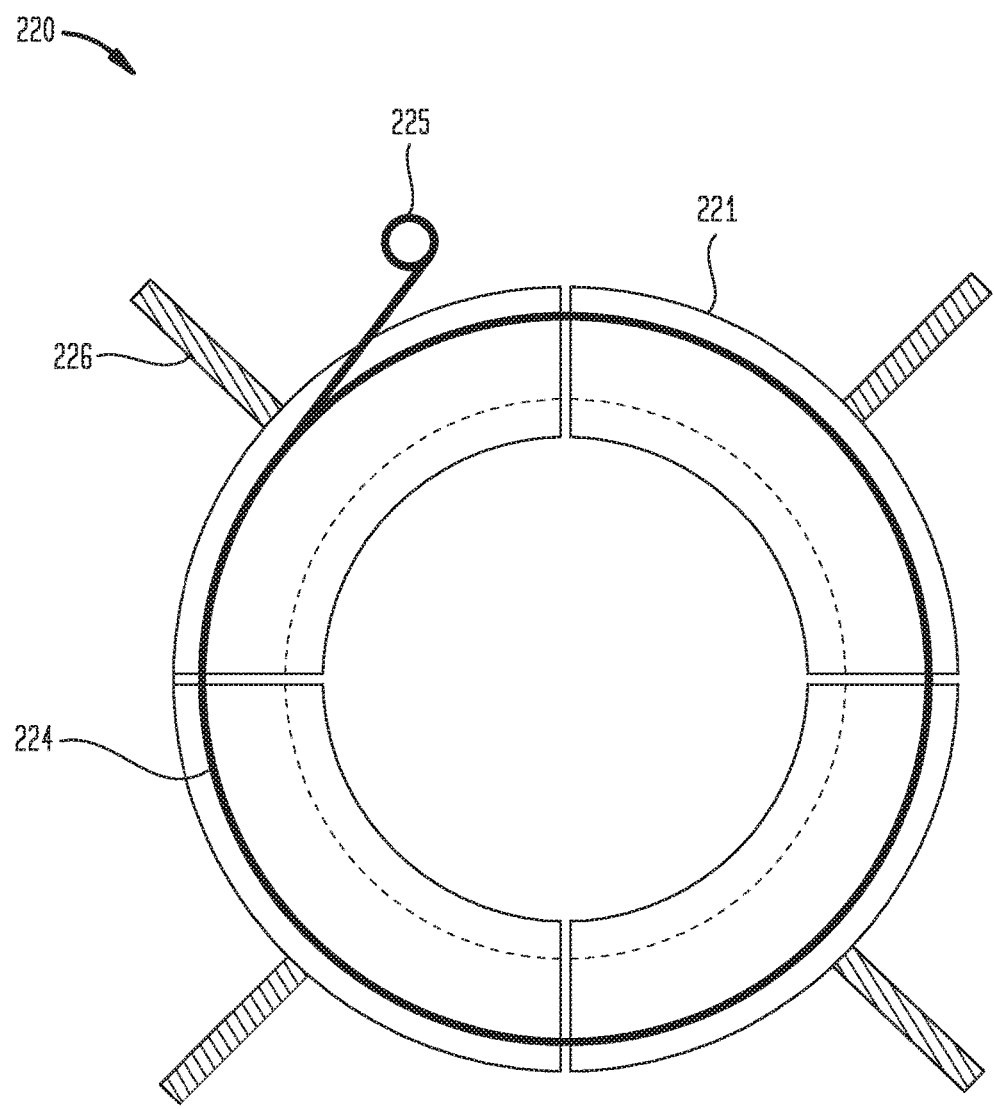
FIG. 6 illustrates a top-down view of the latch assembly.

FIG. 6 illustrates a top down view of the latch assembly 220. The wedge 221 may be an arcuate segment disposed about a circumference of the adapter 230. Additional wedges may be spaced evenly about the adapter 230 and may be similar to the wedge 221. The chain 224 may extend through the groove 223 of the wedge 221. The chain 224 may extend through the grooves of the additional wedges. The chain 224 may be connected at one end to the actuator, such as tensioner spool 225. The tensioner spool 225 may be configured to move the wedge 221 to the engaged position. Increasing the tension on the chain 224 with the tensioner spool 225 may cause the chain 224 to contract in length and move the wedges radially inward to the engaged positon. Biasing members may be disposed about the circumference of the adapter 230 adjacent the key profile 232. The biasing members may be configured to bias the wedges to the disengaged position.

The adapter 230 may have a shoulder 233 formed on an outer surface. The shoulder 233 may be configured to engage a lower longitudinal end of the coupling member 214. The shoulder 233 may prevent further upward longitudinal movement of the adapter 230 within the bore of the coupling member 214. The shoulder 233 may be configured to longitudinally align the key profile 232 and the wedge profile 222. The shoulder 233 may be configured to longitudinally align the recess 231 and the tab 215.

Alternatively, a linear actuator, such as a piston and cylinder assembly 226, may be configured to move the wedges between the engaged position and the retracted position. The cylinder may be attached at one end to the coupling member 214. The piston and cylinder assembly 226 may rotate relative to the housing 211. The cylinder may receive a hydraulic fluid supply from the top drive. The piston may be received in the cylinder and may be movable between an extended and retracted position by the hydraulic fluid. A piston rod may be connected to the piston at one end and the wedge 221 at another end. The piston rod may transfer the movement of the piston to the wedge 221. Actuation of the piston and cylinder assembly 226 may move the wedge 221 radially inward to the engaged position.

The CMC 200 is operable to torsionally and longitudinally couple the top drive to the tool. First, the adapter 230 of the tool is inserted into the bore of the coupling member 214. Engagement of the coupling member 214 with the shoulder 233 of the adapter 230 prevents further upward longitudinal movement of the adapter 230 relative to the coupling member 214. Engagement of the coupling member 214 with the shoulder 233 of the adapter 230 serves to align the tab 215 and the recess 231. Engagement of the coupling member 214 with the shoulder 233 of the adapter 230 serves to align the key profile 232 and the wedge profile 222. The tab 215 is inserted into the recess 231 of the adapter, thereby torsionally coupling the adapter 230 and the coupling member 214. The tab 215 transfers torque from the coupling member 214 to the adapter 230 through the engagement with the side walls of the recess 231. The piston and cylinder assembly 226 is actuated to move the wedge 221 into the engaged position. The piston and cylinder assembly 226 is actuated to extend the wedge profile 222 into engagement with the key profile 232. The wedge profile 222 engages the key profile 232, thereby longitudinally coupling the adapter 230 and the coupling member 214. The wedge profile 222 transfers the weight of the adapter 230 and the tool to the coupling member 214 during engagement with the key profile 232.

In order to decouple the tool, the piston and cylinder assembly 226 is actuated to retract the wedge 221 from the key profile 232. The piston and cylinder assembly 226 moves the wedge 221 to the disengaged position. Disengagement of the wedge profile 222 from the key profile 232 longitudinally decouples the adapter 230 and the coupling member 214. The adapter 230 is then lowered relative to the housing 211. The tapered surface of the tab 215 forces the tab out of the recess 231. Disengagement of the tab 215 and the recess 231 torsionally decouples the adapter 230 and the coupling member 214.

Alternatively, the chain 224 and tensioner spool 225 may be used to extend and retract the wedge between the engaged position and the disengaged position.

Figure 7:
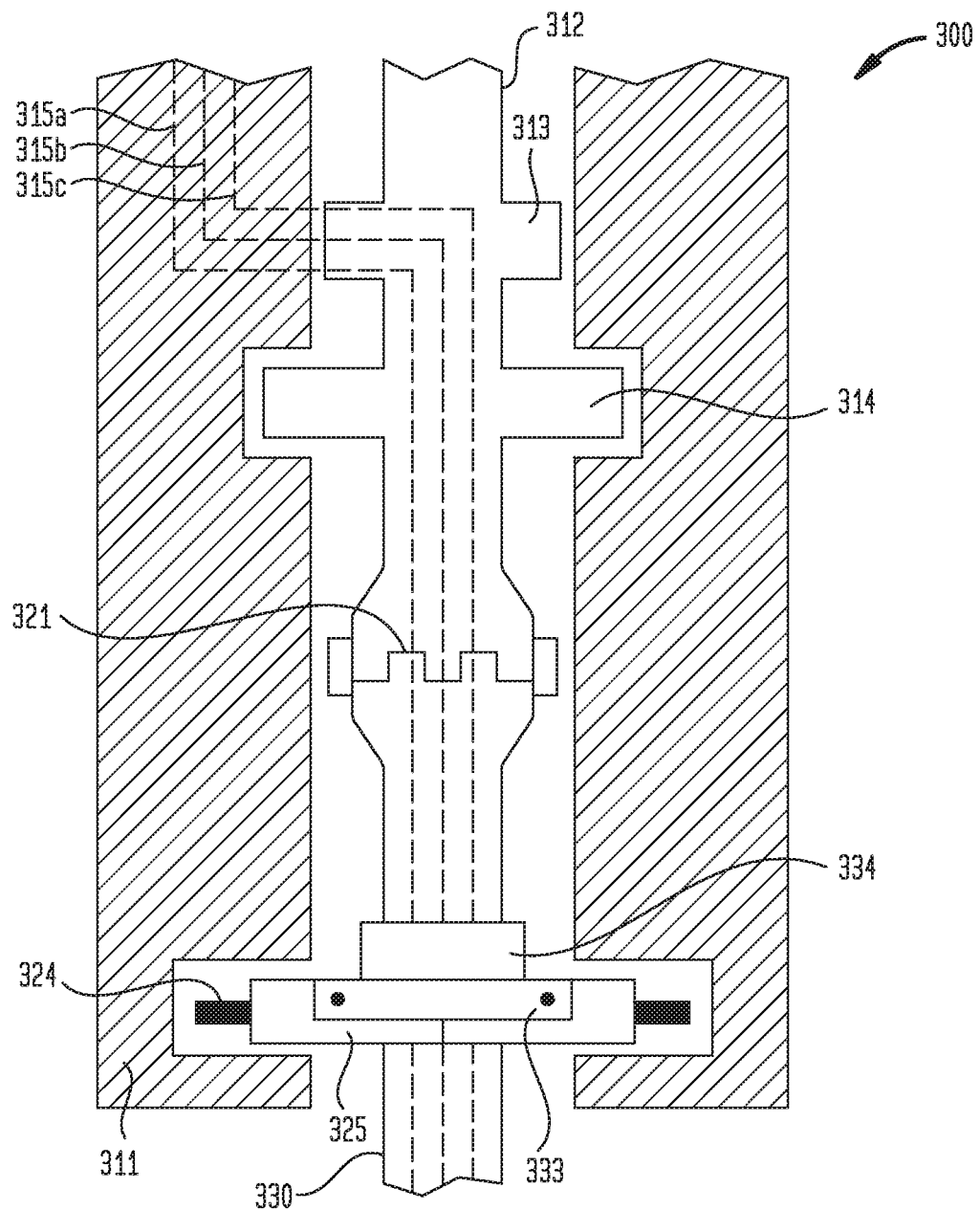
FIG. 7 illustrates a cross-sectional view of a drive member, a coupling assembly, and an adapter of a combined multi-coupler, according to a third embodiment.

FIG. 7 illustrates a CMC system 300, according to a third embodiment. The CMC system 300 may include a drive member 310, a coupling assembly, and an adapter 330 of a tool. The drive member 310 may be configured to connect to the top drive or other traveling member. The drive member may be integrally formed with the top drive. The drive member 310 may include a stationary portion and rotational portion. The stationary portion of the drive member 310 may include a housing 311. The housing 311 may be tubular having a bore therethrough. The housing 311 may have an opening at a lower longitudinal end thereof. The opening and the bore of the housing 311 may be configured to receive the adapter 330 of the tool.

The rotational portion of the drive member 310 may include a quill 312 and a utility transfer assembly 313, such as a slip ring assembly and/or a hydraulic swivel. The quill 312 of the drive member 310 may be disposed in the bore of the housing 311. The quill 312 of the drive member 310 may be tubular having a bore therethrough. The quill 312 may be rotatable relative to the housing 311. The quill 312 may include a utility transfer section and a drive stem 314. The drive stem 314 may be configured to provide torque to the quill 312. The drive stem 314 may include a geared surface. The drive stem 314 may be configured to connect to an actuator, such as an electric motor. The electric motor may be configured to transfer torque to the drive stem 314 to rotate the quill 312.

The utility transfer assembly 313 may be disposed on the quill 312. The utility transfer assembly 313 may be disposed on the quill 312 at the utility transfer section. The utility transfer assembly 313 may be configured to transfer power, data, electronic, hydraulics, and/or pneumatics between the stationary and rotational parts of the drive member 310, such as between the housing 311 and the quill 312. The slip ring assembly may include a ring member having one or more contact rings (such as copper rings) that rotate with the quill 312. The slip ring assembly may include a support housing for supporting one or more contact members (such as brushes) that are non-rotatively coupled to the housing 311. The non-rotating contact members contact the contact rings of the rotating ring member, thereby providing an electrical connection across a rotating interface. In this manner, electronic signals may be sent between the top drive and tool. One or more utility supply lines 315a-c may be disposed along the housing 311. The one or more utility supply lines 315a-c may connect to the utility transfer assembly 313 at one end.

FIG. 8 illustrates the coupling assembly. The coupling assembly may include a torque profile 321 and a utility connector. The torque profile 321 may be configured to engage a corresponding profile of the adapter 330. The utility connector may be disposed adjacent the torque profile 321. The utility connector may be configured to transfer power, data, electronic, hydraulics, and/or pneumatics between the quill 312 and the adapter 330. The coupling assembly may include a groove formed about a circumference of the quill 312. The groove may be configured to receive a lock member, such as a locking ring 323. The locking ring 323 may be configured to engage and lock the quill 312 to the adapter 330.

The adapter 330 of the tool may be tubular having a bore therethrough. The adapter 330 may have a profile 331 corresponding to the torque profile 321. The profile 331 may be formed at an upper longitudinal end of the adapter 330. The profile 331 of the adapter 330 may be configured to receive and engage the torque profile 321. The profile 331 of the adapter 330 and the torque profile 321 may be configured to transfer torque between the quill 312 and the adapter 330. The profile 331 of the adapter 330 and the torque profile 321 may bidirectionally torsionally couple the adapter 330 and the quill 312. A groove 332 may be formed about an outer circumference of the adapter 330. The groove 332 may be configured to receive the locking ring 323 and lock the quill 312 to the adapter 330. A utility receiver may be formed at an upper longitudinal end of the adapter 330. The utility receiver may be formed adjacent the profile 331 of the adapter 330. The utility receiver may be configured to connect to the utility connector. The utility receiver and utility connector may be configured to transfer power, data, electronic, hydraulics, and/or pneumatics between the quill 312 and the adapter 330.

FIG. 9 illustrates a support plate 333 of the adapter 330. The support plate 333 may be disposed about a circumference of the adapter 330. The support plate 333 may be rectangular in shape. The support plate 333 may include a bore formed longitudinally therethrough. The bore of the support plate 333 may be configured to receive the adapter 330. The bore of the support plate 333 may be greater than the outer circumference of the adapter 330. A bearing 334 may be disposed in the bore of the support plate 333. The bearing 334 may be disposed radially between the support plate 333 and the adapter 330. The bearing 334 may be configured to permit rotation of the adapter 330 relative to the support plate 333. One or more holes 335 may be formed in an outer wall of the support plate 333.

FIG. 10 illustrates a support assembly of the coupling assembly. The support assembly may be disposed in the bore of the housing 311. The support assembly may be disposed adjacent the opening of the housing 311. The support assembly may include an actuator, such as a piston and cylinder assembly 324, and a locking plate 325. The locking plate 325 may be configured to support a weight of the adapter 330 and the tool. The locking plate 325 may include two sections 325a,b, shown in FIG. 11A. A corresponding piston and cylinder assembly 324 may be connected to each of the two sections 325a,b. The piston and cylinder assembly 324 may be configured to move the sections 325a,b between an engaged position and a disengaged position. The locking plate 325 may have a bore formed therethrough. The bore may be configured to receive the adapter 330 of the tool. A recess 326 may be formed in an upper surface of the locking plate 325. The recess 326 may be configured to receive the support plate 333 of the adapter 330. One or more locking pins 327 may be disposed in an inner wall of the locking plate 325 adjacent the recess 326. The holes 335 of the support plate 333 may be configured to receive the corresponding locking pins 327. The support plate 333 may transfer the weight of the adapter 330 and the tool to the locking plate 325. The locking plate 325 may longitudinally couple the adapter 330 and the drive member 310.

FIG. 11A illustrates the drive member 310 and the adapter 330 in the uncoupled position. FIG. 11B illustrates the drive member 310 and the adapter 330 in the coupled position. In operation, the adapter 330 may be inserted through the opening and into the bore of the housing 311. Engagement of the torque profile 321 with the profile 331 of the adapter 330 may prevent further longitudinal movement of the adapter 330 in the bore of the housing 311. The lock ring 323 is inserted into the groove 332 of the adapter 330. The torque profile 321 and the profile 331 of the adapter 330 torsionally couple the adapter 330 and the quill 312. The utility connector and utility receiver are connected during engagement of the torque profile 321 and the profile 331 of the adapter 330. Actuation of the piston and cylinder assembly 324 moves the sections 325a,b of the locking plate 325 inward towards the support plate 333 of the adapter 330. The sections 325a,b of the locking plate 325 move into the engaged position. The recess 326 of the locking plate 325 receives the support plate 333 of the adapter 330. The locking pins 327 of the locking plate 325 are actuated outwards towards the support plate 333. The locking pins 327 are received in the holes 335 of the support plate 333. The locking plate 325 transfers the weight of the adapter 330 and the tool to the housing 311. The locking plate 325 and support plate 333 longitudinally couple the adapter 330 and the housing 311.

In order to decouple the top drive and the tool, the piston and cylinder assembly 324 is actuated to move the locking plate 325 to the disengaged position to longitudinally decouple the adapter 330 and the housing 311. The support plate 333 is no longer disposed in the recess of the locking plate 325. The locking pins 327 retract out of the holes 335 of the support plate 333. The lock ring 323 is removed from the groove 332 of the adapter 330. The adapter 330 is lowered longitudinally relative to the quill 312 to disengage the profile 331 of the adapter 330 from the torque profile 321. Disengagement of the profile 331 of the adapter 330 from the torque profile 321 torsionally decouples the adapter 330 and the quill 312.

Figure 12:
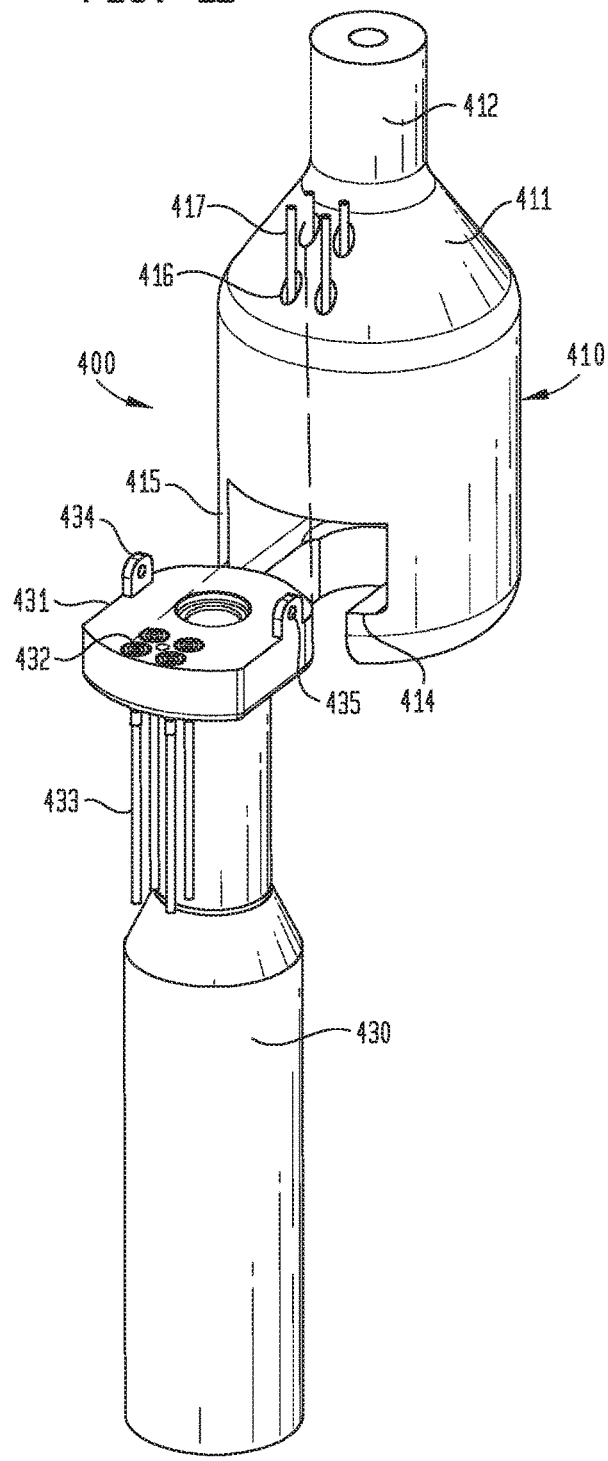
FIG. 12 illustrates a drive member and an adapter of a combined multi-coupler system, according to a fourth embodiment.

FIG. 12 illustrates an isometric view of a CMC system 400, according to a fourth embodiment. The CMC 400 may include a drive member 410 of a top drive, a coupling assembly 420, and an adapter 430 of a tool. The drive member 410 may include the housing 411 and a quill 412. The housing 411 may be tubular having a bore therethrough. The housing 411 may be configured to connect to the top drive or other traveling member. The housing 411 may be integral with the top drive. The housing 411 may have an inner recess 413 formed therein. The recess 413 may include a straight portion and a substantially semi-circular portion. The recess 413ss may be larger than the bore of the housing 411. A shoulder 414 may be formed at a lower longitudinal end of the recess 413. The shoulder 414 may extend inward from the housing 411. The shoulder 414 may extend along the straight portion and the substantially semi-circular portion of the recess 413.

The housing 411 may have a window 415 formed substantially horizontally or laterally through an outer wall. The window 415 may be formed at an angle relative to a horizontal axis of the housing 411. The window 415 may be formed at an angle about 30 degrees or less from the horizontal axis of the housing 411. The window 415 may extend inward to the recess 413 of the housing 411. The window 415 may have an upper rectangular section and a lower rectangular section. The upper rectangular section may extend longitudinally upwards from the shoulder 414. The lower rectangular section may extend longitudinally downwards through a bottom of the housing 411. The lower rectangular section of the window 415 may be disposed between opposite ends of the shoulder 414. The housing 411 may have one or more channels 416 formed through an outer wall thereof. The channels 416 may be formed longitudinally through the housing 411. The channels 416 may be configured to receive one or more supply lines 417 from the top drive. The supply lines 417 may be configured to supply at least one of power, data, electric, pneumatics, and/or hydraulics.

Figure 13A:
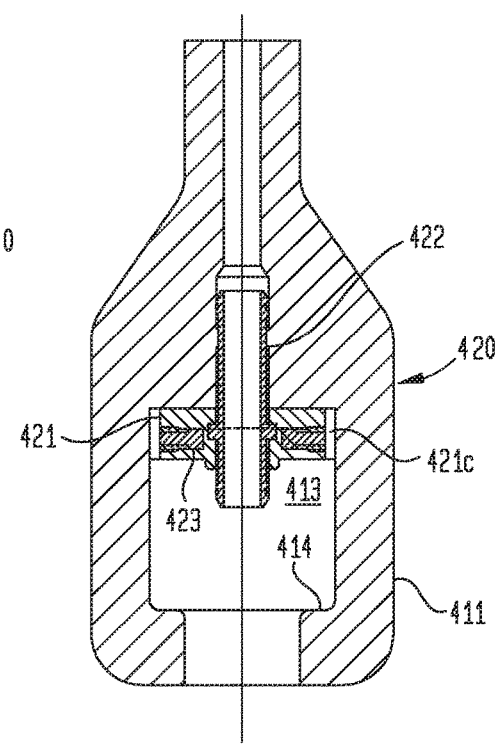
FIG. 13A illustrates a cross-sectional view of the housing of the drive member.
Figure 13B:
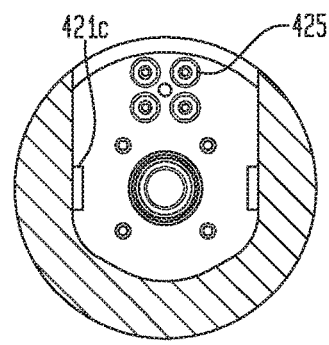
FIG. 13B illustrates a bottom-up view of a cross-section of the housing of the drive member.
Figure 13C:
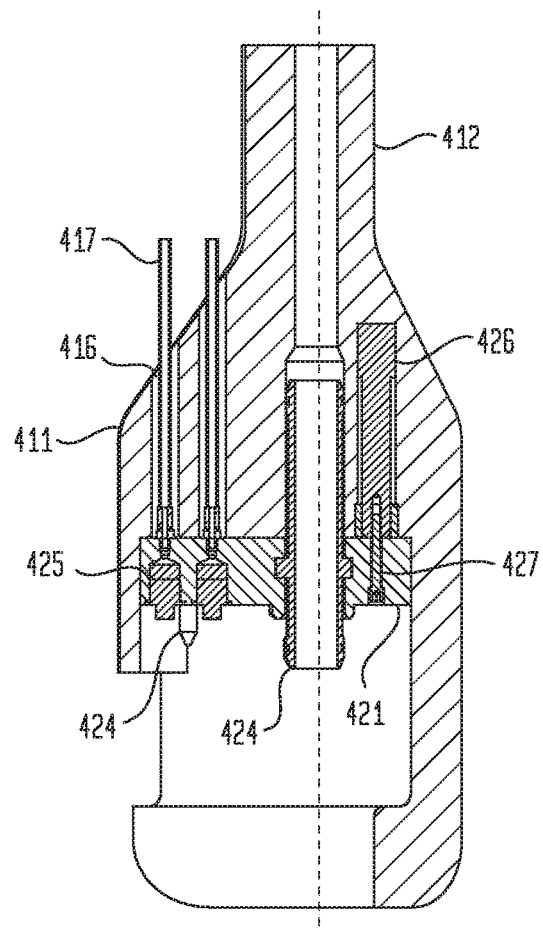
FIG. 13C illustrates another cross-sectional view of the housing of the drive member.

FIGS. 13A-C illustrate a cross-sectional view of the coupling assembly 420. The coupling assembly 420 may include a lock plate 421, a sleeve 422, one or more lock bolts 423, a compensation assembly, one or more alignment members, such as alignment pin 424, and one or more utility connectors 425. The lock plate 421 may be disposed in the recess 413 of the housing 411. The lock plate 421 may be longitudinally movable relative to the housing 411. The lock plate 421 may be u-shaped. The lock plate 421 may have a bore therethrough. The bore of the lock plate 421 may be aligned with the bore of the housing 411. The lock plate 421 may include a groove. The groove may be an annular groove. The groove may be formed adjacent the bore of the lock plate 421. The groove may be disposed in a circumference of the bore of the lock plate 421. The lock plate 421 may include a lip formed around the bore of the lock plate 421 and at a lower longitudinal end of the lock plate 421. The lip may extend longitudinally downward from the lock plate 421. The lip may be an annular lip. The lock plate 421 may include one or more recesses. The one or more recesses may be formed inward from a side wall of the lock plate 421. The one or more recesses may be formed through opposite side walls of the lock plate 421. The lock plate 421 may include one or more channels 421c. The channels 421c may be formed longitudinally through an outer surface of the lock plate 421. The one or more recesses may be formed through a side wall adjacent the channels 421c.

The sleeve 422 may be tubular having a bore therethrough. The sleeve 422 may include an annular shoulder disposed about an outer circumference of the sleeve 422. The sleeve 422 may be disposed in the bore of the lock plate 421. The sleeve 422 may extend through the bore of the lock plate 421. The groove of the lock plate 421 may be configured to receive the annular shoulder of the sleeve 422. The sleeve may be at least partially disposed in the bore of the housing 411. The sleeve 422 may be longitudinally movable with the lock plate 421 relative to the housing 411. The sleeve 422 may be configured to transfer fluid from the bore of the housing 411 to a bore of the adapter 430. The sleeve 422 may include one or more seals disposed about an outer circumference. The one or more seals may be configured to engage and seal against the bore of the adapter 430 and the bore of the housing 411. The one or more seals may be configured to prevent fluid from leaking out of the bore of the housing 411 and the bore of the adapter 430.

One or more lock bolts 423 may be disposed in the one or more recesses of the lock plate 421. The lock bolts 423 may be movable between an extended position and a retracted position relative to the recess. The one or more lock bolts 423 may be movable in a direction perpendicular to the longitudinal axis of the bore of the lock plate 421. An actuator, such as a piston and cylinder assembly may be disposed in the one or more recesses of the lock plate 421. The piston and cylinder assembly may be configured to move the one or more lock bolts 423 between the extended and the retracted position. The piston and cylinder assembly may be configured to move the lock bolts 423 into the channels 421c.

The compensation assembly may include an actuator, such as piston and cylinder assembly 426 and a fastener 427. The housing 411 may include a piston chamber. The piston chamber may be formed longitudinally through the housing 411. The piston and cylinder assembly 426 may be disposed in the piston chamber. The piston and cylinder assembly 426 may be configured to move longitudinally relative to the housing 411. The piston and cylinder assembly 426 may be configured to actuate the lock plate 421. The piston and cylinder assembly 426 may be connected to the fastener 427 at a lower longitudinal end. The fastener 427 may be connected to the lock plate 421 at an opposite longitudinal end from the piston and cylinder assembly 426. The fastener 427 may longitudinally couple the lock plate 421 and the piston and cylinder assembly 426. The piston and cylinder assembly 426 may be configured to reduce the amount of weight set down on the threads of the tubular string during connection with a tubular string. The piston and cylinder assembly 426 may be configured to compensate for the downward travel of the top drive and the tool due to the threaded makeup to the tubular string.

The alignment pin 424 may be disposed in the lock plate 421. The alignment pin 424 may extend longitudinally downward from a lower surface of the lock plate 421. The alignment pin 424 may have a conical lower end. The alignment pin 424 may be configured to facilitate alignment of the lock plate 421 and the adapter 430. One or more utility connectors 425 may be configured to connect to the one or more supply lines 417 at an upper longitudinal end. The one or more utility connectors 425 may be formed through the lock plate 421. The one or more utility connectors 425 may extend longitudinally downward from the lower surface of the lock plate 421. The one or more utility connectors 425 may be configured to receive and transfer at least one of power, data, electric, pneumatics, and/or hydraulics.

Referring back to FIG. 12, the adapter 430 may be tubular having a bore therethrough. The bore of the adapter 430 may be configured to receive the lip of the lock plate 421. The bore of the adapter 430 may be configured to receive the sleeve 422. The adapter 430 may be integrally formed with the tool. The adapter 430 may be configured to be inserted substantially horizontally or laterally into the housing 411. The adapter 430 may be configured to be inserted substantially horizontally or laterally through the window 415 of the housing 411 into the recess 413. The adapter 430 may be configured to be inserted laterally through the window 415 at an angle. The adapter 430 may be configured to be inserted laterally at an angle about thirty degrees or less relative to a horizontal axis of the housing 411. The adapter 430 may have a head section 431 formed at an upper longitudinal end. The head section 431 may be u-shaped. The head section 431 may be configured to be received in the recess 413 of the housing 411. The shoulder 414 may be configured to engage the head section 431 and support the weight of the adapter 430 and the tool. Engagement of the shoulder 414 and the head section 431 may longitudinally couple the adapter 430 and the housing 411.

The head section 431 may have one or more tabs 434 formed at an upper longitudinal end. The tabs 434 may have a hole 435 formed therethrough. The hole 435 may be perpendicular to the bore of the adapter 430. The hole 435 may be configured to receive the lock bolt 423 in the extended position. The channels 421c may be configured to receive the tabs 434. Reception of the lock bolt 423 in the hole 435 may longitudinally couple the adapter 430 and the lock plate 421. The piston and cylinder assembly 426 may be configured to longitudinally move the adapter 430 relative to the housing 411. The piston and cylinder assembly 426 may be configured to compensate for the weight of the adapter 430 and the tool during makeup to the tubular string.

Figure 14:
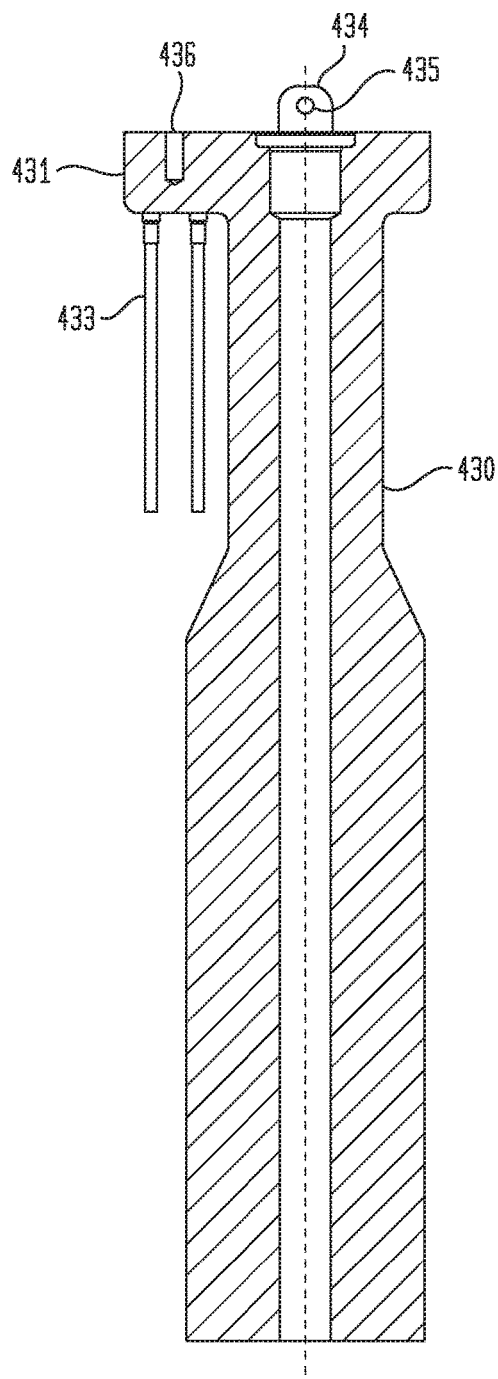
FIG. 14 illustrates a cross-sectional view of the adapter.

The head section 431 may include one or more utility receivers 432 formed longitudinally therethrough. The utility receivers 432 may connect to one or more supply lines 433. The supply lines 433 may connect to the tool. The utility receivers 432 may be configured to connect to the utility connectors 425. The utility receivers 432 may be configured to transfer power, data, electronic, pneumatics, and/or hydraulics between the top drive and the tool when connected to the utility connectors 425. The head section 431 may have one or more channels disposed longitudinally therethrough. The channels may be configured to receive the supply lines 433. FIG. 14 illustrates a cross-sectional view of the adapter 430. The head section 431 may include an alignment recess 436. The alignment recess 436 may be configured to receive the alignment pin 424. The alignment recess 436 may be formed longitudinally downward through the head section 431. The alignment recess 436 and alignment pin 424 may be configured to align the lock plate 421 and the adapter 430.

Figure 15A:
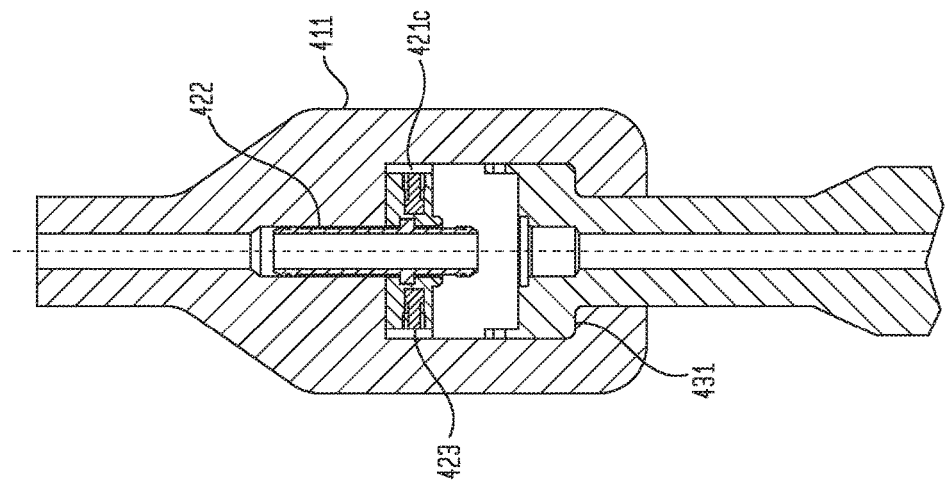
FIGS. 15A-C, 16A-C, and 17A-B illustrate cross-sectional views of the operation of the combined multi-coupler, according to the fourth embodiment.
Figure 15B:
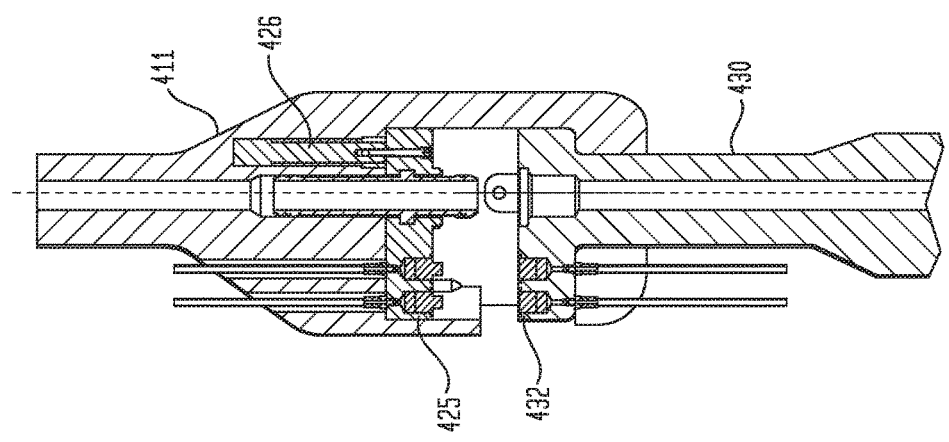
Figure 15C:
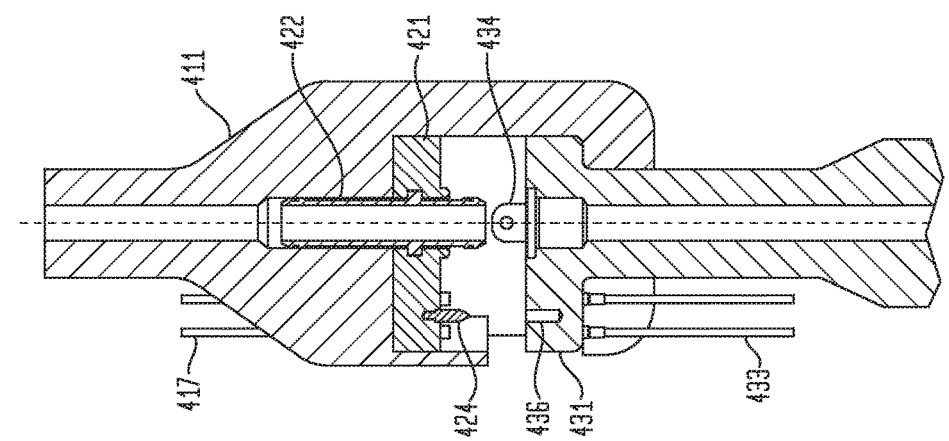

FIGS. 15A-C, 16A-C, and 17A-B illustrate cross-sectional views of the operation of the CMC 400. The CMC 400 is operable to torsionally and longitudinally couple the top drive to the tool. Referring to FIGS. 15A-C, the adapter 430 is inserted into the recess 413 of the housing 411. The tool having the adapter 430 is moved adjacent to the top drive. The adapter 430 is inserted substantially horizontally or laterally through the window 415 of the housing 411. The adapter 430 may be inserted at an angle about thirty degrees or less relative to a horizontal axis of the housing 411. The adapter 430 rests on the shoulder 414 of the housing 411. Engagement of the adapter 430 with the back wall of the recess 413 prevents further horizontal or lateral movement of the adapter 430 through the housing 411. The shoulder 414 supports the weight of the adapter 430 and the tool. Engagement of the side walls of the recess 413 with the head section 431 provides torque transfer to the adapter 430 and the tool when the housing 411 is rotated by the top drive.

Figure 16C:
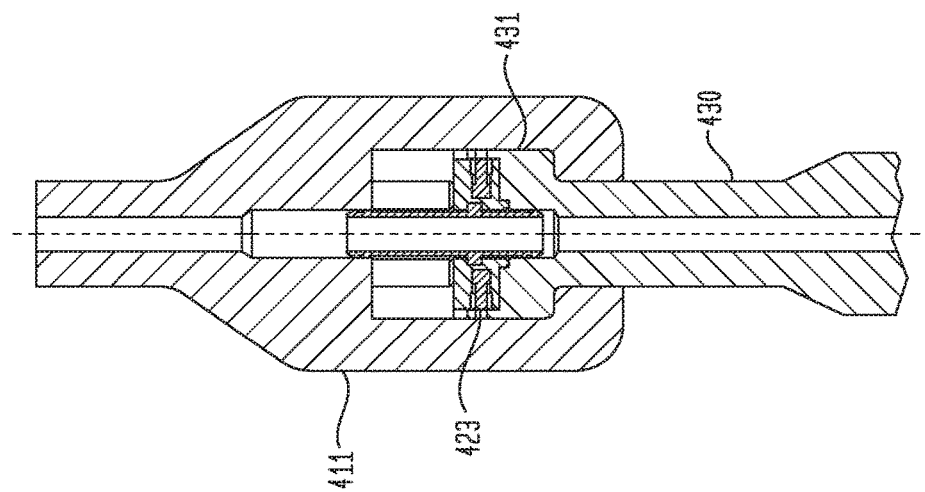
Figure 16B:
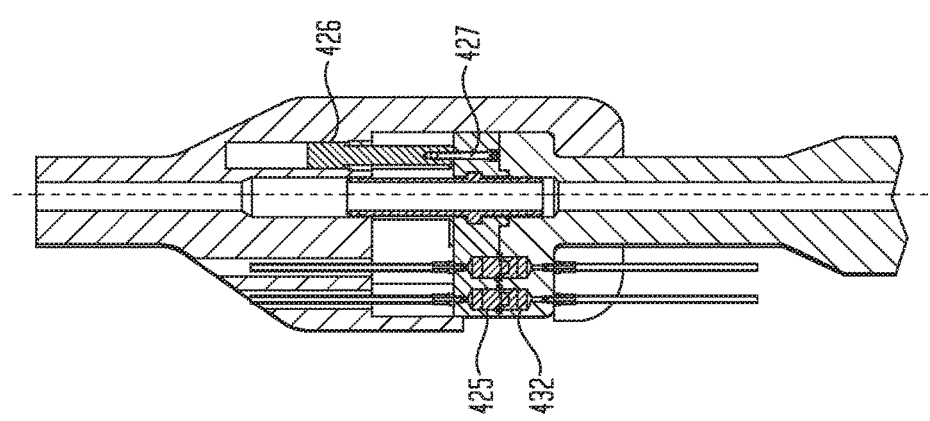
Figure 16A:
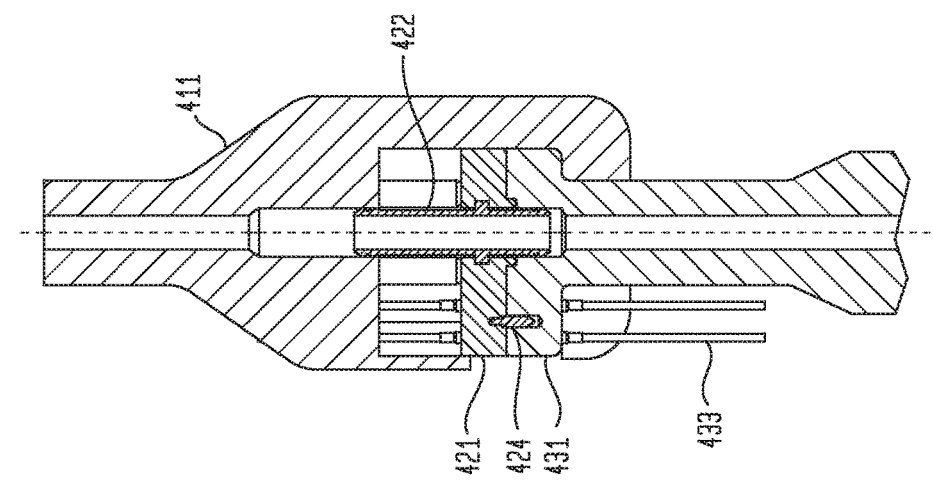

Referring to FIGS. 16A-C, the piston and cylinder assembly 426 is actuated to move the lock plate 421 longitudinally relative to the housing 411 and towards the upper surface of the head section 431. The lock plate 421 engages the upper surface of the adapter 430. The sleeve 422 moves longitudinally into the bore of the adapter 430. A seal disposed about a circumference of the sleeve seals against the bore of the adapter 430. The alignment pin 424 is received in the alignment recess 436. The alignment pin 424 and alignment recess 436 ensure the alignment of the one or more utility connectors 425 and one or more utility receivers 432. As the lock plate 421 continues to lower, the one or more utility connectors 425 engage and connect to the one or more utility receivers 432. When connected, the one or more utility connectors 425 and one or more utility receivers 432 transfer power, data, electronic, hydraulics, and/or pneumatics between the top drive and the tool. The one or more channels 421c receive the one or more tabs 434 of the adapter 430. The hole 435 moves into alignment with the lock bolt 423.

Figure 17B:
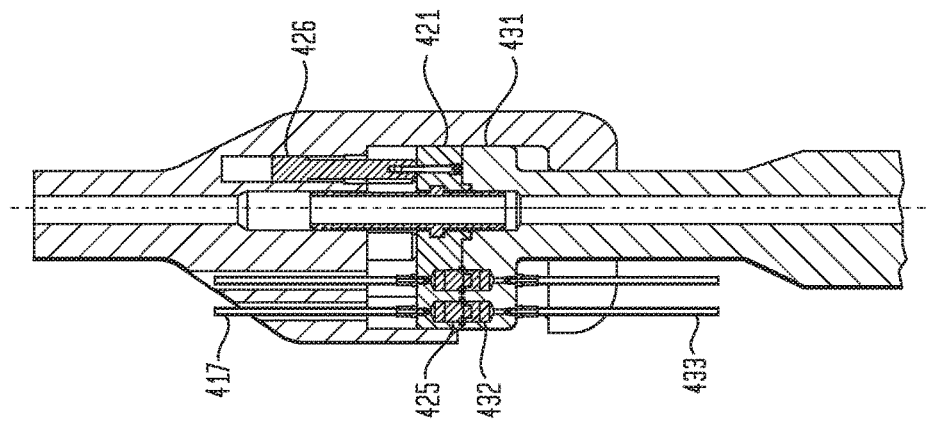
Figure 17A:
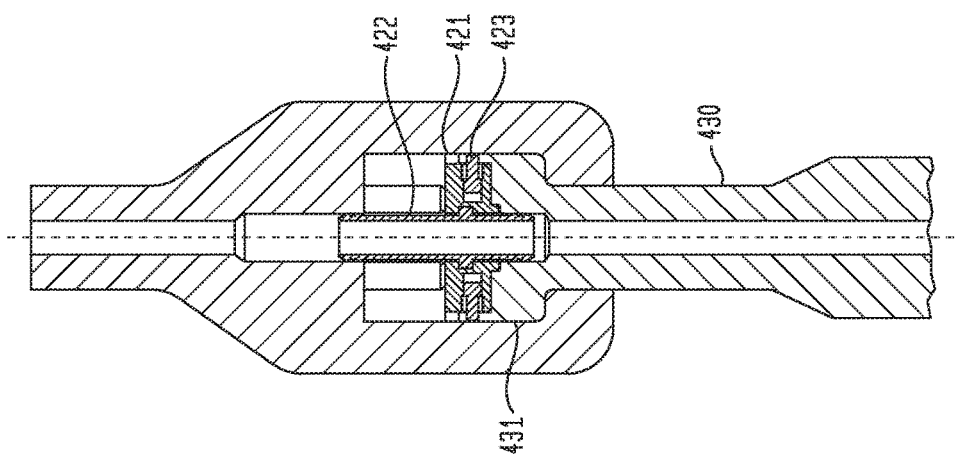

Referring to FIGS. 17A-B, the piston and cylinder assembly is actuated to move the lock bolt 423 into the hole 438 of the tab 434. Reception of the lock bolt 423 in the hole 435 longitudinally couples the lock plate 421 and the adapter 430. The piston and cylinder assembly 426 is pressurized to preload the connection. The piston and cylinder assembly 426 is used to provide thread compensation. The piston and cylinder assembly 426 lifts the head section 431 off of the shoulder 414. The piston and cylinder assembly 426 moves the adapter 430 longitudinally relative to the housing 411. The piston and cylinder assembly moves the head section 431 of the adapter 430 longitudinally in the recess 413 of the housing 411. The piston and cylinder assembly 426 reduces the amount of weight set down on the threads of the tubular string during connection with a tubular string. The piston and cylinder assembly 426 compensates for the downward travel of the top drive and the tool due to the threaded makeup to the tubular string.

In order to decouple the top drive and the tool, the piston and cylinder assembly 426 is actuated to lower the head section 431 onto the shoulder 414 of the housing 414. The piston and cylinder assembly 428 is actuated to retract the lock bolt 423 from the hole 435, thereby longitudinally decoupling the lock plate 421 and the adapter 430. The piston and cylinder assembly 426 is actuated to longitudinally raise the lock plate 421 relative to the adapter 430. The one or more utility connectors 425 disengage from the one or more utility receivers 432. The alignment pin 424 moves out of the alignment recess 436. The sleeve 422 moves out of the bore of the adapter 430. Next, the adapter 430 is removed from the recess 413 of the housing 411. The head section 431 of the adapter 430 is moved substantially horizontally or laterally out through the window 415 of the housing 411, thereby torsionally decoupling the adapter 430 and the housing 411.

Figure 18A:
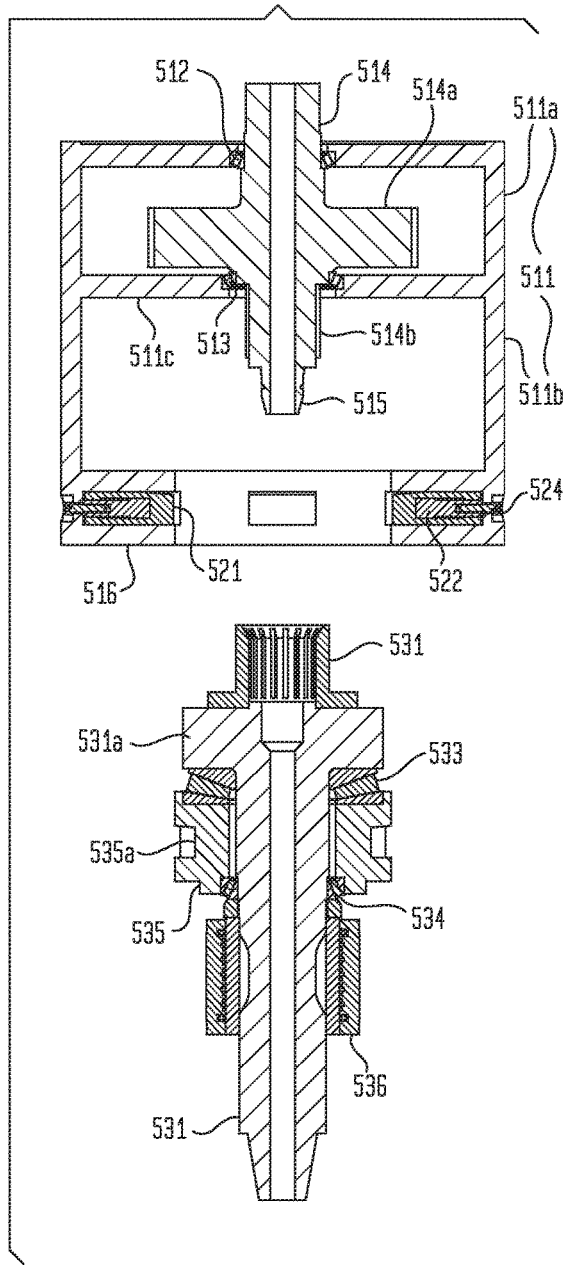
FIGS. 18A-B illustrate cross-sectional views of a drive member and an adapter of a combined multi-coupler, according to a fifth embodiment.
Figure 18B:
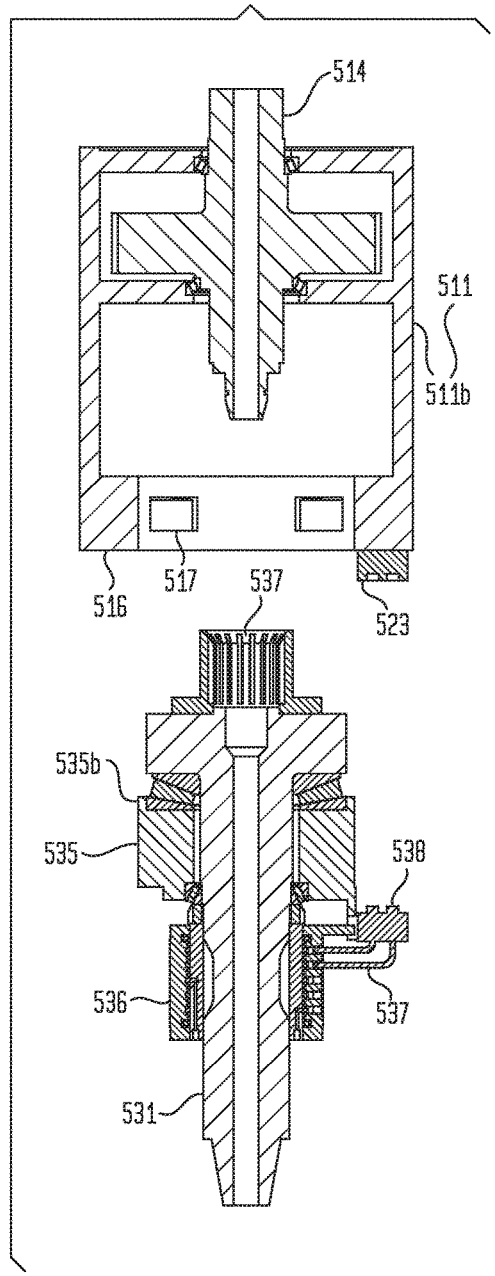

FIGS. 18A-B illustrate a cross-sectional view of a CMC system 500, according to a fifth embodiment. The CMC 500 includes a drive member 510, a coupling assembly 520, and an adapter 530 of a tool. The drive member 510 includes a housing 511, bearings 512, 513, and a quill 514. The drive member 510 may be configured to connect to the top drive. The drive member 510 may be integrally formed with the top drive or other traveling member. The housing 511 may be rectangular having a bore therethrough. The housing may include one or more sections 511a,b. The sections 511a,b of the housing may be separated by a support wall 511c. The support wall 511c may be perpendicular to the longitudinal axis of the housing 511. The housing section 511a may have an opening at an upper longitudinal end. The opening of the housing section 511a may be aligned with the bore of the housing 511.

The bearing 512 may be disposed in the housing section 511a adjacent the opening. The bearing 513 may be disposed in the support wall 511c adjacent the bore of the housing 511. The quill 514 may be tubular having a bore therethrough. The quill 514 may be disposed in the bore of the housing 511. The quill 514 may extend upward longitudinally from the bore of the housing 511. The bore of the quill 514 may be configured to transfer drilling fluid from the top drive to the tool. The quill 514 may include a gear section 514a. The gear section 514a may be disposed about a circumference of the quill 514. The gear section 514a may include geared teeth formed around an outer circumference. An actuator, such as a motor, may be configured to rotate the quill 514 relative to the housing 511. The gear section 514a may be configured to engage the motor. The gear section 514a may be configured to transfer torque from the motor to the quill 514.

The quill 514 may be supported by the housing 511. The quill 514 may rest on bearing 513. Bearing 513 may be configured to permit rotation of the quill 514 relative to the housing 511. Bearing 513 may be configured to support a downward thrust load from the quill 514. Bearing 512 may be configured to support an upward thrust load from the quill 514. Bearing 512 may be configured to permit rotation of the quill 514 relative to the housing 511. The quill 514 may include a splined section 514b. The splined section 514b may be disposed at a lower longitudinal end of the quill 514. The splined section 514b may be beneath the gear section 514a of the quill 514. Splines may be formed on an outer circumference of the quill 514 at the splined section 514b. Alternatively, the splines may be formed on an inner circumference of the quill 514.

A lip 515 may be disposed at a lower end of the quill 514. The lip 515 may have a groove disposed around a circumference. The groove may be configured to receive a seal. The housing section 511b may have a flange 516 formed at a lower longitudinal end. The flange 516 may be an annular flange. The flange 516 may include one or more recesses 517. The one or more recesses 417 may be rectangular in shape. The one or more recesses 517 may extend outward from an inner surface of the flange 516.

The coupling assembly 520 may include one or more lock bolts 521, one or more actuators, such as one or more piston and cylinder assemblies 522, and one or more utility connectors 523. The one or more lock bolts 521 may be rectangular in shape. The one or more lock bolts 521 may be disposed in the one or more recesses 517. The one or more lock bolts 521 may be radially movable between an extended position and a retracted position. The one or more piston and cylinder assemblies 522 may be configured to move the one or more lock bolts 521 between the extended position and the retracted position. The one or more piston and cylinder assemblies 522 may be disposed in the one or more recesses 517. A fastener 524 may connect a respective piston and cylinder assembly to the housing section 511b. The one or more utility connectors 523 may be disposed on the lower longitudinal end of the flange 516. The one or more utility connectors 523 may be connected at one end to one or more supply lines. The one or more utility connectors 523 may be configured to receive and transfer power, data, electronic, hydraulics, and/or pneumatics to and from the one or more supply lines. The one or more utility connectors 523 may be rotationally stationary. The one or more utility connectors 523 may rotationally stationary during rotation of the quill 514.

The adapter 530 includes a stem 531, a torque connector 532, bearings 533, 534, a tool housing 535, and a utility transfer section 536. The stem 531 may be tubular having a bore therethrough. The stem 531 may have an opening at an upper longitudinal end. The opening may be configured to receive the lip 515 of the quill 514. The stem 531 may have a flange 531a formed at an upper longitudinal end. The torque connector 532 may be disposed at an upper longitudinal end of the stem 531. The torque connector 532 may be disposed on the flange 531a. The torque connector 532 may be integrally formed with the flange 531a. The torque connector 532 may have splines 537 formed on an inner surface. The splines 537 may be configured to engage the splined section 514*b* of the quill 514. The splines 537 may be configured to provide torsional coupling between the quill 514 and the stem 531. The splines 537 may be configured to transfer torque from the quill 514 to the tool.

The tool housing 535 may be tubular having a bore therethrough. The tool housing 535 may be disposed about a circumference of the stem 531. The tool housing 535 may be rotationally stationary relative to the stem 531. The tool housing 535 may have one or more recesses 535*a* formed through an outer surface. The one or more recesses 535*a* may be rectangular in shape. The one or more recesses 535*a* may extend inward from an outer surface of the tool housing 535. The one or more recesses 535*a* may be configured to receive the one or more lock bolts 521. A lip 535*b* may be formed at an upper longitudinal end of the tool housing 535. The lip 535*b* may be disposed about the outer circumference of the tool housing 535.

Bearing 533 may be disposed longitudinally between the tool housing 535 and the flange 531*a*. Bearing 533 may be disposed radially between the lip 535*b* of the tool housing 535 and the outer circumference of the stem 531. Bearing 533 may facilitate rotation of the stem 531 relative to the tool housing 535. Bearing 534 may be disposed longitudinally between the tool housing 535 and a lock nut disposed on the stem 531 above the utility transfer section 536. Bearing 534 may be disposed radially between a lower shoulder of the tool housing 535 and the stem 531. Bearing 534 may facilitate rotation of the stem 531 relative to the tool housing 535.

The utility transfer section 536 may be configured to provide an electrical, pneumatic, and/or hydraulic connection across a rotating interface. The utility transfer section 536 may include a slip ring assembly and/or hydraulic swivel. The slip ring assembly may include a ring member having one or more contact rings (such as copper rings) that rotate with the stem 531. The slip ring assembly may include a support housing for supporting one or more contact members (such as brushes). One or more bearings may be disposed between the support housing and the ring member. The one or more bearings may facilitate rotation of the ring member relative to the support housing. The non-rotating contact members contact the contact rings of the rotating ring member, thereby providing an electrical connection for power, data, and/or electronics across a rotating interface. In this manner, electronic signals may be sent between non-rotating section and the rotating section of the adapter 530. Additionally, the hydraulic swivel may provide transfer of hydraulic fluids for pneumatic and/or hydraulic operation of the tool. The utility transfer section 536 may include one or more supply lines 537 and one or more utility receivers 538. The one or more supply lines 537 may connect the one or more utility receivers 538 to the hydraulic swivel and/or slip ring assembly. The one or more utility receivers 538 may be disposed on an outer surface of the tool housing 535. The one or more utility receivers 538 may be configured to connect to the one or more utility connectors 523. The one or more utility receivers 538 may be configured to transfer power, data, electronic, pneumatics, and/or hydraulics between the top drive and the tool. The one or more utility receivers 538 may be rotationally stationary. The one or more utility receivers 538 may be rotationally stationary during rotation of the stem 531.

Figure 19:
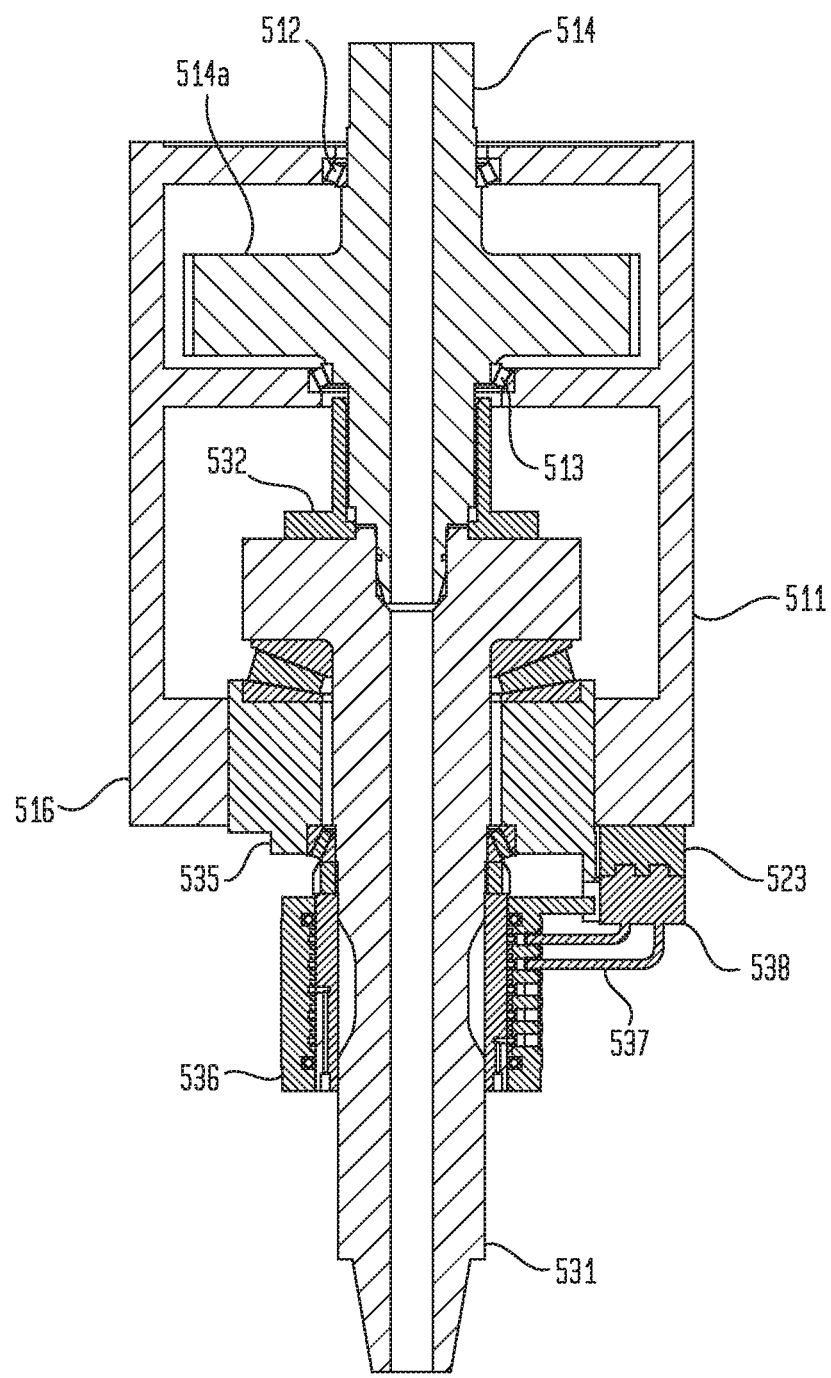
FIG. 19 illustrates a cross-sectional view of the adapter inserted into a housing of the drive member, according to the fifth embodiment.
Figure 20:
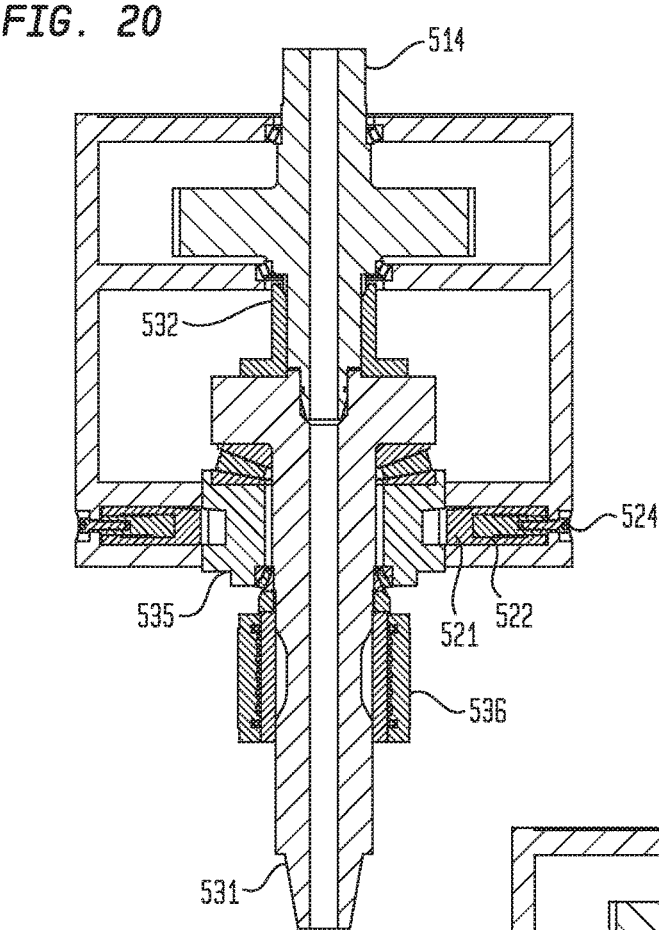
FIGS. 20 and 21 illustrate operation of a coupling assembly, according to the fifth embodiment.
Figure 21:
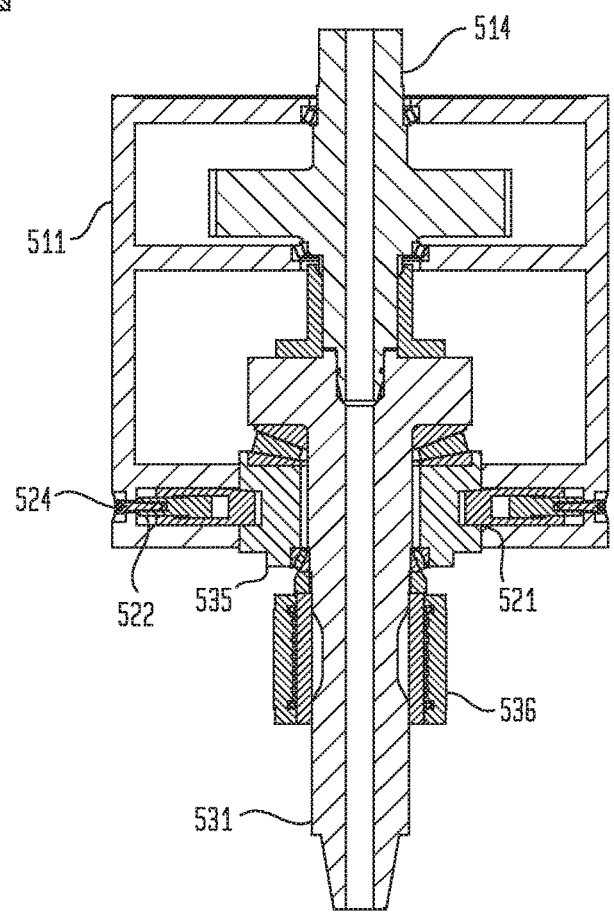

FIGS. 19-21 illustrate operation of the CMC 500. The CMC 500 is operable to torsionally and longitudinally couple the top drive to the tool. First, the adapter 530 is inserted into the bore of the housing 511. The adapter 530 may be raised or the drive member 510 lowered to begin the process. The splined section 514*b* of the quill 514 moves into the torque connector 532. Engagement of the splines 537 and the splined section 514*b* torsionally couples the quill 514 and the torque connector 532. The lip 515 of the quill 514 is inserted into the bore of the adapter 530. The seal engages and seals against the bore of the adapter 530. The one or more utility connectors 523 engage and connect to the one or more utility receivers 538 to provide transfer of power, data, electronic, hydraulics, and/or pneumatics between the top drive and the tool. Engagement of a shoulder of the tool housing 535 with the flange 516 of the housing 511 prevents further longitudinal movement of the adapter 530 relative to the housing 511. The one or more recesses 535*a* are aligned with the one or more lock bolts 521. The one or more piston and cylinder assemblies 522 are actuated to extend the one or more lock bolts 521 radially inward. The one or more lock bolts 521 move radially inward into an engaged position in the one or more recesses 535*a*. The one or more lock bolts 521 transfer a weight of the adapter 530 and the tool to the housing 511. Engagement of the one or more lock bolts 521 in the one or more recesses 535*a* provides longitudinal coupling between the housing 511 and the adapter 530 of the tool. The one or more lock bolts 521 may have a chamfered surface. The chamfered surface may facilitate insertion of the one or more lock bolts 521 in the one or more recesses 535*a*.

In order to decouple the top drive and the tool, the one or more piston and cylinder assemblies 522 are actuated to move the one or more lock bolts 521 radially outward from the one or more recesses 535*a*. The one or more lock bolts 521 move to the disengaged position, thereby longitudinally decoupling the adapter 530 and the housing 511. The adapter 530 is longitudinally moved relative to the housing 511. The splines 537 move out of engagement with the splined section 514*b*, thereby torsionally decoupling the quill 514 and the torque connector 532 of the adapter 530.

Figure 22:
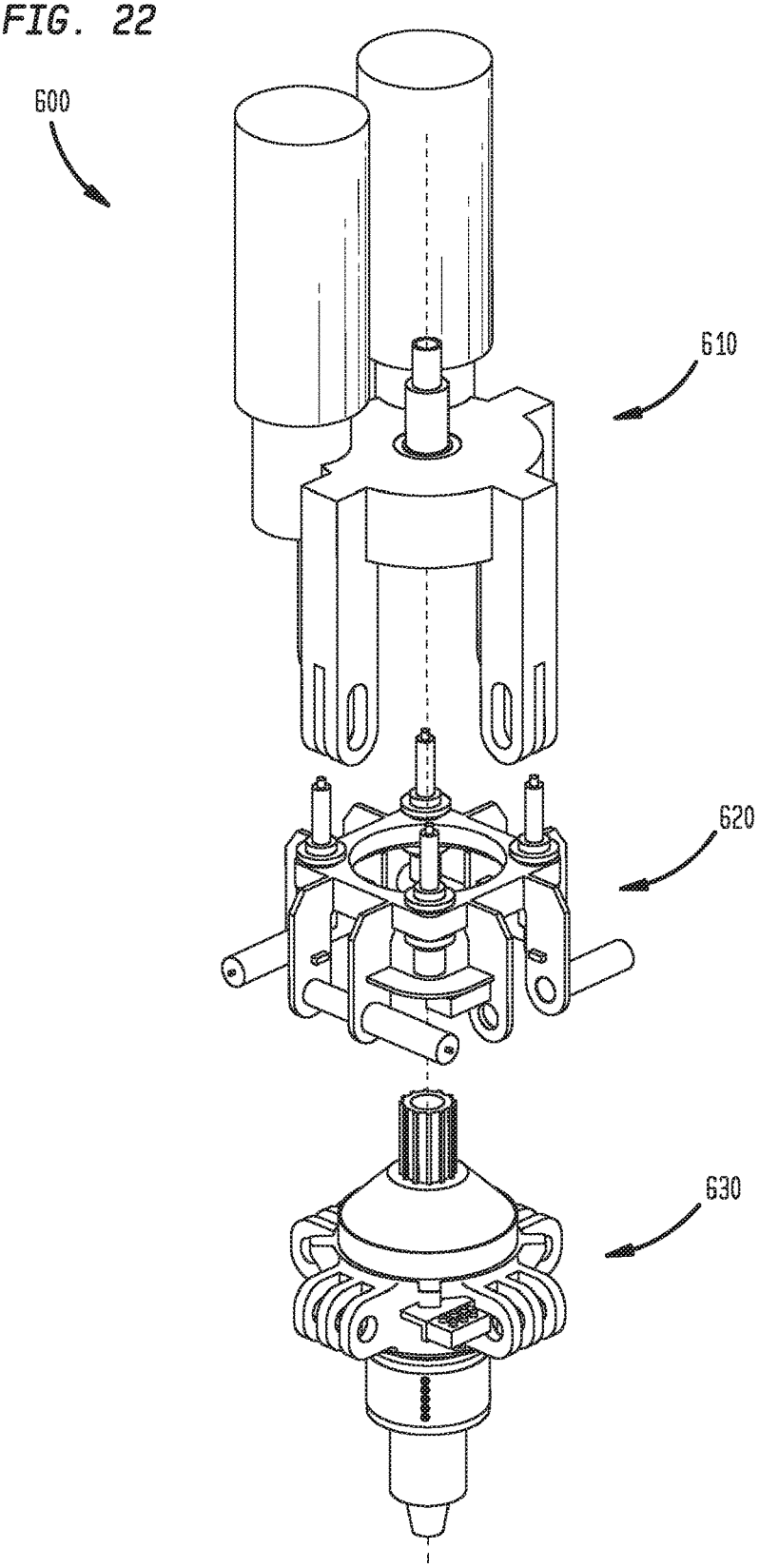
FIG. 22 illustrates an exploded view of a combined multi-coupler system, according to a sixth embodiment.
Figure 23:
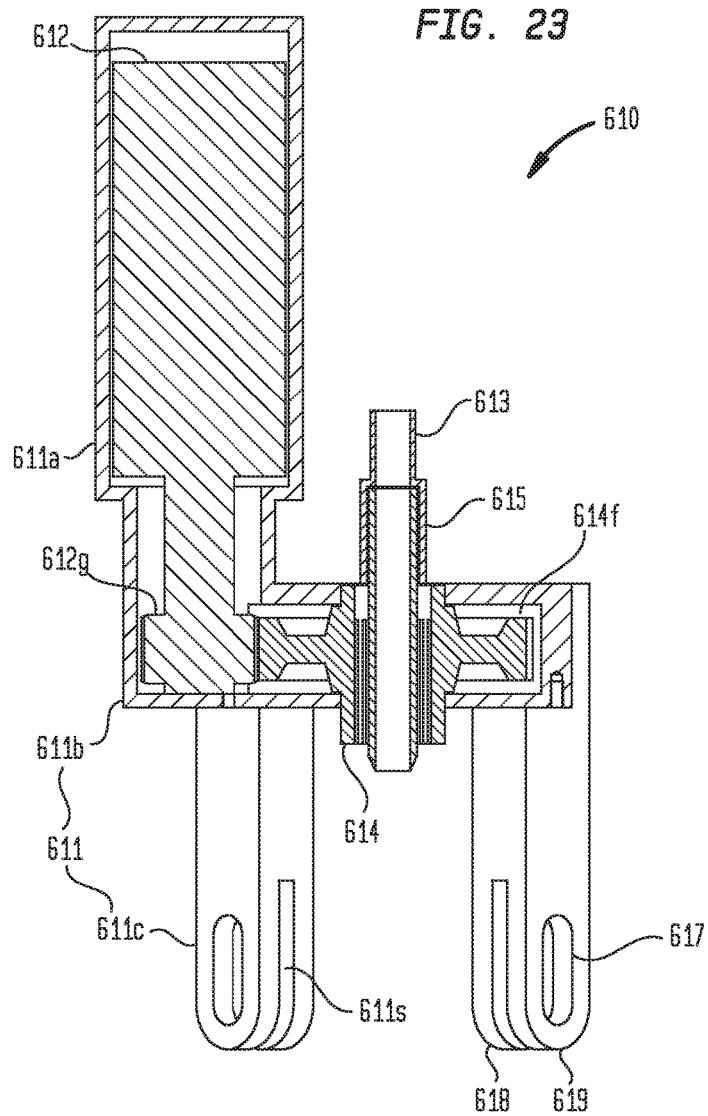
FIG. 23 illustrates a cross-sectional view of a housing, according to the sixth embodiment.
Figure 24:
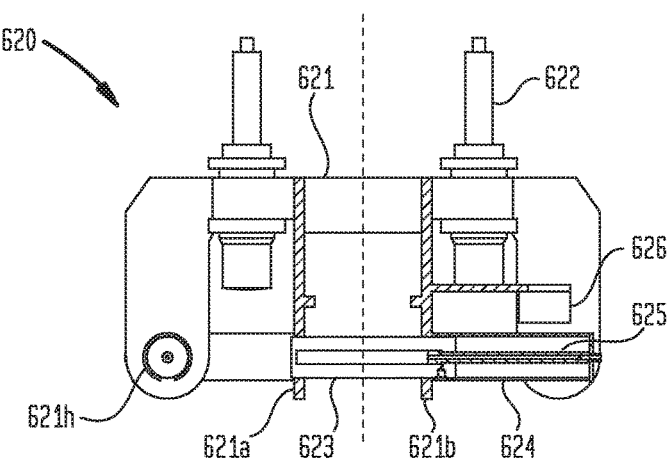
FIG. 24 illustrates a cross-sectional view of a frame, according to the sixth embodiment.

FIG. 22 illustrates an exploded view of a CMC system 600, according to a sixth embodiment. The CMC 600 includes a drive member 610 of a top drive, including a frame 620, and an adapter 630 of a tool. FIGS. 23 and 24 illustrate the drive member 610. The drive member 610 includes a housing 611, a quill 613, a gear 614, a swivel 615, the frame 620, an actuator, such as motor 612, and a compensation assembly. The housing 611 may include a motor case 611*a*, a quill case 611b, and a plurality of arms 611*c*. The motor case 611*a* may be tubular. The motor case 611*a* may be hollow. The motor case 611*a* may be disposed at an upper longitudinal end of the housing 611. The motor 612 may be disposed in the motor case 611*a*. The motor 612 may be an electric motor or a hydraulic motor. The motor 612 may include a gear section 612*g*. The gear section 612*g* may have gear teeth formed on an outer circumference. The gear section 612*g* may be configured to transfer torque to the gear 614. The gear section 612*g* may be configured to rotate relative to the housing 611.

The quill case 611*b* may be disposed adjacent the motor case 611*a*. The quill case 611*b* may be circular. The quill case 611*a* may be hollow. The quill case 611*a* may have a bore therethrough. The quill 613 may be disposed in the bore of the quill case 611*a*. The quill 613 may extend longitudinally through the bore of the quill case 611*a*. The quill 613 may extend longitudinally out of the quill case 611*a*. The quill 613 may be configured to transfer drilling fluid from the top drive to the tool. The gear 614 may be disposed about the quill 613. The gear 614 may be tubular having a bore therethrough. The quill 613 may be disposed through the bore of the gear 614. The gear 614 may have an outer flange 614f. The flange 614f may include gear teeth disposed on an outer circumference. The gear teeth of the flange 614f may be configured to engage the gear teeth of the gear section 612g. The gear section 612g may transfer torque to the gear 614 from the motor 612. The gear 614 may have a splined surface formed along an inner circumference. The splined surface may extend longitudinally through the bore of the gear 614. The swivel 615 may be disposed about the circumference of the quill 613. The swivel 615 may be disposed about the quill 613 above the housing 611. The swivel 615 may be configured to permit the quill 613 to rotate relative to the housing 611.

The plurality of arms 611c may be connected to the quill case 611b. The plurality of arms 611c may extend longitudinally relative to the quill case 611b. The plurality of arms 611c may be spaced evenly around a circumference of the quill case 611b. Each arm may include one or more flanges 618, 619. The one or more flanges 618, 619 may be formed at a lower longitudinal end of the arm. The one or more flanges 618, 619 may have a semi-circular end formed at a lower longitudinal end. A slot 611s may be formed between the one or more flanges 618, 619. The slot 611s may extend longitudinally upwards from the semi-circular end. The slot 611s may extend inward between the one or more flanges 618, 619. A groove 617 may be formed through each of the one or more flanges 618, 619. The groove 617 may extend longitudinally upwards. The groove 617 may extend a substantially similar longitudinal distance as the slot 611s. The groove 617 may extend through the one or more flanges 618, 619. The groove 617 may extend inward to the slot 611s.

FIG. 24 illustrates the frame 620 and the compensation assembly. The frame 620 may include an upper section 621 having a main bore therethrough. The upper section 621 may be rectangular in shape. The frame 620 may include flanges 621a, 621b disposed on an outer surface of the upper section 621. The flanges 621a, 621b may be L-shaped. The flanges 621a,b may extend longitudinally downwards from the upper section 621. The flanges 621a,b may be spaced apart on the upper frame 621. The arm 611c may be configured to be disposed between the flanges 621a,b. The flanges 621a,b may have a semi-circular end. The flanges 621a,b may have a hole 621h formed through a wall of the semi-circular end. The hole 621h may be configured to receive a lock bolt 623. The lock bolt 623 may be movable between a locked position and an unlocked position. A piston and cylinder assembly 624, 625 may be configured to move the lock bolt 623. The lock bolt 623 may extend and retract relative to the piston and cylinder assembly 624, 625. The piston and cylinder assembly 624, 625 may be connected to the flange 621b. The groove 617 may be configured to receive the lock bolt 623. The lock bolt 623 may be longitudinally movable through the groove 617.

The compensation assembly may include a piston and cylinder assembly 622. The piston and cylinder assembly 622 may be disposed at a corner of the upper section 621. The piston and cylinder assembly 622 may be connected to the upper section 621. The piston and cylinder assembly 622 may extend through the upper section 621. The piston and cylinder assembly 622 may extend through a smaller bore of the upper section 621. The piston and cylinder assembly 622 may be partially longitudinally movable within the bore. The piston and cylinder assembly 622 may include annular shoulders on either side of the bore. The annular shoulders may be configured to engage the upper section 621 during operation of the piston and cylinder assembly. The annular shoulders may engage and support the upper section 621. The annular shoulders may restrict longitudinal movement of the piston and cylinder assembly 622 relative to the upper section 621. An upper longitudinal end of the piston and cylinder assembly 622 may be connected to the housing 611. The piston and cylinder assembly 622 may be connected to the quill case 611a. The compensation assembly may include additional piston and cylinder assemblies disposed at other corners of the upper section 621 The compensation assembly 622 may be configured to longitudinally move the frame 620 relative to the housing 611. The piston and cylinder assembly 622 may be configured to reduce the amount of weight set down on the threads of the tubular string during connection with a tubular string. The piston and cylinder assembly 622 may be configured to compensate for the downward travel of the top drive and the tool due to the threaded makeup to the tubular string. The piston and cylinder assembly 622 may be configured to preload a connection with a tubular string. A lower longitudinal end of the piston and cylinder assembly 622 may be configured to engage an outer shoulder of a tool housing 632 to preload the connection.

The frame 620 may include a utility connector 626. The utility connector 626 may be disposed on the upper section 621. The utility connector 626 may be connected at one end to one or more supply lines. The utility connector 626 may be configured to receive and transfer power, data, electronic, hydraulics, and/or pneumatics to and from the one or more supply lines. The utility connector 626 may be rotationally stationary relative to the housing 611 and the frame 620. The utility connector 626 may be rotationally stationary during rotation of the quill 613.

FIGS. 25A and 25B illustrate the adapter 630. The adapter 630 of the tool may include a stem 631, a torque connector 631b, bearings 634, 635, the tool housing 632, and a utility transfer section 633. The stem 631 may be tubular having a bore therethrough. The stem 631 may have an opening at an upper longitudinal end. The opening may be configured to receive the quill 613. The stem 631 may be configured to transfer fluid from the quill 613 to the tool. The stem 631 may have a flange 631a formed at an upper longitudinal end. The torque connector 631b may be disposed at an upper longitudinal end of the stem 631. The torque connector 631b may be disposed on the flange 631a. The torque connector 631b may be integrally formed with the flange 631a. The torque connector 631b may have splines formed on an outer surface. The splines may be configured to engage the splines of the gear 614. The splines of the torque connector 631b and splines of the gear 614 may be configured to provide torsional coupling between the gear 614 and the stem 631. The splines of the torque connector 631b and splines of the gear 614 may be configured to transfer torque from the gear 614 to the tool. The splines of the torque connector 631b may be configured to allow for longitudinal movement between the torque connector 631b and the gear 614.

The tool housing 632 may be tubular having a bore therethrough. The tool housing 632 may be disposed about a circumference of the stem 631. The tool housing 632 may be stationary relative to the stem 631. The tool housing 632 may have one or more tabs 632a-c formed on an outer surface. The tabs 632a-c may extend perpendicular to the longitudinal axis of the stem 631. Each of the tabs 632a-c may have a hole 632h formed through a wall. The hole 632h may be configured to receive the lock bolt 623. The tab 632a may be configured to be disposed between the flange 621a and the flange 618. The slot 611s may be configured to receive the tab 632*b*. The tab 632*b* may be configured to be disposed between the flanges 618, 619. The tab 632*c* may be configured to be disposed between the flange 619 and the flange 621*b*. A lip may be formed at an upper longitudinal end of the tool housing 632. The lip may be disposed around the outer circumference of the tool housing 632. Bearing 634 may be disposed longitudinally between the tool housing 632 and the flange 631*a*. Bearing 634 may be disposed radially between the lip of the tool housing 632 and the outer circumference of the stem 631. Bearing 634 may facilitate rotation of the stem 631 relative to the tool housing 632. Bearing 635 may be disposed longitudinally between the tool housing 632 and a lock nut disposed on the stem 631 above the utility transfer section 633. Bearing 635 may be disposed radially between a lower shoulder of the tool housing 632 and the stem 631. Bearing 635 may facilitate rotation of the stem 631 relative to the tool housing 632.

The utility transfer section 633 may be configured to provide an electrical and/or hydraulic connection across a rotating interface. The utility transfer section 633 may include a slip ring assembly and/or hydraulic swivel. The slip ring assembly may include a ring member having one or more contact rings (such as copper rings) that rotate with the stem 631. The slip ring assembly may include a support housing for supporting one or more contact members (such as brushes). One or more bearings may be disposed between the support housing and the ring member. The one or more bearings may facilitate rotation of the ring member relative to the support housing. The non-rotating contact members contact the contact rings of the rotating ring member, thereby providing an electrical connection for power, data, and/or electronics across a rotating interface. In this manner, electronic signals may be sent between non-rotating section and the rotating section of the adapter 630. Additionally, the hydraulic swivel may provide transfer of hydraulic fluids for pneumatic and/or hydraulic operation of the tool. The utility transfer section 633 may include one or more supply lines and a utility receiver 636. The one or more supply lines may connect the utility receiver 636 to the hydraulic swivel and/or slip ring assembly. The utility receiver 636 may be disposed on an outer surface of the tool housing 632. The utility receiver 636 may be configured to connect to the utility connector 626. The utility receiver 636 may be configured to transfer power, data, electronic, pneumatics, and/or hydraulics between the top drive and the tool. The utility receiver 636 may be rotationally stationary relative to the tool housing 632. The utility receiver 636 may be rotationally stationary during rotation of the stem 631.

Figure 26:
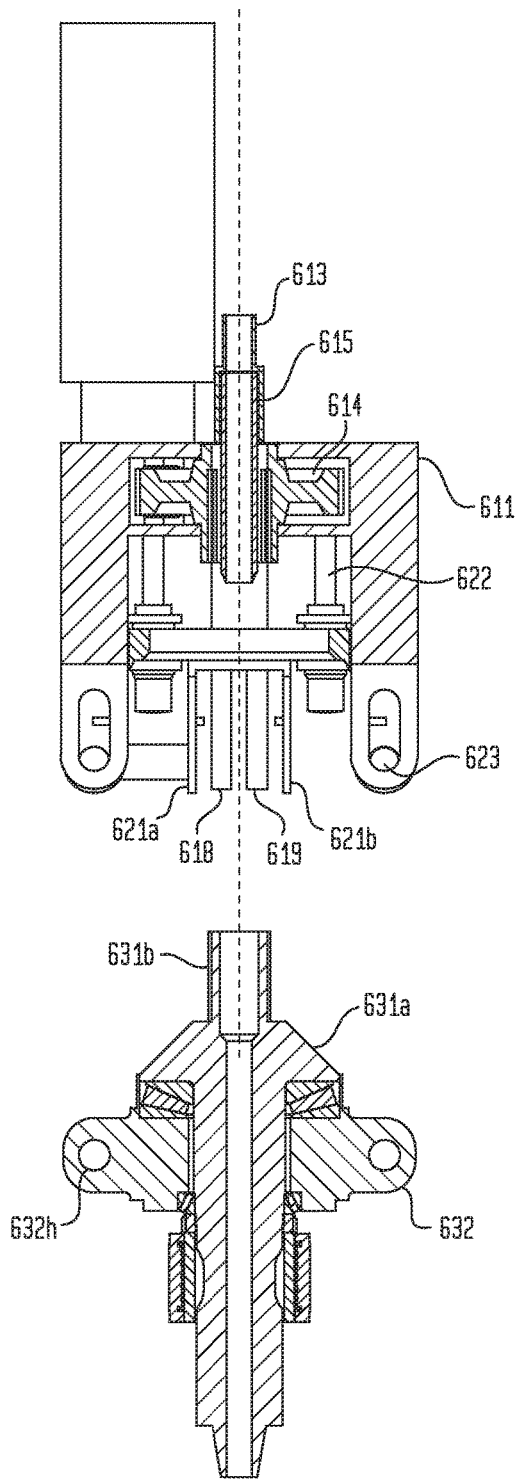
Figure 27:
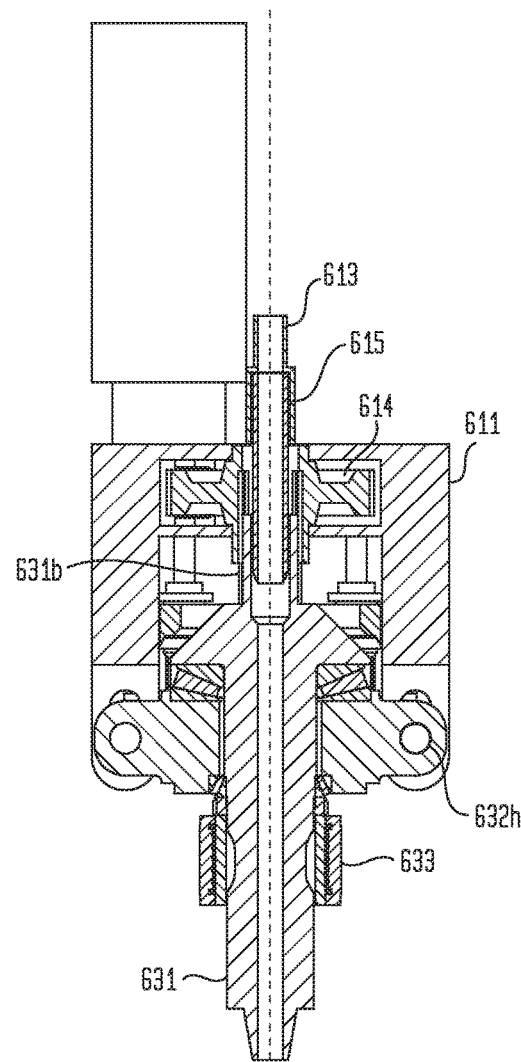

FIGS. 26-31 illustrate operation of the CMC 600. FIG. 26 illustrates the frame 620 coupled to the housing 611 by the piston and cylinder assembly 622. The CMC 600 is operable to torsionally and longitudinally couple the top drive to the tool. First, the adapter 630 is inserted into the housing 611, as shown in FIG. 27. The torque connector 631*b* is inserted into the bore of the gear 614. The quill 613 is inserted into the bore of the torque connector 631*b*. The splines of the torque connector 631*b* engage the splines of the gear 614, thereby torsionally coupling the motor 612 to the stem 631. The tab 632*b* is aligned with the slot 611*s*. The tab 632*a* is aligned with the clearance between the flange 621*a* and the flange 618. The tab 632*c* is aligned with the clearance between the flange 621*b* and the flange 619.

Figure 28:
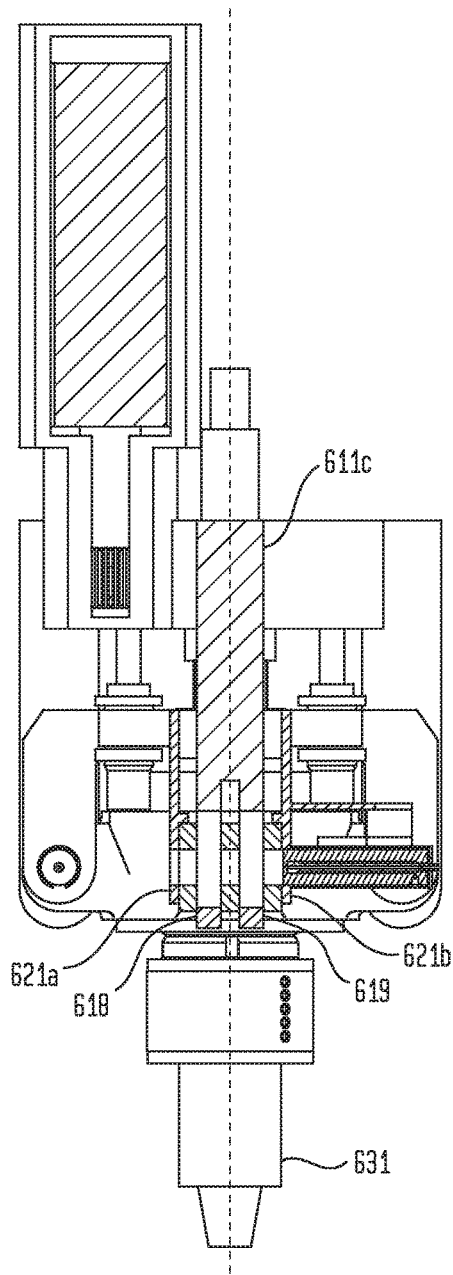
Figure 29:
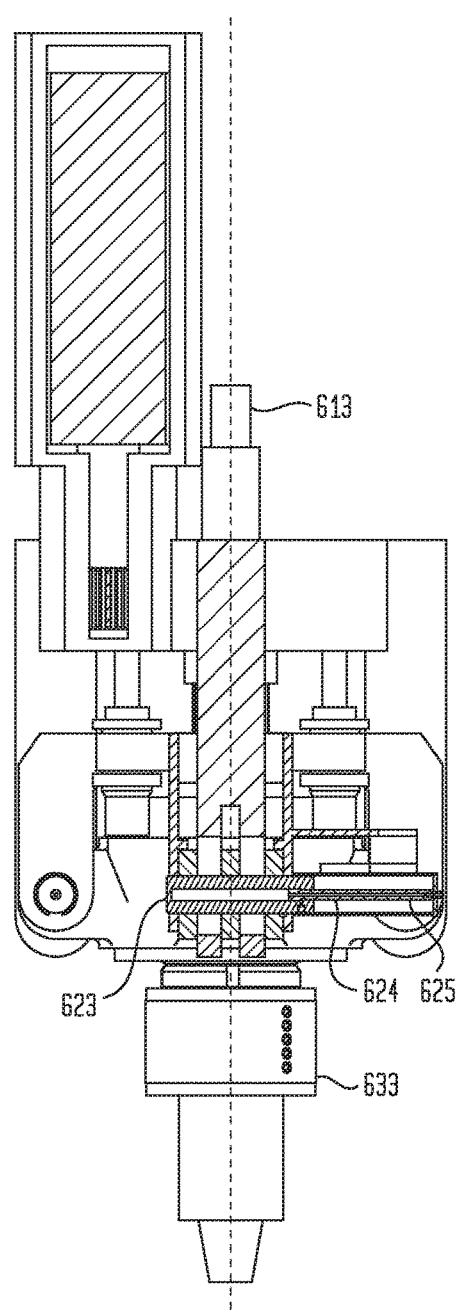

As shown in FIG. 28, the tab 632*b* moves into the slot 611*s*. The tab 632*a* moves into the clearance between the flange 621*a* and the flange 618. The tab 632*c* moves into the clearance between the flange 621*b* and the flange 619. A stop formed on flange 621*b* may engage the tab 632*c*. A stop formed on flange 621*a* may engage the tab 632*a*. The stops may be configured to restrict further longitudinal movement of the one or more tabs 632*a-c*. Engagement of the one or more tabs 632*a-c* with the stops may facilitate alignment. The hole 632*h* is aligned with the groove 617 and the hole 621*h*. The utility connector 626 engages and connects to the utility receiver 636 to provide transfer of power, data, electronic, hydraulics, and/or pneumatics between the top drive and the tool. Next, the piston and cylinder assembly 624, 625 is actuated to move the lock bolt 623. The lock bolt 623 moves through the hole 621*h* of the flange 621*b*, the hole 632*h* of the tab 632*c*, the groove 617 of the flange 619, the hole of the tab 632*b*, the, groove of the flange 618, the hole of the tab 632*a*, and the hole of the flange 621*b*. In the locked position shown in FIG. 29, the lock bolt 623 longitudinally couples the frame 620 and the adapter 630.

FIG. 30 illustrates the adapter 630 in a drilling position. In the drilling position, the piston and cylinder assembly 622 is operated to engage the shoulder of the tool housing 632. The lower longitudinal end of the piston and cylinder assembly 622 engages the shoulder of the tool housing 632 to preload the connection, as shown in FIG. 28. Preloading the connection may reduce vibrations in the system during drilling. Next, the piston and cylinder assembly 622 is actuated to longitudinally move the frame 620 and the adapter 630 relative to the housing 611. FIG. 31 illustrates the adapter 630 in a compensation position. As can be seen in FIG. 31, the piston and cylinder assembly 622 is operated to longitudinally move the frame 620 and the adapter 630 relative to the housing 611. The piston and cylinder assembly 622 is operated to provide thread compensation. The piston and cylinder assembly 622 is operated to lift the frame 620 and the adapter 630 relative to the housing 611. The lock bolt 623 moves longitudinally upwards relative to the housing. The lock bolt 623 supports the weight of the adapter 630 and tool. The lock bolt 623 engages the tool housing 632 and carries the tool housing 632 and adapter 630 upward relative to the housing. The piston and cylinder assembly 622 reduces the amount of weight set down on the threads of the tubular string during connection with a tubular string. The piston and cylinder assembly 622 compensates for the downward travel of the top drive and the tool due to the threaded makeup to the tubular string.

Figure 32:
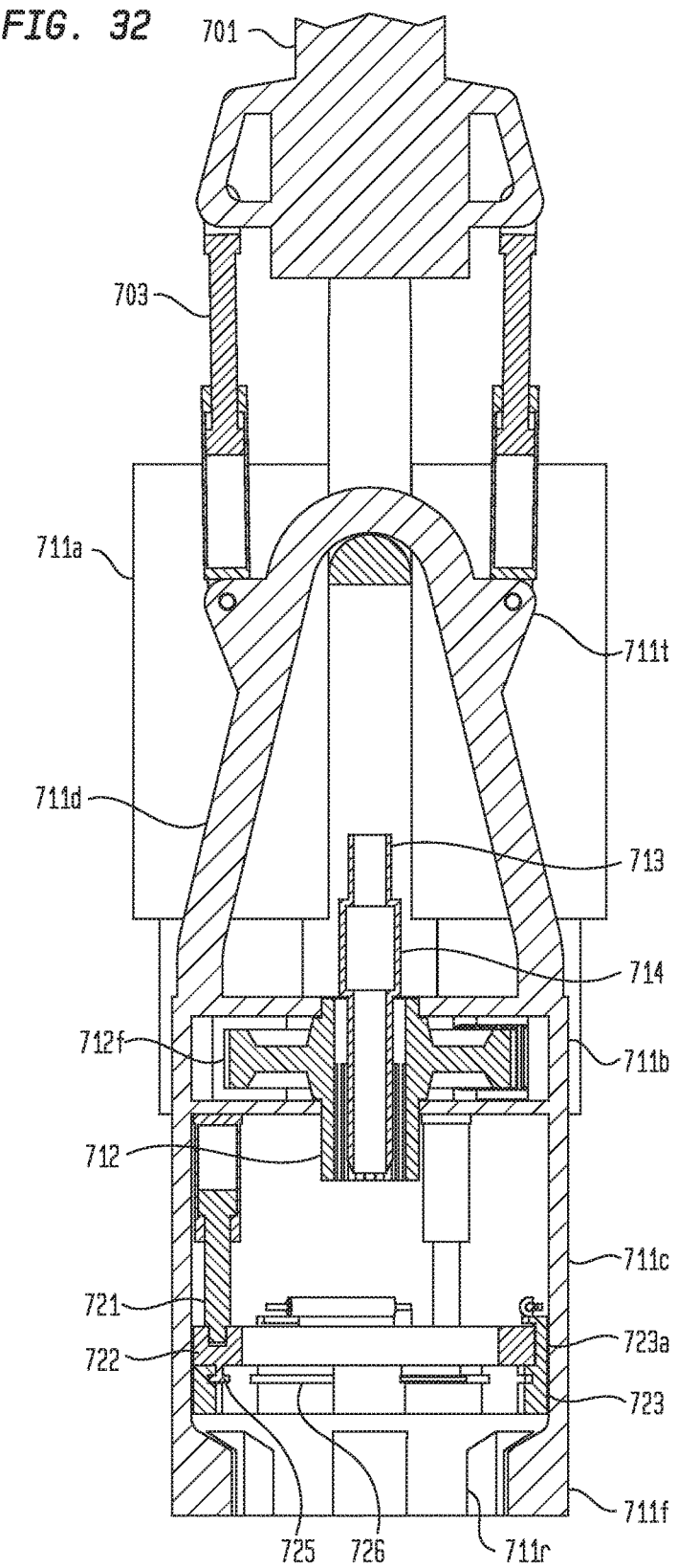
FIG. 32 illustrates a drive member of a combined multi-coupler, according to a seventh embodiment.
Figure 33:
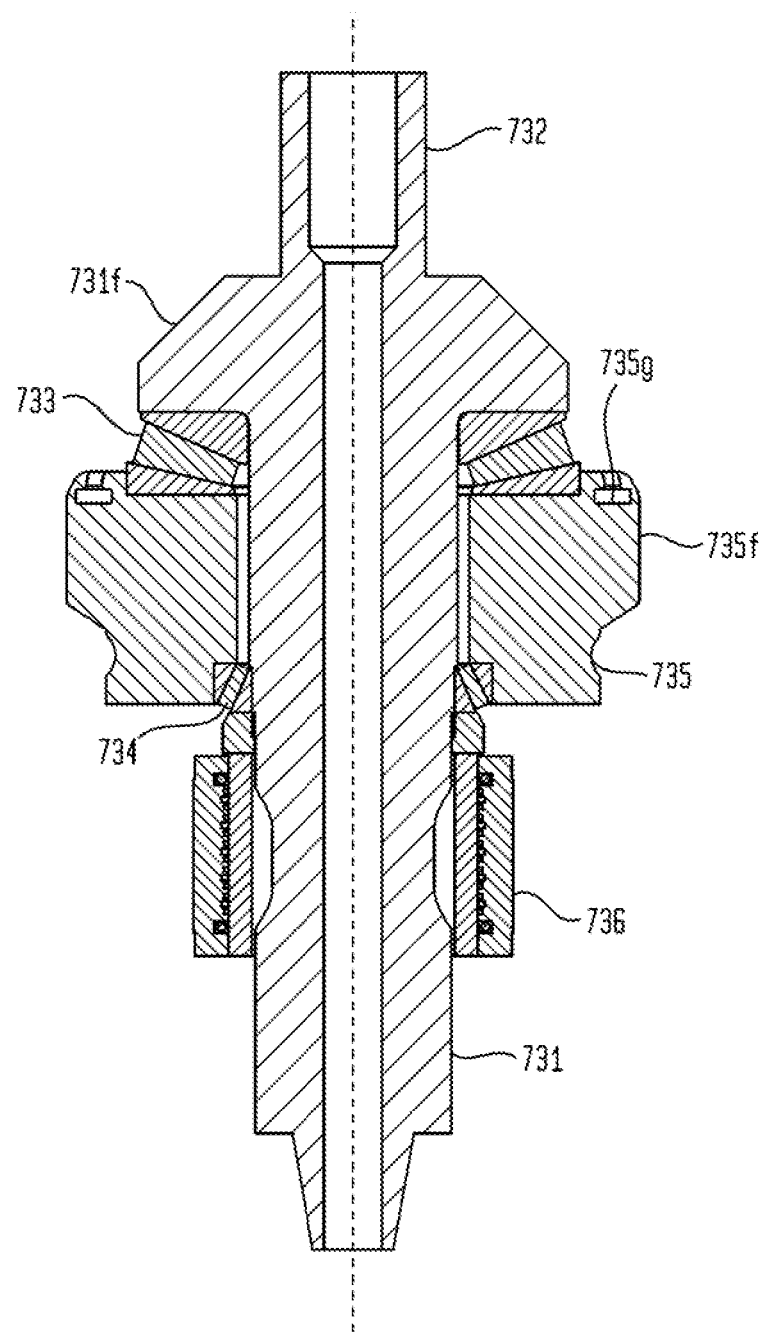
FIG. 33 illustrates a cross-sectional view of an adapter, according to the seventh embodiment.

FIGS. 32 and 33 illustrate a CMC system 700, according to a seventh embodiment. The CMC 700 includes a drive member 710 of a top drive and an adapter 730 of a tool. FIG. 32 illustrates the drive member 710. The drive member 710 includes a housing 711, a gear 712, a quill 713, an actuator, such as a motor, a swivel 714, and a compensation assembly. The housing 711 may include one or more sections 711*a-d*. The housing sections 711*a-d* may be integrally formed. The housing section 711*a* may be a motor case. The motor case may be tubular. The motor case may be hollow. The motor may be disposed in the motor case. The motor may be an electric motor. The motor may include a gear section. The gear section may have gear teeth formed on an outer circumference. The housing section 711*b* may be a quill case. The motor case may be disposed on the quill case. The motor case may be disposed on an outer circumference of the quill case. The quill case may be tubular having a bore therethrough.

The quill 713 may be disposed in the bore of the quill case. The quill 713 may be configured to transfer drilling fluid from the top drive to the tool. The gear 712 may be disposed in the bore of the quill case. The motor may be at least partially disposed in the bore of the quill case. The gear 712 may be disposed about the quill 713. The gear 712 may be tubular having a bore therethrough. The quill 713 may be disposed through the bore of the gear 712. The gear 712 may have an outer flange 712*f*. The flange 712*f* may include gear teeth disposed on an outer circumference. The gear teeth of the flange 712*f* may engage the gear teeth of the gear section. The gear section may transfer torque to the gear 712 from the motor. The gear 712 may have a splined surface formed along an inner circumference. The splined surface may extend longitudinally through the bore of the gear 712. The swivel 714 may be disposed about the circumference of the quill 713. The swivel 714 may be disposed about the quill 713 above the housing 711. The swivel 714 may be configured to permit the quill 713 to rotate relative to the housing 711. One or more utility connectors may be disposed on the housing 711. The one or more utility connectors may be configured to transfer at least one of power, data, electronic, pneumatics, and/or hydraulics between the top drive and the tool. The one or more utility connectors may be rotationally stationary relative to the housing 711. The one or more utility connectors may be rotationally stationary during rotation of the quill 713.

The housing section 711*c* may be tubular having a bore therethrough. The quill 713 may be at least partially disposed in the bore of the housing section 711*c*. The gear 712 may be at least partially disposed in the bore of the housing section 711*c*. The housing section 711*c* may include a flange 711*f* at a lower longitudinal end. The flange 711*f* may include one or more recesses 711*r*. The one or more recesses 711*r* may be formed longitudinally through the flange 711*f*. The housing section 711*d* may include a hook. The housing section 711*d* may be configured to connect to a traveling member 701. The hook may rest on a support of the traveling member 701. The housing section 711*d* may include one or more tabs 711*t*. The one or more tabs 711*t* may be configured to connect to a compensation assembly of the traveling member 701. The compensation assembly of the traveling member may include one or more piston and cylinder assemblies 703. The one or more piston and cylinder assemblies 703 of the traveling member may be configured to longitudinally move the drive member 710 and the adapter 730. The one or more piston and cylinder assemblies 703 may lift the hook of the housing section 711*d* from the support of the traveling member 701. The one or more piston and cylinder assemblies 703 may be configured to reduce the amount of weight set down on the threads of the tubular string during connection with a tubular string. The one or more piston and cylinder assemblies 703 may be configured to compensate for the downward travel of the top drive and the tool due to the threaded makeup to the tubular string.

The compensation assembly may be disposed in the bore of the housing section 711*c*. The housing section 711*c* may have an opening at a lower longitudinal end. The opening may be configured to receive the adapter 730 of the tool. The compensation assembly may include an actuator, such as one or more piston and cylinder assemblies 721, a lock ring 722, and a latch ring 723. The one or more piston and cylinder assemblies 721 may be connected to the housing section 711*c* at one longitudinal end. The one or more piston and cylinder assemblies 721 may be connected to the lock ring 722 at an opposite longitudinal end. The one or more piston and cylinder assemblies 721 may be configured to longitudinally move the lock ring 722 relative to the housing 711. The one or more piston and cylinder assemblies 721 may be configured to reduce the amount of weight set down on the threads of the tubular string during connection with a tubular string. The one or more piston and cylinder assemblies 721 may be configured to compensate for the downward travel of the top drive and the tool due to the threaded makeup to the tubular string.

The lock ring 722 may be disposed in the housing section 711*c*. The lock ring 722 may be supported by the one or more piston and cylinder assemblies 721. The lock ring 722 may be an annular disk. The lock ring 722 may have a bore therethrough. The bore of the lock ring 722 may be configured to receive the adapter 730. The lock ring 722 may have one or more grooves 724 formed along an outer circumference. The one or more grooves 724 may extend longitudinally through the lock ring 722. The lock ring 722 may include a profile 725. The profile 725 may be disposed on, a lower longitudinal surface of the lock ring 722. The profile 725 may be T-shaped. The profile 725 may extend in arcuate segments about the lock ring 722. The latch ring 723 may be disposed in the bore of the housing section 711*c*. The latch ring 723 may be an annular disk. The latch ring 723 may be rotatable relative to the housing 711. The latch ring 723 may be rotatable relative to the lock ring 722. The latch ring 723 may have a channel 726 formed in an inner circumference. The channel 726 may include one or more arcuate segments. The channel 726 may be configured to receive the profile 725. The latch ring 723 may include an upper section 723*a*. The upper section 723*a* may include one or more arcuate segments. The one or more arcuate segments of the upper section 723*a* may extend longitudinally through the one or more grooves 724.

FIG. 34B illustrates a top down view of the compensation assembly of the drive member 710, in an unactuated position. One or more piston and cylinder assemblies 727 may be configured to rotate the latch ring 723. Each of the one or more piston and cylinder assemblies 727 may be attached to the housing section 711*c* at one end. Each of the one or more piston and cylinder assemblies 727 may be attached to a hinge. The hinge may be disposed on an upper surface of the lock ring 722. The one or more piston and cylinder assemblies may pivot at the hinge. Each of the one or more piston and cylinder assemblies 727 may be attached to the upper section 723*a* of the latch ring 723 at an opposite end from the hinge. Each of the one or more piston, and cylinder assemblies 727 may be attached to a separate arcuate segment of the upper section 723*a*. The one or more piston and cylinder assemblies 727 may be configured to move between an actuated position, shown in FIG. 35B, and an unactuated position, shown in FIG. 34B. The one or more piston and cylinder assemblies 727 may be configured to rotate the latch ring 723 relative to the housing 711 and the lock ring 722. The profile 725 may move through the channel 726 as the latch ring 723 rotates relative to the lock ring 722. The upper section 723*a* may be configured to move through the groove 724 as the latch ring 723 rotates relative to the lock ring 722.

FIG. 33 illustrates the adapter 730. The adapter 730 of the tool may include a stem 731, a torque connector 732, bearings 733, 734, a tool housing 735, and a utility transfer section 736. The stem 731 may be tubular having a bore therethrough. The bore of the stem 731 may be configured to receive the quill 713. The bore of the gear 712 may be configured to receive the stem 731. The torque connector 732 may include a splined surface. The torque connector may be integrally formed with the stem 731. The splined surface may be formed on an outer surface of the torque connector 732. The torque connector 732 may be disposed at an upper longitudinal end of the stem 731. The torque connector 732 may engage the splined surface of the gear 712. The torque connector 732 may be configured to transfer torque from the gear 712 to the adapter 730. The stem 731 may include a flange 731*f*. The flange 731*f* may be disposed below the torque connector 732. The flange 731*f* may be an annular flange.

The tool housing 735 may be tubular having a bore therethrough. The tool housing 735 may be disposed about the stem 731. The tool housing 735 may include one or more flanges 735*f* formed on an outer surface. The one or more flanges 735*f* may be spaced circumferentially apart about the stem 731. The one or more flanges 735*f* may extend radially outward from the tool housing 735. Each of the one or more flanges 735*f* may have a groove 735*g* formed at an upper longitudinal end. The groove 735*g* may be T-shaped. The groove 735*g* may extend circumferentially through the flange. The groove 735*g* may terminate partially through the flange. The groove 735*g* may be configured to receive the profile 725 of the lock ring 722. Bearing 733 may be disposed longitudinally between the tool housing 735 and the flange 731*f*. Bearing 733 may be disposed radially between a lip of the tool housing 735 and the outer circumference of the stem 731. Bearing 733 may facilitate rotation of the stem 731 relative to the tool housing 735. Bearing 734 may be disposed longitudinally between the tool housing 735 and a lock nut disposed on the stem 731 and above the utility transfer section 736. Bearing 734 may be disposed radially between a lower shoulder of the tool housing 735 and the stem 731. Bearing 731 may facilitate rotation of the stem 731 relative to the tool housing 735.

The utility transfer section 736 may be configured to provide an electrical and/or hydraulic connection across a rotating interface. The utility transfer section 736 may be configured to transfer at least one of power, data, electronics, hydraulics, and pneumatics between the stationary and rotational parts of the tool. The utility transfer section 736 may include a slip ring assembly and/or hydraulic swivel. The slip ring assembly may include a ring member having one or more contact rings (such as copper rings) that rotate with the stem 731. The slip ring assembly may include a support housing for supporting one or more contact members (such as brushes). One or more bearings may be disposed between the support housing and the ring member. The one or more bearings may facilitate rotation of the ring member relative to the support housing. The non-rotating contact members contact the contact rings of the rotating ring member, thereby providing an electrical connection for power, data, and/or electronics across a rotating interface. In this manner, electronic signals may be sent between non-rotating section and the rotating section of the adapter 730. Additionally, the hydraulic swivel may provide transfer of hydraulic fluids for pneumatic and/or hydraulic operation of the tool. The utility transfer section 736 may include one or more supply lines and one or more utility receivers. The one or more utility receivers may be disposed on the support housing of the utility transfer section 736. The one or more utility receivers may be configured to engage and connect to the one or more utility connectors. The one or more utility receivers may be configured to transfer at least one of power, data, electronics, hydraulics, and pneumatics between the top drive and the tool. The one or more utility receivers may be rotationally stationary relative to the support housing. The one or more utility receivers may be rotationally stationary during rotation of the stem 731. Alternatively, the one or more utility receivers may be disposed on the tool housing 735.

The CMC 700 is operable to torsionally and longitudinally couple the top drive to the tool. First, the adapter 730 is inserted into the housing 711, as shown in FIG. 34A. The flanges 735*f* of the tool housing 735 pass through the recess 711 r of the housing 711. The torque connector 732 is inserted into the bore of the gear 712. The quill 713 is inserted into the bore of the torque connector 732. The splined surface of the torque connector 732 engages the splined surface of the gear 712, thereby torsionally coupling the motor to the stem 731. The one or more piston and cylinder assemblies 727 are in the unactuated position, as shown in FIG. 34B. The one or more flanges 735*f* are received in gaps between the arcuate segments of the latch ring 723. The profile 725 is longitudinally aligned with the groove 735*g* of the tool housing 735.

Figure 35A:
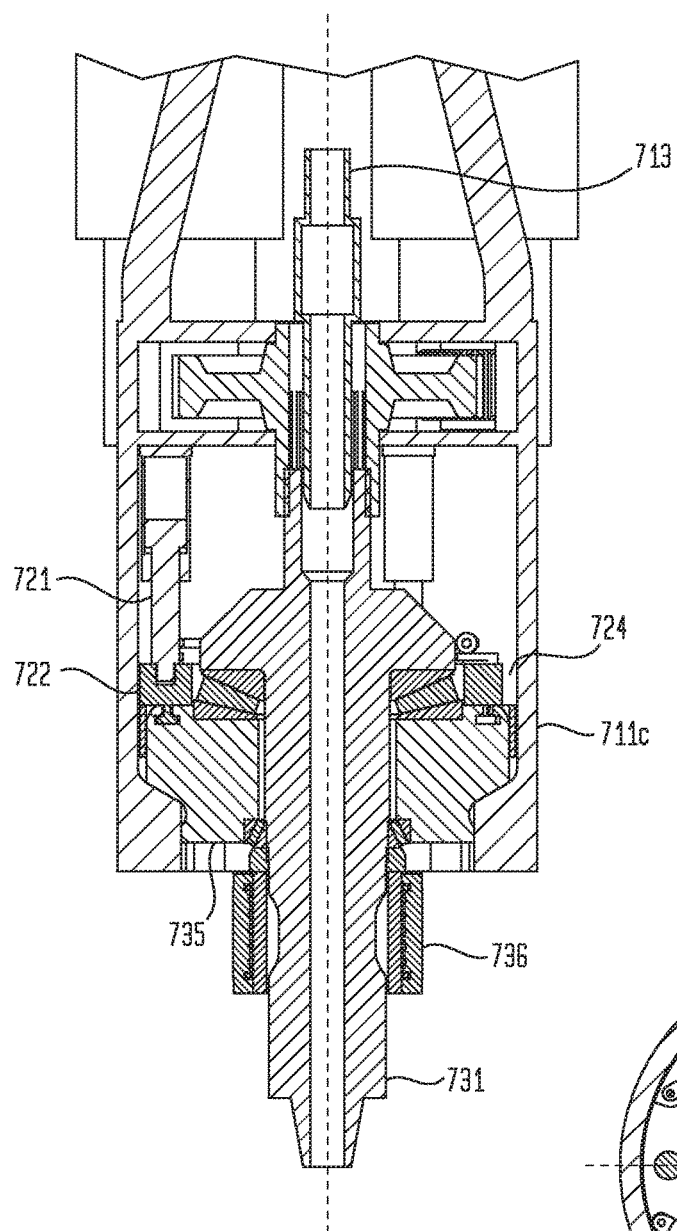
FIGS. 35A-B and 36 illustrate operation of a compensation assembly of the combined multi-coupler, according to the seventh embodiment.
Figure 35B:
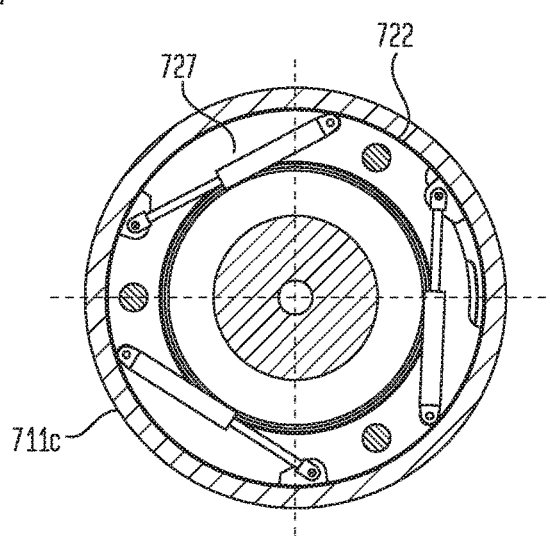

Next, the one or more piston and cylinder assemblies 727 are actuated to rotate the latch ring 723, as shown in FIGS. 35A and 35B. Rotation of the latch ring 723 causes the latch ring 723 to engage the one or more flanges 735*f* of the tool housing 735. Engagement with the one or more flanges 735*f* causes the tool housing 735 to rotate relative to the housing 711 and the lock ring 722. As the latch ring 723 and the tool housing 735 rotate relative to the lock ring 722, the profile 725 moves through the channel 726 and into the groove 735*g*. The tool housing 735 continues rotating relative to the lock ring 722 until the profile 725 reaches the end of the groove 735*g*. Engagement of the profile 725 in the groove 735*g* supports the weight of the adapter 730 and the tool. The profile 725 disposed in the groove 735*g* longitudinally couples the lock ring 722 and the adapter 730.

Figure 36:
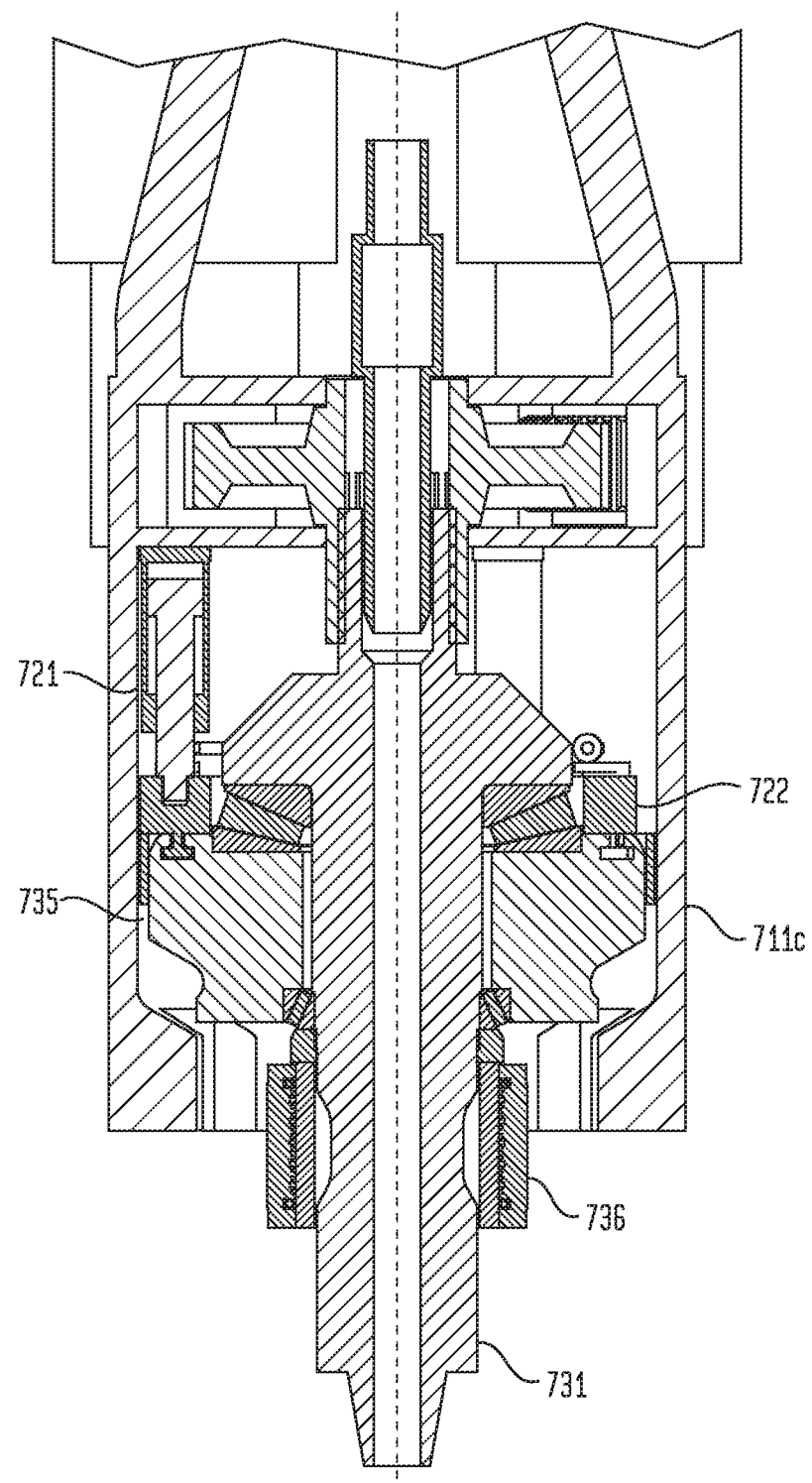

The one or more piston and cylinder assemblies 721 are actuated to longitudinally move the lock ring 722 and the adapter 730 relative to the housing 711, as shown in FIG. 36. The one or more piston and cylinder assemblies 721 are pressurized to preload the connection. The one or more piston and cylinder assemblies 721 are used to provide thread compensation. The one or more piston and cylinder assemblies 721 lift the lock ring 722 and the adapter 730 relative to the housing 711. The one or more piston and cylinder assemblies 721 reduce the amount of weight set down on the threads of the tubular string during connection with a tubular string. The one or more piston and cylinder assemblies 721 compensates for the downward travel of the top drive and the tool due to the threaded makeup to the tubular string.

Figure 37:
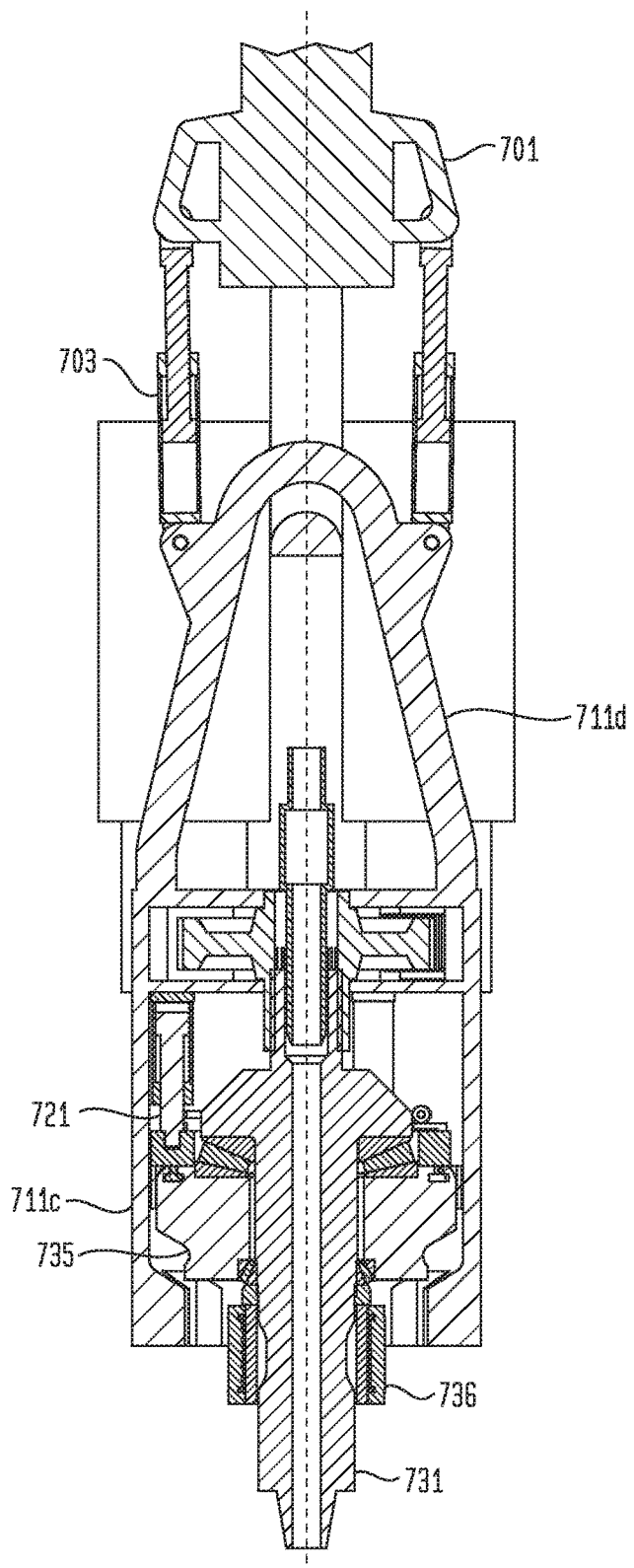
FIG. 37 illustrates operation of a compensation assembly of a traveling member.

Additionally, the compensation assembly of the traveling member 701 can be actuated to provide additional thread compensation, as shown in FIG. 37. The one or more piston and cylinder assemblies 703 of the traveling member longitudinally move the drive member 710 and the adapter 730. The one or more piston and cylinder assemblies 703 lift the hook of the housing section 711*d* from the support of the traveling member 701. The one or more piston and cylinder assemblies 703 reduce the amount of weight set down on the threads of the tubular string during connection with a tubular string. The one or more piston and cylinder assemblies 703 compensate for the downward travel of the top drive and the tool due to the threaded makeup to the tubular string.

In one or more of the embodiments described herein, a coupler system for coupling a top drive and a tool includes a coupler for a top drive. The coupler system includes a housing with a bore therethrough and a window formed through the housing. The coupler system also includes an adapter of a tool having a tab formed on the adapter, wherein the window is configured to receive the tab and torsionally couple the adapter and the housing. The coupler system also includes a lock ring disposed on the housing and rotatable relative to the housing between a locked position and an unlocked position, wherein the lock ring is configured to longitudinally couple the adapter and the coupler in the locked position.

In one or more of the embodiments described herein, a coupler system for coupling a top drive and a tool includes a drive member of the top drive configured to transfer torque. The drive member includes a housing with a bore therethrough and a window formed substantially laterally through the housing. The adapter of the tool is configured to be inserted through the window of the housing.

In one or more of the embodiments described herein, the coupler system further includes a lock plate disposed in the housing.

In one or more of the embodiments described herein, the lock plate is longitudinally movable relative to the housing.

In one or more of the embodiments described herein, the lock plate is configured to connect to the adapter.

In one or more of the embodiments described herein, the coupler system further includes one or more utility connectors longitudinally movable relative to the housing.

In one or more of the embodiments described herein, the one or more utility connectors are configured to transfer at least one of power, data, electronics, hydraulics, and pneumatics.

In one or more of the embodiments described herein, a compensation assembly is configured to support a weight of the tool.

In one or more of the embodiments described herein, the compensation assembly includes an actuator configured to move a lock plate disposed in the housing and a fastener configured to couple the adapter to the lock plate.

In one or more of the embodiments described herein, a method for coupling a top drive to a tool includes moving the tool adjacent to the top drive, the tool including an adapter and the top drive including a housing having a window formed therethrough. The method further includes aligning the adapter with the window and inserting the adapter substantially laterally into the window of the housing, thereby longitudinally and torsionally coupling the top drive and the tool.

In one or more of the embodiments described herein, the method further includes moving a lock plate disposed within the housing.

In one or more of the embodiments described herein, the method further includes moving one or more utility connectors at least partially disposed within the housing.

In one or more of the embodiments described herein, the method further includes connecting the lock plate to the adapter.

In one or more of the embodiments described herein, the method further includes supporting a weight of the tool using a compensation assembly.

In one or more of the embodiments described herein, the method further includes connecting the one or more utility connectors to the adapter to transfer at least one of power, data, electronics, hydraulics, and pneumatics.

In one or more of the embodiments described herein, a coupler system for coupling a top drive and a tool, includes a drive member for a top drive configured to transfer torque and support a weight of the tool. The drive member includes a housing with a bore therethrough. The coupler system further includes an adapter of a tool, a lock plate disposed in the housing and longitudinally movable relative to the housing, wherein the lock plate is configured to connect to the adapter, and one or more utility connectors longitudinally movable relative to the housing with the lock plate.

In one or more of the embodiments described herein, the one or more utility connectors are configured to connect to the adapter.

In one or more of the embodiments described herein, the one or more utility connectors are configured to transfer at least one of power, data, electronics, hydraulics, and pneumatics.

In one or more of the embodiments described herein, the coupler system further includes an actuator disposed in the housing and configured to move and connect the one or more utility connectors to the adapter.

In one or more of the embodiments described herein, a coupler system for coupling a top drive and a tool includes a drive member for a top drive. The drive member includes a housing with a bore therethrough and a quill configured to rotate relative to the housing. The coupler system further includes an adapter of a tool configured to be inserted into the bore of the housing and engage the quill and one or more utility connectors, wherein the one or more utility connectors are rotationally stationary.

In one or more of the embodiments described herein, the one or more utility connectors are configured to transfer at least one of power, data, electronics, hydraulics, and pneumatics.

In one or more of the embodiments described herein, the adapter comprises a utility transfer section configured to transfer at least one of power, data, electronics hydraulics, and pneumatics across a rotating interface.

In one or more of the embodiments described herein, the coupler system further includes a compensation assembly configured to support a weight of the tool.

In one or more of the embodiments described herein, the window is formed in the housing at an angle of about thirty degrees or less relative to a horizontal axis of the housing.

In one or more of the embodiments described herein, the adapter is inserted at an angle of about thirty degrees or less relative to a horizontal axis of the housing.

While the foregoing is directed to embodiments of the present invention, other and further embodiments of the invention may be devised without departing from the basic scope thereof, and the scope thereof is determined by the claims that follow.

The invention claimed is:

1. A coupler system for coupling a top drive and a tool, comprising:
    a drive member of the top drive configured to transfer torque, having:
        a housing with a bore therethrough; and
        a window formed substantially laterally through the housing; an adapter of the tool configured to be inserted through the window of the housing; and
    one or more utility connectors longitudinally movable relative to the housing.

2. The coupler system of claim 1, wherein the one or more utility connectors are configured to transfer at least one of power, data, electronics, hydraulics, and pneumatics.

3. The coupler system of claim 1, wherein the adapter includes a bore configured to fluidly communicate with the bore of the housing when the adapter is inserted through the window.

4. The coupler system of claim 1, further comprising a lock plate disposed in the housing.

5. The coupler system of claim 4, wherein the lock plate is longitudinally movable relative to the housing.

6. The coupler system of claim 4, wherein the lock plate is configured to connect to the adapter.

7. The coupler system of claim 1, further comprising a compensation assembly configured to support a weight of the tool.

8. The coupler system of claim 7, the compensation assembly comprising:
  an actuator configured to move a lock plate disposed in the housing; and
  a fastener configured to couple the adapter to the lock plate.

9. A method for coupling a top drive to a tool, comprising:
  moving the tool adjacent to the top drive, the tool including an adapter and the top drive including a housing having a window formed therethrough;
  aligning the adapter with the window; and
  inserting the adapter substantially laterally into the window of the housing, thereby longitudinally and torsionally coupling the top drive and the tool.

10. The method of claim 9, further comprising:
  moving a lock plate disposed within the housing; and
  connecting the lock plate to the adapter.

11. The method of claim 9, further comprising:
  moving one or more utility connectors at least partially disposed within the housing.

12. The method of claim 11, further comprising:
  supporting a weight of the tool using a compensation assembly.

13. The method of claim 11, further comprising connecting the one or more utility connectors to the adapter to transfer at least one of power, data, electronics, hydraulics, and pneumatics.

14. A coupler system for coupling a top drive and a tool, comprising:
  a drive member for a top drive configured to transfer torque and support a weight of the tool, having:
    a housing with a bore therethrough;
  an adapter of a tool;
  a lock plate disposed in the housing and longitudinally movable relative to the housing, wherein the lock plate is configured to connect to the adapter; and
  one or more utility connectors longitudinally movable relative to the housing with the lock plate.

15. The coupler system of claim 14, wherein the one or more utility connectors are configured to connect to the adapter.

16. The coupler system of claim 15, wherein the one or more utility connectors are configured to transfer at least one of power, data, electronics, hydraulics, and pneumatics.

17. The coupler system of claim 14, further comprising an actuator disposed in the housing and configured to move and connect the one or more utility connectors to the adapter.

* * * * *